(12) United States Patent
Panga et al.

(10) Patent No.: US 9,238,772 B2
(45) Date of Patent: *Jan. 19, 2016

(54) HIGH SOLIDS CONTENT METHODS AND SLURRIES

(71) Applicant: Schlumberger Technology Corporation, Sugar Land, TX (US)

(72) Inventors: Mohan K. R. Panga, Novosibirsk (RU); Peter J. Photos, El Campo, TX (US); Bruno Drochon, Houston, TX (US); John W. Still, Katy, TX (US); Balkrishna Gadiyar, Katy, TX (US); Ryan Hartman, Tuscaloosa, AL (US); Bryan Stamm, Houston, TX (US)

(73) Assignee: SCHLUMBERGER TECHNOLOGY CORPORATION, Sugar Land, TX (US)

( * ) Notice: Subject to any disclaimer, the term of this patent is extended or adjusted under 35 U.S.C. 154(b) by 213 days.

This patent is subject to a terminal disclaimer.

(21) Appl. No.: 13/925,301

(22) Filed: Jun. 24, 2013

(65) Prior Publication Data

US 2013/0281330 A1 Oct. 24, 2013

Related U.S. Application Data

(60) Division of application No. 12/827,434, filed on Jun. 30, 2010, now Pat. No. 8,490,698, and a continuation-in-part of application No. 12/124,910, filed on May 21, 2008, now Pat. No. 7,789,146, said (Continued)

(51) Int. Cl.
| | | |
|---|---|---|
| C09K 8/68 | (2006.01) | |
| E21B 43/267 | (2006.01) | |
| E21B 43/00 | (2006.01) | |
| C09K 8/57 | (2006.01) | |
| C09K 8/80 | (2006.01) | |
| E21B 43/04 | (2006.01) | |

(52) U.S. Cl.
CPC . *C09K 8/572* (2013.01); *C09K 8/80* (2013.01); *E21B 43/04* (2013.01)

(58) Field of Classification Search
None
See application file for complete search history.

(56) References Cited

U.S. PATENT DOCUMENTS

| | | | |
|---|---|---|---|
| 7,007,754 B2 | 3/2006 | Fanguy, Jr. et al. | |
| 7,789,146 B2 * | 9/2010 | Panga et al. | 166/278 |
| 7,923,415 B2 | 4/2011 | Panga et al. | |

(Continued)

FOREIGN PATENT DOCUMENTS

| | | |
|---|---|---|
| EP | 2473705 A2 | 7/2012 |
| RU | 2065442 C1 | 8/1996 |
| SU | 177382 | 5/1966 |

*Primary Examiner* — John J Figueroa
(74) *Attorney, Agent, or Firm* — Mathieu Vandermolen; Rachel E. Greene; Tim Currington

(57) ABSTRACT

A composition and method are disclosed. The composition includes a carrier fluid and a solids mixture combined to form a slurry, wherein the solids mixture comprises a plurality of volume-averaged particle size distribution (PSD) modes, wherein a first PSD mode comprises solids having a volume-average median size at least three times larger than the volume-average median size of a second PSD mode such that a packed volume fraction of the solids mixture exceeds 0.75, and wherein the solids mixture comprises a degradable material and includes a reactive solid. The method includes circulating the slurry through a wellbore to form a pack in a fracture and/or a screen-wellbore annulus; degrading the degradable material to increase porosity and permeability of the pack; and producing a reservoir fluid through the permeable pack.

18 Claims, 15 Drawing Sheets

Related U.S. Application Data application No. 12/827,434 is a continuation-in-part of application No. 12/174,137, filed on Jul. 16, 2008, now Pat. No. 7,784,541.

(60) Provisional application No. 60/951,780, filed on Jul. 25, 2007.

(56) References Cited

U.S. PATENT DOCUMENTS

| | | |
|---|---|---|
| 8,496,056 B2 | 7/2013 | Hartman et al. |
| 8,505,628 B2 * | 8/2013 | Panga et al. .................... 166/278 |
| 8,916,506 B2 * | 12/2014 | Panga et al. .................... 507/200 |
| 2003/0060374 A1 | 3/2003 | Cooke, Jr. |
| 2004/0094300 A1 | 5/2004 | Sullivan et al. |
| 2005/0037928 A1 | 2/2005 | Qu et al. |
| 2006/0113077 A1 | 6/2006 | Willberg et al. |
| 2006/0258546 A1 | 11/2006 | Brannon et al. |
| 2008/0139416 A1 | 6/2008 | Rimassa et al. |
| 2008/0217012 A1 | 9/2008 | Delorey et al. |
| 2009/0301725 A1 | 12/2009 | Case et al. |
| 2012/0111563 A1 | 5/2012 | Abad et al. |

* cited by examiner

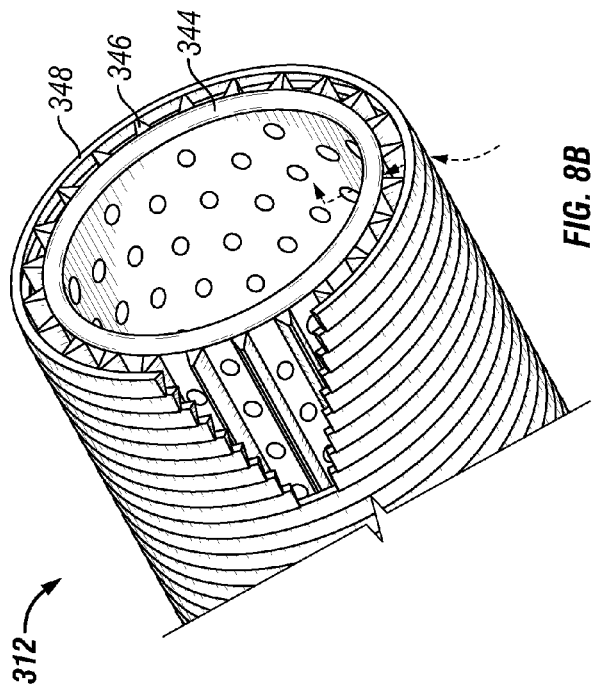
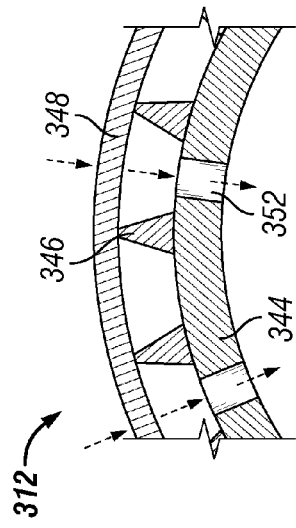
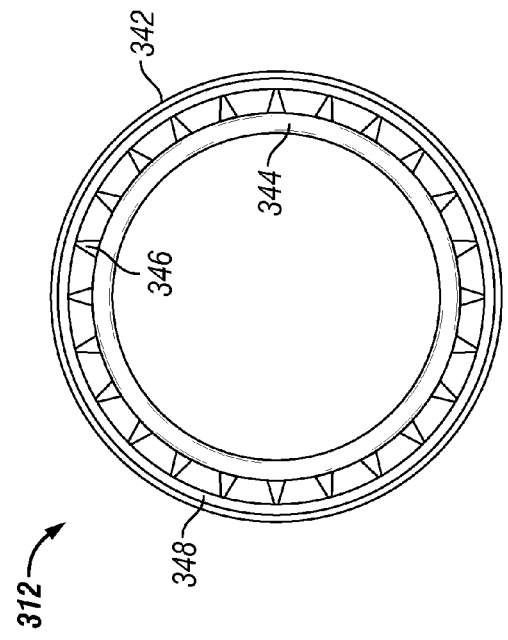
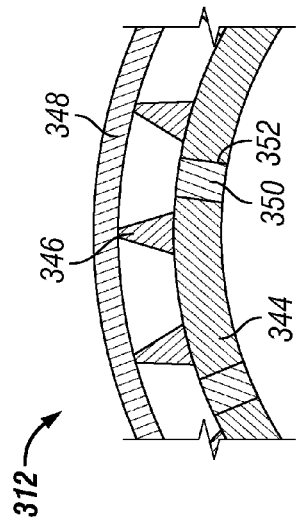

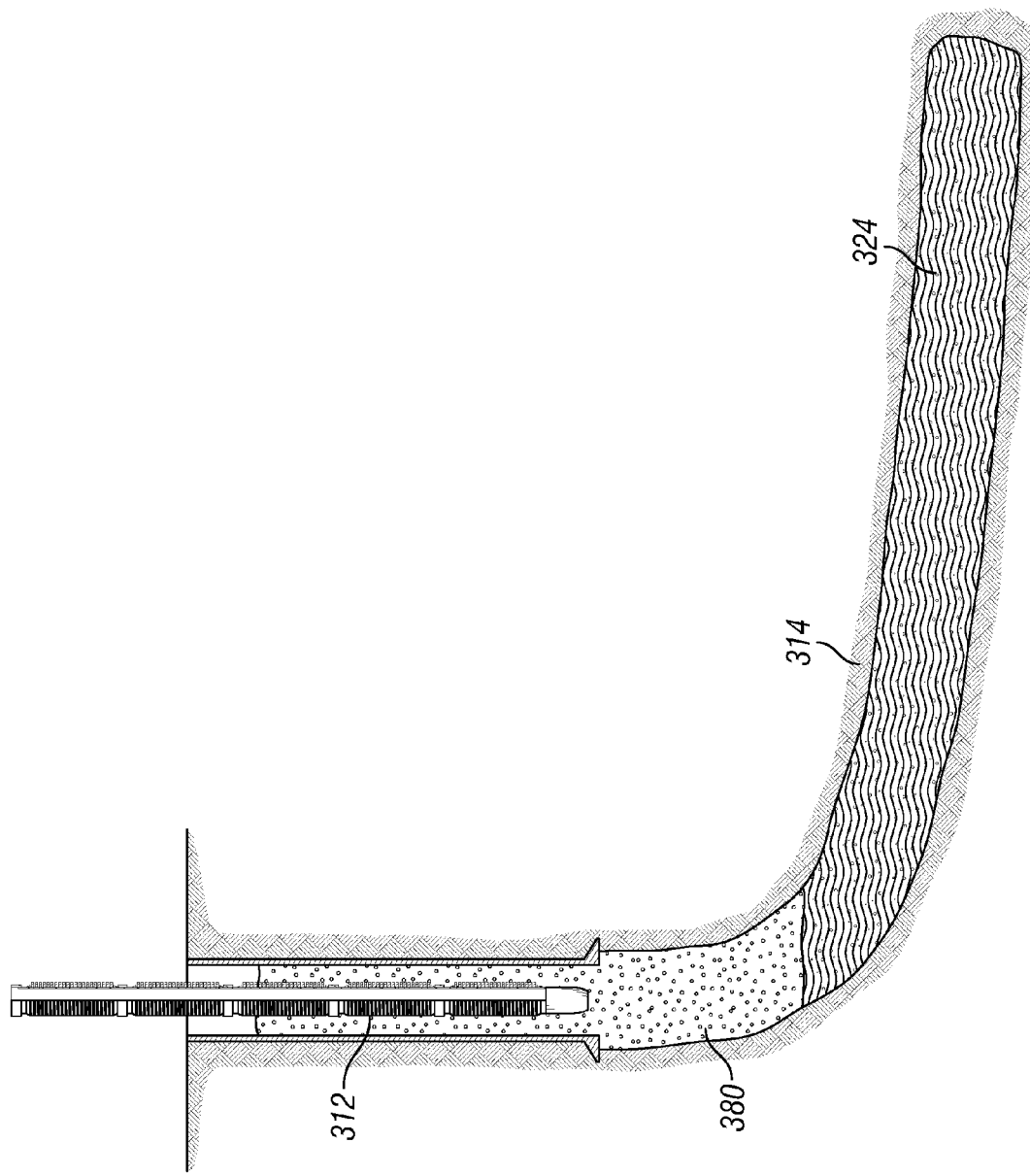

HIGH SOLIDS CONTENT METHODS AND SLURRIES

CROSS REFERENCE TO RELATED APPLICATIONS

This application is a divisional application from U.S. patent Ser. No. 12/827,434 which is a continuation-in-part of co-pending U.S. Ser. No. 12/124,910, filed May 21, 2008, and a continuation-in-part of co-pending U.S. Ser. No. 12/174,137, filed Jul. 16, 2008, published as US 2009/0025934, both of which claim priority to and the benefit of provisional application U.S. 60/951,780, filed Jul. 25, 2007, all of which are hereby incorporated herein by reference in their entireties.

BACKGROUND

The statements in this section merely provide background information related to the present disclosure and may not constitute prior art.

Patent application publications US 2009/0025932 and US 2009/0025934 are hereby incorporated herein by reference in their entireties.

Gravel packs are placed in wellbores between a screen and a formation face and/or casing to prevent formation sand from flowing into the wellbore and to improve wellbore and near-wellbore conductivity. The conductivity at the wellbore and near-wellbore is important because any damage in these locations significantly increases the pressure drop of fluid flow, thereby reducing the producibility or injectivity of the well.

Further, current placement techniques for gravel packs, with or without simultaneous hydraulic fracturing of the formation, can be a complex procedure requiring several stages and the proper functioning of moving parts in a hostile wellbore environment. Accordingly, there is a demand for further improvements in this area of technology.

SUMMARY

Some embodiments are unique procedures for creating a high solid fraction fluid. Other embodiments include unique systems, methods, systems and apparatus for low damage gravel packing. Further embodiments, forms, objects, features, advantages, aspects, and benefits shall become apparent from the below description and drawings.

The current invention in various embodiments describes methods, slurries and systems of gravel packing or frac-packing a well using slurries that contain a high fraction of solids. The solids comprise a plurality of different particle size distribution modes to increase the solid volume fraction in the slurry and the packed volume fraction in the gravel or fracture pack. In one embodiment, the solids mixture comprises a plurality of volume-average particle size distribution (PSD) modes wherein a first PSD mode comprises solids having a volume-averaged median size at least three times larger than the volume-average median size of a second PSD mode such that a packed volume fraction (PVF) of the solids mixture exceeds 0.75 or preferably exceeds 0.8. In another embodiment, the smaller PSD modes can be removed from the pack to increase porosity and permeability for the flow of fluids through the pack.

In one embodiment, a method comprises combining a carrier fluid and a solids mixture to form a slurry, wherein the solids mixture comprises a plurality of volume-averaged particle size distribution (PSD) modes, wherein a first PSD mode comprises solids having a volume-average median size at least three times larger than the volume-average median size of a second PSD mode such that a packed volume fraction (PVF) of the solids mixture exceeds 0.75 or preferably exceeds 0.8, and wherein the solids mixture comprises a degradable material and includes a reactive solid; circulating the slurry through a wellbore to form a pack of the solids mixture having a PVF exceeding 0.75 or preferably exceeds 0.8 in one or both of a fracture in a formation and an annulus between a screen and the wellbore; degrading the degradable material in the pack to increase porosity and permeability of the pack; and producing a reservoir fluid from the formation through the increased porosity pack.

In one embodiment, the degradable material can be dissolved by changing the pH in the solids pack. For example, alumina trihydrate particles at a neutral pH are solubilized at a high as well as at a low pH. In other embodiments, the degradable material is soluble in basic fluids, e.g., the degradable material is selected from amphoteric oxides, esters, coated acids and combinations thereof; and the solids mixture can further include a base or a base precursor that is optionally sparingly soluble and/or encapsulated, or the solids can be contacted with a basic aqueous solution.

In further embodiments, the degradable material is soluble in acidic fluids, e.g., the degradable material is selected from oxides and hydroxides of aluminum, zinc, tin, lead, boron, silicon and iron; carbonates, sulfates, oxides and hydroxides of calcium, magnesium and barium; and combinations thereof; and the solids mixture can further include an acid or an acid precursor that is optionally sparingly soluble and/or encapsulated, or the solids can be contacted with an acidic aqueous solution. In one embodiment, the acid precursor is selected from the group consisting of hydrolyzable esters, acid anhydrides, acid sulfonates, acid halides and combinations thereof.

In further embodiments, the degradable material can be an encapsulated water- or oil-soluble solid which can be removed from the gravel or proppant pack by de-encapsulating the solid. Alternatively or additionally the degradable material can be a water-soluble solid, and the carrier in the slurry can be either a saturated solution of the soluble solid, e.g. salt solids and brine, or an invert emulsion wherein the soluble solid is dispersed in the oil phase. The soluble solid can be removed by contacting the pack with an undersaturated aqueous medium and/or breaking the emulsion.

In another embodiment, a composition comprises the slurry used in the method just described, i.e., a carrier fluid and a solids mixture combined to form a flowable slurry, wherein the solids mixture comprises a plurality of volume-averaged particle size distribution (PSD) modes, wherein a first PSD mode comprises solids having a volume-average median size at least three times larger than the volume-average median size of a second PSD mode such that a packed volume fraction (PVF) of the solids mixture exceeds 0.75, and wherein the solids mixture comprises a degradable material and includes a reactive solid.

In another embodiment, the invention addresses the issue of fluid leak-off from the multimodal slurry into the screen. Loss of fluid from the multimodal slurry can cause premature bridging, making it difficult to place the slurry in the annulus around the screen in the screen-first placement method, or to stab the screen into the multimodal slurry in the slurry-first placement method. In one embodiment, the screen is plugged with a degradable fluid loss particle, which after gravel placement and screen placement, is later removed by dissolution for example to restore permeability of the screen element for production of fluid from the formation. In an embodiment, the screen is contacted with a spacer fluid comprising the degradable fluid loss particles in advance of contact of the screen with the gravel-containing slurry. In the advance-spacer embodiment: the spacer can be pumped downhole into the annulus around the screen positioned downhole in the screen-first method, followed by the slurry containing the gravel; or, in the case of the slurry-first embodiment, the slurry is placed in the wellbore, followed by the spacer placed above the gravel-containing slurry, and then the screen is passed through the spacer before entering the slurry, whereby the screen is at least temporarily blocked with the fluid loss particles to inhibit leak-off from the multimodal slurry into the screen.

In an alternate embodiment, the multimodal slurry comprises a bridge-forming composition to form a bridge on the screen when the slurry is placed in contact with the screen, whereby the screen is at least temporarily blocked to inhibit leak-off from the multimodal slurry into the screen.

In an embodiment, a method comprises: combining a carrier fluid and a solids mixture to form a slurry, wherein the solids mixture comprises a plurality of volume-averaged particle size distribution (PSD) modes such that a packed volume fraction (PVF) of the solids mixture exceeds 0.75 or preferably exceeds 0.8; contacting a screen with a fluid comprising leak-off control agent to form a bridge on the screen to inhibit fluid entry; positioning the screen in a wellbore and circulating the slurry through the wellbore in any order such that the solids mixture is deposited between the screen and the wellbore; degrading the degradable material in the pack to increase porosity and permeability of the pack; removing the bridge from the screen; and producing a reservoir fluid from the formation through the increased porosity pack and the screen.

In an embodiment, the leak-off control fluid comprises a spacer fluid introduced into the wellbore. In an embodiment, the slurry is circulated through the wellbore before the screen is positioned in the wellbore, the spacer fluid is positioned in the wellbore above the slurry, and the screen is passed through the spacer fluid in the wellbore and then stabbed into the slurry. In an alternate embodiment, the screen is positioned in the wellbore before the slurry is circulated into an annulus between the screen and the wellbore, and wherein the spacer fluid is circulated into the annulus ahead of the slurry. In an embodiment, the spacer fluid and slurry are sequentially pumped through a central flow passage to a bottom end of the screen and into the annulus.

In an embodiment, the slurry comprises the leak-off control agent and the bridge is formed on the screen during the circulation of the slurry. In an embodiment, the solids mixture comprises at least three PSD modes, wherein a first amount of particulates have a first PSD, a second amount of particulates have a second PSD, and a third amount of particulates have a third PSD, wherein the first PSD is from two or three to ten times larger than the second PSD, and wherein the second PSD is larger than the third PSD, preferably from 1.5 to ten times larger in one embodiment, from three to ten or fifteen times larger in another embodiment, from about 1.5 to 4 times larger in an alternate embodiment, and from 1.5 to less than three times larger in a further embodiment. In an alternate or additional embodiment, the solids mixture comprises the three or more PSD modes to form the bridge on the screen.

In further embodiments, the carrier fluid may further comprise a fluid loss additive, such as, for example, latex dispersions, water soluble polymers, submicron particles, and particulates with different shapes, and/or a slurry stabilizer, such as, for example, nanoparticles, polymers that hydrate at high temperatures, and high aspect ratio particles.

In another embodiment, the slurry placement may require that the slurry stay suspended for extended periods of time without settling so that rheological characteristics are retained, for example, when the gravel-laden slurry is placed in an open hole followed by screen stab-in there may be a delay of as much as 48 hours between slurry circulation into the wellbore and screen stab-in while the slurry circulation workstring is removed from the hole and the screen is tripped in. If the solids settle prematurely, the high solids content slurry may lose its fluid like properties and an excessive amount of force may be required to push the screen into the settled slurry. In an embodiment according to the present invention, a slurry comprises a solids mixture comprising a plurality of PSD modes such that a PVF exceeds 0.75, preferably exceeds 0.8; a carrier fluid in an amount to provide an SVF less than the PVF of the solids mixture; and a stability additive to inhibit settling of the solids mixture. In another embodiment, a method comprises combining the carrier fluid, the solids mixture and the stability additive to form the slurry; circulating the slurry into a wellbore to deposit the slurry downhole; terminating the slurry circulation for a period of time, wherein the stability additive inhibits settling of the solids mixture; and thereafter circulating the deposited slurry in contact with a surface of a screen.

In embodiments, the stability additive comprises colloidal particles such as, for example, γ-alumina, MgO, γ-Fe2O3, and combinations thereof; hydratable polymer particles, e.g., polymer particles having a hydration temperature above 60° C. such as gellan gum; high aspect ratio particles, e.g. an aspect ratio above 6, such as, for example, flakes which may be optionally degradable such as a polymer or copolymer of lactide and/or glycolide.

The present invention provides embodiments for placing the slurry in a gravel packing operation. In various embodiments, a gravel packing screen is placed in a wellbore and the slurry and/or the slurry solids are placed in an annulus between the screen and the wellbore, in either order. In one embodiment, the screen is initially placed in the wellbore "screen-first" and then the slurry is circulated down the tubing, through a packer and crossover port, and into the annular space around the screens. In a further screen-first embodiment, the slurry deployment can include a "bottoms-up" method of pumping, which allows in embodiments for gravel packing and/or fracturing immediately post-drilling, for gravel packing-while cementing, for the inclusion of chemical packers, for the use of large diameter screens and other additional variations. In another embodiment, a "stab-in" technique is used wherein the slurry is initially circulated into the wellbore, and then the screen is positioned in the wellbore. In this embodiment, the screen displaces the slurry from the central portion of the wellbore and the slurry fills or remains in the screen-wellbore annulus.

In another embodiment, after the slurry is placed in the annulus of the screen and the open/cased hole and/or in a fracture, all or at least a portion of the solid particles other than gravel in the fluid are flowed back to the surface leaving a permeable gravel pack in the annulus. In this embodiment, the method comprises forming a stable, flowable slurry comprising a carrier fluid and a solids mixture, wherein the solids mixture comprises a plurality of volume-averaged particle size distribution (PSD) modes such that a packed volume fraction (PVF) exceeding 0.75, preferably exceeding 0.8, and wherein the solids mixture comprises at least a proppant PSD mode and a fines PSD mode. In an embodiment, the slurry is circulated through a wellbore to form a proppant pack from depositing the solids mixture in one or both of a fracture in a formation and an annulus between a screen and the wellbore, the fines in the pack are contacted with a dispersant, and fluid is passed through the pack to remove fines.

Another embodiment is a system for effecting the fines flowback method. In this embodiment, a well bore is provided in fluid communication with a subterranean formation. In an embodiment, a gravel packing slurry comprises a carrier fluid and a solids mixture, wherein the solids mixture comprises a plurality of volume-averaged particle size distribution (PSD) modes such that a packed volume fraction (PVF) exceeding 0.75, preferably exceeding 0.8, wherein the solids mixture comprises at least a proppant PSD mode and a fines PSD mode. A pump is adapted to circulate the slurry in the wellbore to deposit the solids mixture and form a proppant pack in one or both of a fracture in the formation and an annulus between a screen and the formation. The system comprises a dispersant source effective to facilitate fines flowback from the pack.

In one embodiment, a multi-PSD mode slurry comprises relatively large proppant, e.g., of a type and size commonly used in gravel packing, and the slurry has a composition to efficiently control leak-off into the screen and/or the formation while facilitating removal of the smaller particles after placement of the gravel. This slurry method and system in an embodiment allows transport of gravel to the toe of the well at a low flow rate, without having to change the washpipe diameter to control leak-off, and may also reduce the risk of fracturing in long horizontals where a high pump rate would otherwise be required to transport gravel using conventional methods and systems. In one embodiment, a slurry comprises a solids mixture in a carrier fluid. The solids mixture in this embodiment comprises at least first, second, third and fourth volume-averaged particle size distribution (PSD) modes such that a packed volume fraction (PVF) of the solids mixture is greater than 0.75, preferably greater than 0.80, wherein a solids volume fraction (SVF) of the slurry less than the PVF of the solids mixture, wherein the first PSD mode is at least three times larger than the second PSD mode, the second PSD mode is larger than the third PSD mode, and the third PSD mode is larger than the fourth PSD mode, and wherein at least one of the second and third PSD modes is less than 3 times larger than the respective third or fourth PSD mode. In one embodiment, the solids mixture further comprises a fifth PSD mode, wherein the fourth PSD mode is larger than the fifth PSD mode and preferably less than 3 times larger than the fifth PSD mode.

In embodiments where the smaller PSD modes are closer in size relative to the next larger and/or smaller PSD modes, a relatively high solids packing volume fraction can be obtained using a smaller proportion of the smaller PSD modes, and yet, surprisingly, fines flowback can be facilitated when it is desired to convert the high PVF pack into a permeable gravel pack and/or fracture pack.

BRIEF DESCRIPTION OF THE SEVERAL VIEWS OF THE DRAWINGS

FIG. 8A is a transverse cross sectional schematic diagram of an embodiment of a device for depositing particulates between an outer surface of a screen and a wellbore formation using a bottoms up slurry deployment technique wherein blocked screens are run in hole as a part of the final production run.

FIG. 8B is a perspective partially cutaway schematic diagram of the device of FIG. 8A following removal of the blocking for production.

FIG. 9 is a transverse cross sectional schematic diagram of an alternate embodiment of the device of FIGS. 8A-8B wherein the basepipe is blocked.

FIG. 10 is a transverse cross sectional schematic diagram of the device of FIG. 9 following removal of the blocking for production.

FIG. 20 is a schematic diagram of a stab-in embodiment wherein a screen-bridging spacer fluid is placed on top of the multimodal slurry in the wellbore.

DETAILED DESCRIPTION

Figure 1:
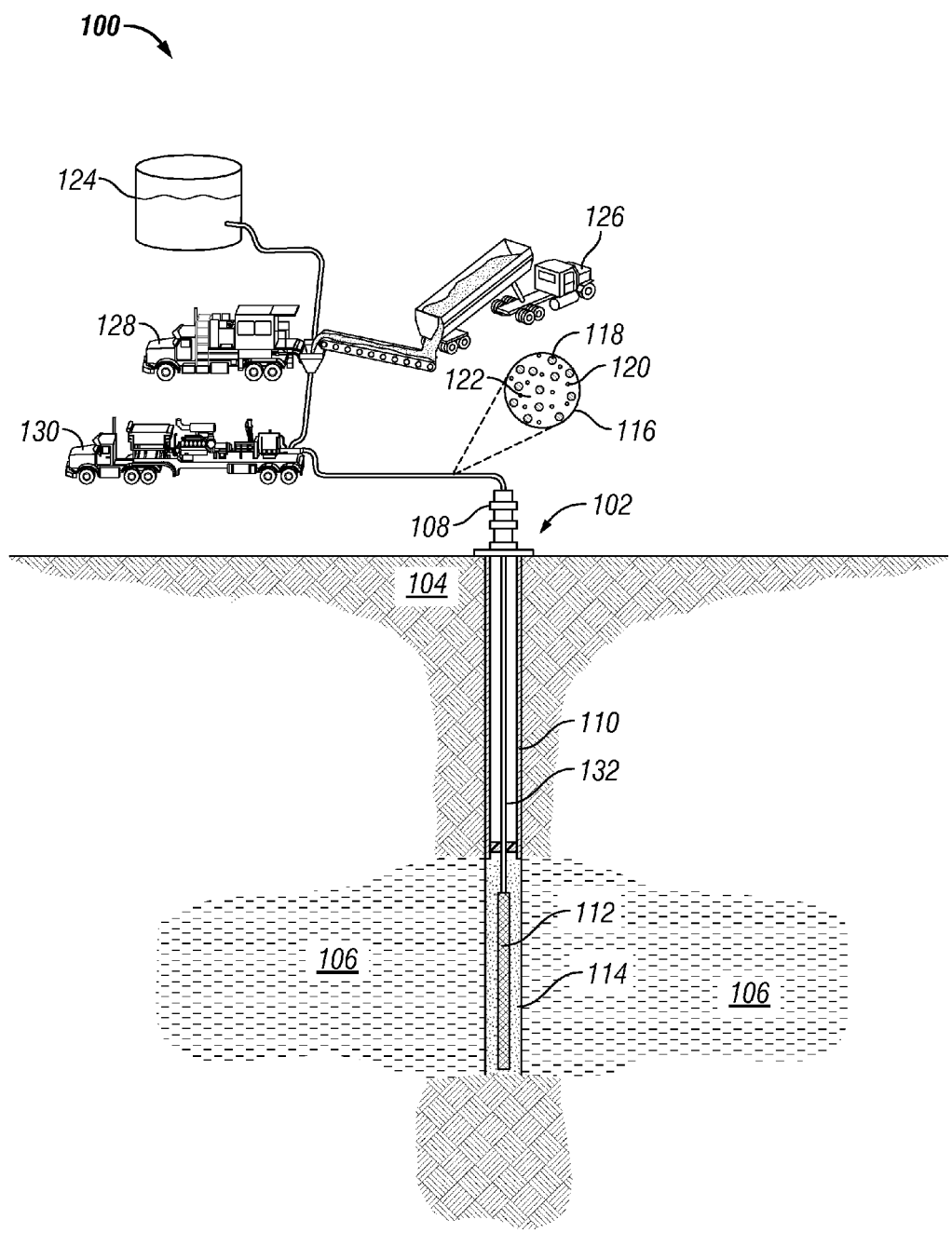
FIG. 1 is a schematic diagram of a system for low damage gravel packing.

At the outset, it should be noted that in the development of any such actual embodiment, numerous implementation-specific decisions must be made to achieve the developer's specific goals, such as compliance with system related and business related constraints, which will vary from one implementation to another. Moreover, it will be appreciated that such a development effort might be complex and time consuming but would nevertheless be a routine undertaking for those of ordinary skill in the art having the benefit of this disclosure. In addition, the composition used/disclosed herein can also comprise some components other than those cited. In the summary and this detailed description, each numerical value should be read once as modified by the term "about" (unless already expressly so modified), and then read again as not so modified unless otherwise indicated in context. Also, in the summary and this detailed description, it should be understood that a concentration range listed or described as being useful, suitable, or the like, is intended that any and every concentration within the range, including the end points, is to be considered as having been stated. For example, "a range of from 1 to 10" is to be read as indicating each and every possible number along the continuum between about 1 and about 10. Thus, even if specific data points within the range, or even no data points within the range, are explicitly identified or refer to only a few specific, it is to be understood that inventors appreciate and understand that any and all data points within the range are to be considered to have been specified, and that inventors possessed knowledge of the entire range and all points within the range.

As used in the specification and claims, "near" is inclusive of "at."

As used herein, the terms "bimodal" and "multimodal" with respect to particle size or other variable distribution have their standard statistical meanings. In statistics, a bimodal distribution is a continuous probability distribution with two different modes. A mixture is considered to be multimodal if it has two or more modes. These modes appear as distinct peaks (local maxima) in the probability density function. A bimodal distribution can arise as a mixture of two different unimodal distributions, i.e., distributions having only one mode. For example, a bimodally distributed particle size can be defined as $PSD_1$ with probability a or $PSD_2$ with probability $(1-\alpha)$, where $PSD_1$ and $PSD_2$ are different unimodal particle sizes and $0<\alpha<1$ is a mixture coefficient. A mixture of two unimodal distributions with differing means is not necessarily bimodal; however, a mixture of two normal distributions with similar variability is considered to be bimodal if their respective means differ by more than the sum of their respective standard deviations.

As used herein, the term "bridge" refers to the occlusion of passages, e.g., the openings in a screen element, to inhibit fluid flow. Thus, the term would not apply to the formation of a filter cake on a screen surface that does not significantly inhibit fluid flow through the screen. Conversely, "removing a bridge" and similar terms refer to the removal of the occlusions to restore fluid flow and also include modification of the structure of the bridge to an extent sufficient to restore fluid flow, e.g., removing a bridge can involve forming holes through the filter cake and/or removing smaller particles from a filter cake on a screen element to establish permeability, without physically removing the filter cake matrix.

The term "aspect ratio" as applied herein to particles is understood as being the ratio of the longest dimension of the particle to the shortest dimension. A sphere or a cube has an aspect ratio of 1, for example. An aspect ratio greater than one means the particle is elongated in one direction. Sometimes the aspect ratio is given as less than one, meaning that the longest dimension is used in the denominator rather than the numerator, but is understood in the art to be equivalent to its reciprocal where the aspect ratio is greater than one, e.g., an aspect ratios of 0.5 and 2.0 are equivalent, as are 0.25 and 4.0.

FIG. 1 is a schematic diagram of one embodiment of a system 100 for low damage gravel packing. In certain embodiments, the system 100 includes a well 102 drilled through an overburden 104 and a formation of interest 106. The formation of interest 106 may include a hydrocarbon producing formation, a water producing formation, a target formation for injection of a fluid, or other formation of interest known in the art. In certain embodiments, the well 102 has a wellhead 108, and a casing 110 covering at least a portion of the wellbore. In the illustration of FIG. 1, the wellbore through the formation of interest 106 is an "open hole" completion in a vertical well. Other types of completions are contemplated in the present application, including without limitation: a cased completion, multiple zone completions, and/or a horizontal well or well segment. The casing 110 may include a cement layer (not shown) between the casing 110 and the formation(s) (104, 106). Various other features of the system 100 that are known in the art are not shown or described herein to avoid obscuring aspects of the present application.

The system 100 further includes, in certain embodiments, a screen 112 disposed in the wellbore. The screen 112 may include slots or holes sized to prevent the flow of particles from the formation of interest 106 into the well 102 or to the surface during treatment flowback or production of the well 102. In certain embodiments, the system 100 includes a gravel pack 114 deposited between the screen 112 and the formation of interest 106. The gravel of the gravel pack 114 may be deposited as a portion of a slurry 116 comprising particles (118, 120) and a carrier fluid 122 as described in more detail below.

In certain embodiments, the slurry 116 is pumped through the well 102 to deposit the first amount of particulates 118 and the second amount of particulates 120 between the screen 112 and the formation of interest 106. The slurry 116 may be pumped outside the screen 112 into the formation of interest 106 until a screen-out occurs (i.e. the particulates 118, 120 build up to the point where the pressure drop across the gravel pack 114 prevents further pumping), the slurry 116 may be circulated through the well 102 such that the slurry 116 passes from outside the screen 112 to inside the screen 112, thereby depositing the particulates 118, 120 between the screen 112 and the formation of interest 106 and circulating the carrier fluid 122 to the surface. In certain embodiments, the slurry 116 may be placed in the wellbore 102 and the screen 112 lowered into the already-placed slurry 116 such that the particulates 118, 120 in the slurry 116 are thereby deposited between the screen 112 and the formation of interest 106.

In certain embodiments, the system 100 includes various devices to control mixing and pumping the slurry 116. In one exemplary embodiment, the system 100 includes at least one fluid tank 124 which contains the carrier fluid 122 and/or a base fluid utilized in the creation of the carrier fluid 122. The exemplary embodiment further includes a gravel carrier 126 which, in one embodiment, provides the first amount of particulates 118 to a blending device 128. The blending device 128 prepares the final slurry 116, for example mixing the gravel fluid 122 and adding the first amount of particulates 118 from the gravel carrier 126, and further adding any additives, the second amount of particulates 120 and/or third or any other amount of particulates. In certain embodiments, more than one particulate amount may be blended and added by the gravel carrier 126 or other device. The blending device 128 further provides the slurry 116 to a pumping device 130 that provides pressurized slurry 116 to the wellhead 108. Other equipment configurations are understood in the art and contemplated herein. For example, and without limitation, the system 100 may include a coiled tubing unit (not shown) in place of one or more pieces of equipment and/or tubing 132 connected to the screen 112.

Figure 2:
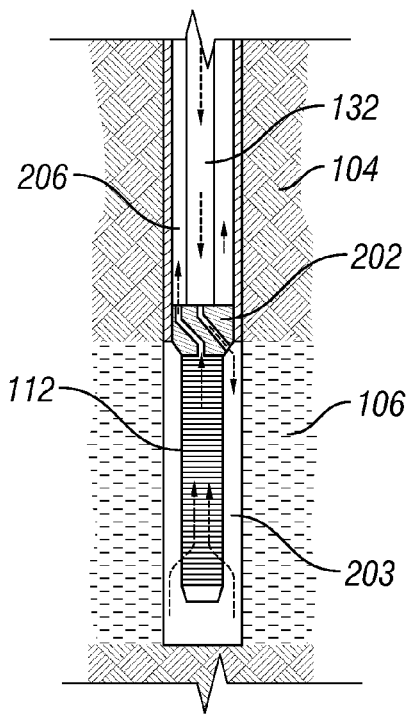
FIG. 2 is a schematic diagram of a device for depositing particulates between an outer surface of a screen and a surface of a wellbore formation.

FIG. 2 is a schematic diagram of one embodiment of a device for depositing particulates 118, 120 between an outer surface of a screen 112 and a surface of a formation of interest 106. The slurry 116 is pumped through a crossover tool 202 from a tubing 132 to the screen annulus 203. The carrier fluid 122 of the slurry 116 recirculates through the screen 112, depositing the particulates and returning to the surface via the crossover tool 202 through a tubing-casing annulus 206. Upon completion of placing the gravel pack 114, the crossover tool 202 is closed, replaced with a production packer, or subjected to other operations as known in the art. The placement of the gravel pack 114 as shown in FIG. 2 is exemplary only.

Figure 3A:
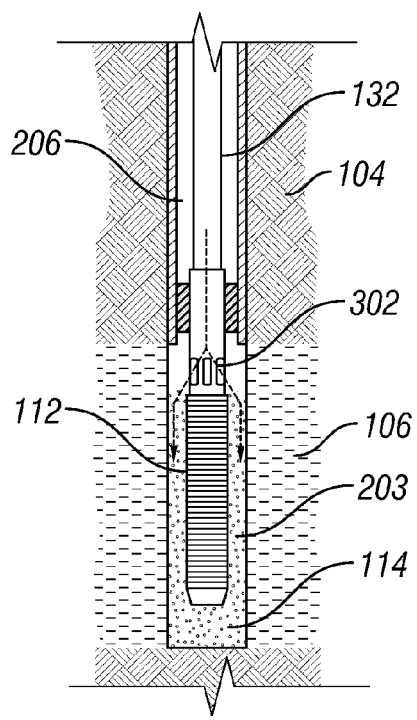
FIG. 3A is a schematic diagram of a device for depositing particulates between an outer surface of a screen and a surface of a wellbore formation in a first position.

FIG. 3A is a schematic diagram of one embodiment of a device for depositing particulates 118, 120 between an outer surface of a screen 112 and a surface of a formation of interest 106 in a first position. The screen 112 illustrated in FIG. 3A has slots 302 that can be selectively opened or closed or otherwise activated and/or deactivated from the surface in some manner. For example the slots 302 may be engageable through electronic signals, hydraulic signals, actuated through a wireline, actuated through force communicated through the tubing 132 (e.g. downward force, upward force, and/or rotational force), and/or through any other operations understood in the art. In the first position as illustrated in FIG. 3A, the slots 302 are open allowing slurry 116 to flow into the screen 112 annulus 203 and thereby deposit particulates 118, 120. As shown in FIG. 3A, the slurry 116 carrier fluid 122 flows into the formation of interest 106, typically at an injecting pressure below the fracturing pressure, until the gravel pack 114 is fully placed.

The arrangement illustrated in FIG. 3A is exemplary only. With certain tools and arrangements the carrier fluid 122 may be returned directly to the surface instead of being injected into the formation of interest 106. For example, the slurry 116 may be pumped down the tubing-casing annulus 206, recirculated through the slots to tubing 132 and returned to the surface. Alternatively, the slurry 116 may be pumped down the tubing 132, forced out of the slots and recirculated through the screen, crossing over into the tubing-casing annulus 206 and returning to the surface. Each of these arrangements is well understood in the art and is not shown in FIG. 3A to avoid obscuring aspects of the present application.

Figure 3B:
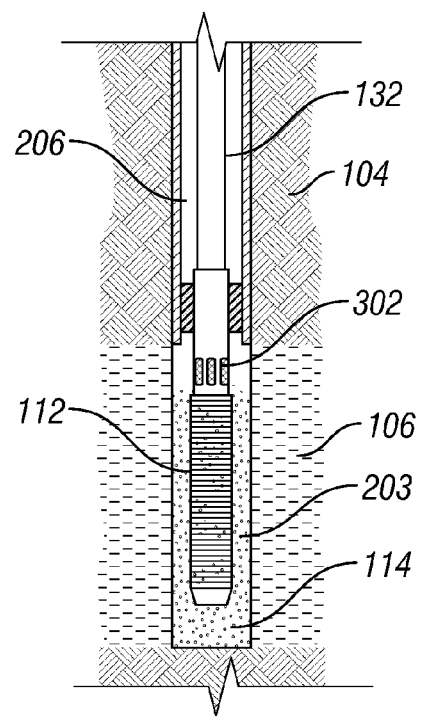
FIG. 3B is a schematic diagram of a device for depositing particulates between an outer surface of a screen and a surface of a wellbore formation in a second position.

FIG. 3B is a schematic diagram of one embodiment of a device for depositing particulates 118, 120 between an outer surface of a screen 112 and a formation of interest 106 in a second position. In the second position as illustrated in FIG. 3B, the slots 302 are closed, preventing the flow of carrier fluid 122 or slurry 116 through the slots. In the embodiment illustrated in FIG. 3B, formation fluid coming from the formation of interest 106 flows through the gravel pack 114 and screen 112, preventing sand or unconsolidated particulates from the formation of interest 106 from flowing into the wellbore or tubing 132. In the embodiment of FIG. 3B, any particles 118, 120 that may have settled inside the screen 112 may be cleaned out by recirculation (e.g. with a coiled tubing unit) and/or by entrainment within produced fluid from the formation of interest 106.

Figure 4A:
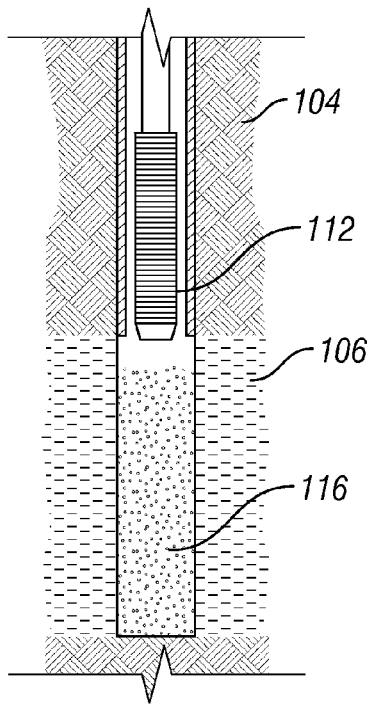
FIG. 4A is a schematic diagram of a device for depositing particulates between an outer surface of a screen and a surface of a wellbore formation in a first position.

FIG. 4A is a schematic diagram of one embodiment of a device for depositing particulates 118, 120 between an outer surface of a screen 112 and a formation of interest 106 in a first position. In the embodiment of FIG. 4A, a specified amount of slurry 116 is placed in the wellbore. The specified amount of slurry 116 depends upon the particulate loading of the slurry, the diameter of the wellbore, the length of the interval to be covered, the displacing volume of the screen 112 (which is lowered into the slurry 116), and similar parameters understood in the art. In certain embodiments, the slurry 116 placed at the bottom of the wellbore has a very high particulate loading, for example in excess of 3.6 kg of particulates 118, 120 per liter of carrier fluid 122. The screen 112 in the first position includes the screen 112 in position to be lowered into the slurry 116 but not yet placed in the slurry 116.

Figure 4B:
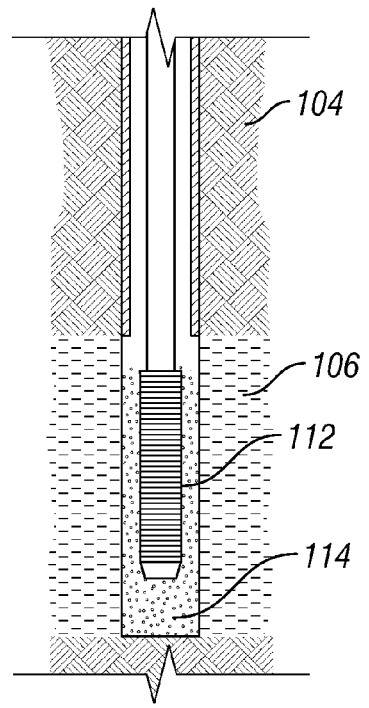
FIG. 4B is a schematic diagram of a device for depositing particulates between an outer surface of a screen and a surface of a wellbore formation in a second position.

FIG. 4B is a schematic diagram of one embodiment of a device for depositing particulates 118, 120 between an outer surface of a screen 112 and a formation of interest 106 in a second position. The screen 112 in the second position includes the screen 112 lowered into the slurry 116. In certain embodiments, the screen 112 may include centralizers such that the screen 112 is approximately centered in the wellbore. However, where the slurry 116 is dense from heavy particulate loading, the screen 112 tends to self-centralize and external centralizers may not be required.

Figure 4C:
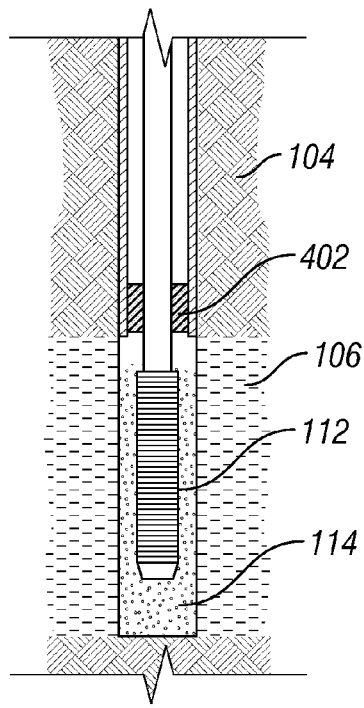
FIG. 4C is a schematic diagram of a device for depositing particulates between an outer surface of a screen and a surface of a wellbore formation in a third position.

FIG. 4C is a schematic diagram of one embodiment of a device for depositing particulates 118, 120 between an outer surface of a screen 112 and a formation of interest in a third position. In the third position, the screen 112 remains in the slurry 116, and production equipment (for example a production packer 402) is placed in the wellbore to prepare the system for production. In certain embodiments, the well is shut in for a specified time period to allow particulates 118, 120 in the slurry 116 to settle, to allow degradable particulates to decompose completely or partially, to allow carrier fluid 122 breakers to act on the carrier fluid 122, and/or to allow particulates with tackifiers to cure (e.g. with resin-coated particulates).

Figure 5:
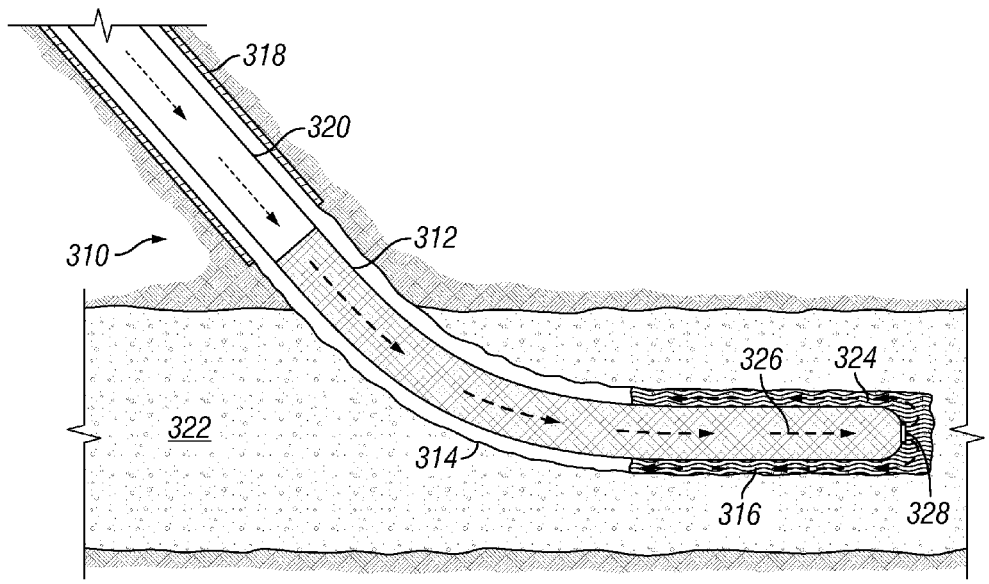
FIG. 5 is a schematic diagram of an embodiment of a device for depositing particulates between an outer surface of a screen and a wellbore formation using a bottoms up slurry deployment technique.

In certain embodiments, the slurry placement includes a "bottoms-up" method of pumping, which allows for gravel packing and/or fracturing immediately post-drilling, for gravel packing-while cementing, for the inclusion of chemical packers, and/or for the use of large diameter screens. FIG. 5 is an illustration of one embodiment of a device 310 comprising a generally cylindrical screen 312 positioned in a wellbore 314 forming an annulus 316 between the screen and the wellbore. In this embodiment, the wellbore 314 has a casing 318 cemented above an open hole and the screen 312 is disposed open hole below the casing 318 at the lower end of a pipe string 320, which can be a workstring, production tubing or the like. The embodiment is equally applicable to cased holes, which are generally perforated for communication with the surrounding formation 322, as well as non-horizontal wells. A high-solids slurry 324 comprising at least first and second particles can be passed through a central flow passage 326 through the screen 312 to discharge near what is referred to herein as the distal or bottom end 328 of the screen 312, into the annulus 316 to be deposited on an outer surface of the screen. Once deposited in the annulus 316, the packed slurry solids can be converted to a gravel pack as described herein.

Figure 6A:
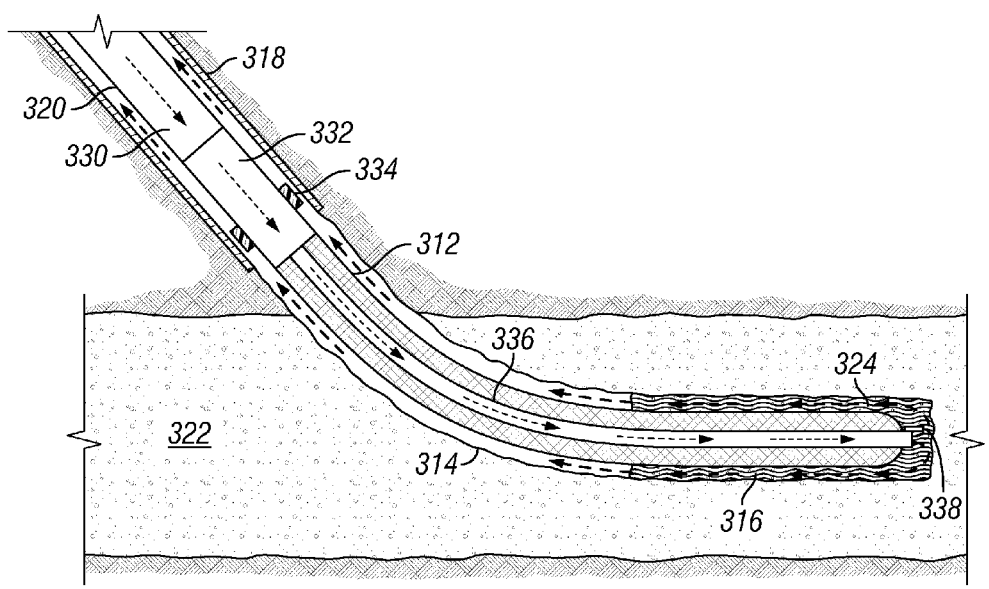
FIG. 6A is a schematic diagram of an embodiment of a device for depositing particulates between an outer surface of a screen and a wellbore formation using a bottoms up slurry deployment technique wherein the slurry is pumped through the screen assembly via a washpipe.
Figure 6B:
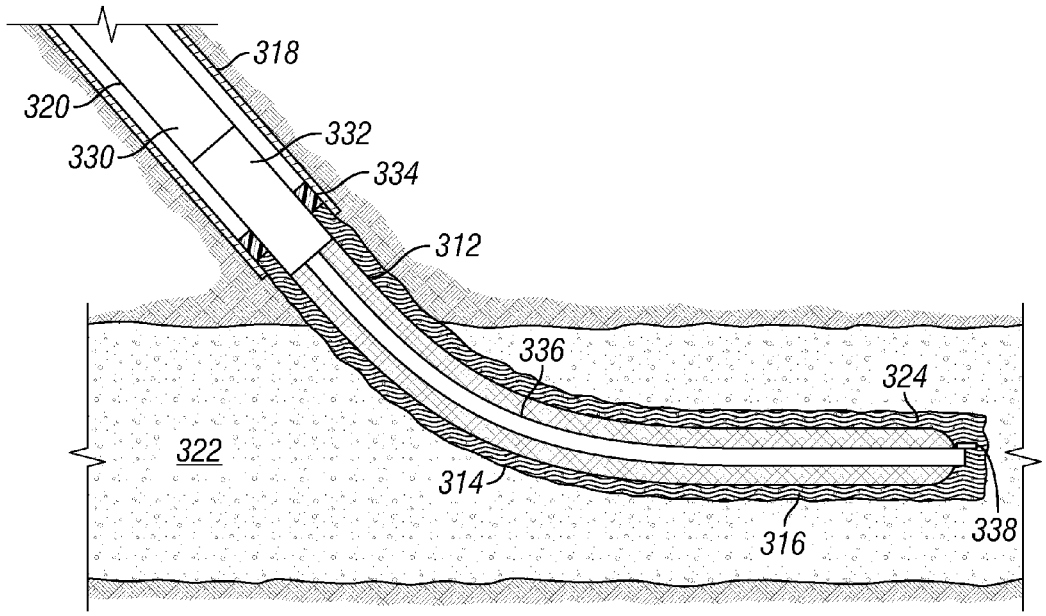
FIG. 6B is a schematic diagram of the embodiment of FIG. 6A following placement of the slurry and setting of the packers.

In one embodiment, "two-trip" gravel packing is achieved by using a workstring containing a packer assembly and washpipe to place the slurry/gravel and then removing the workstring and washpipe to attach production tubing. FIGS. 6A and 6B illustrate one embodiment of a bottoms-up placement apparatus similar to FIG. 5, wherein the pipe string 320 comprises a work string including drill pipe 330, a service tool 332 including packer 334, the screen 312, washpipe 336 and end cap 338, which allows the washpipe 336 to connect to the bottom of the assembly. Once in place as shown in FIG. 6A, slurry 324 is pumped down the drill pipe 330, through the washpipe 336, out the bottom of the assembly 332, and up into the annulus 316 between the open hole of the wellbore 314 and screen 312. After the proper amount of slurry is pumped, the packer 334 is set (see FIG. 6B), and the drill pipe 330, service tool assembly 332, and washpipe 336 are removed from the hole. The slurry 324 is converted into a gravel pack through methods described herein, for example, by self-triggered degradation, or through a suitable triggering fluid such as an acid, base, solvent, or other chemical.

The embodiment shown in FIGS. 6A and 6B allows placing a gravel pack which allows for a narrower gap between the screen 312 outer diameter and the well bore 314. For example, the gravel pack can have a thickness (radial thickness in annulus=wellbore radius−screen radius) as small as 10, 5 or even 3 times the median size of the gravel or other coarse fraction. In another embodiment, the thickness is less than 50 mm (2-in.) or less than 25 mm (1-in.). In a further embodiment, the gravel pack thickness is from about 6 to about 40 times the median size of the gravel or other coarse fraction of the slurry solids. In one specific embodiment, the gravel pack thickness is from 6 to 25 mm. The narrow gap means a larger screen 312 can be employed, and therefore a larger basepipe inside diameter, improving production of the well. For example the basepipe ID can be from 50 to 90 mm larger than a conventional gravel pack that is more than 50.8 mm (2-in.) thick.

Furthermore, the gravel pack can be pumped into formations 322 where the pore pressure is low, where other methods of gravel packing may lead to inadvertent formation fracturing. For example, some conventional gravel packing methods may require a relatively high injection rate, e.g. 1600 L/min (10 BPM), to maintain the gravel in suspension and prevent premature settling or bridging. In embodiments of the present invention wherein the slurry is stable and the solids do not easily settle, the rate can be selected for the optimum gravel placement, e.g. any non-zero injection rate less than 1600 L/min, 800 L/min, 600 L/min, 500 L/min, 400 L/min, 300 L/min, 250 L/min, 200 L/min, 150 L/min, 100 L/min, 50 L/min (less than 10, 5, 3.8, 3.1, 2.5, 1.9, 1.6, 1.3, 0.94, 0.63 bbl/min) or the like.

Figure 7:
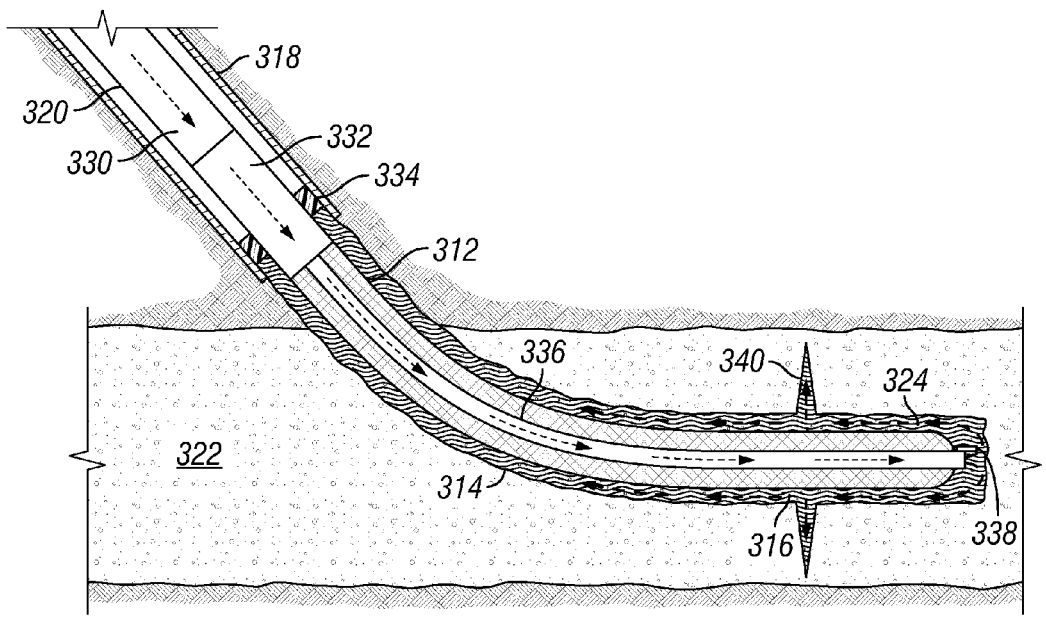
FIG. 7 is a schematic diagram of an embodiment of a device similar to that of FIG. 6 for depositing particulates in a fracture, as well as between an outer surface of a screen and a wellbore formation, using a bottoms up slurry deployment technique wherein the slurry is pumped through the screen assembly via a washpipe.

FIG. 7 is an illustration of one embodiment of a bottoms-up placement apparatus similar to FIGS. 6A and 6B wherein the packer 334 has been set before pumping the slurry 324 and the pressure built up in the region of annulus 316 while pumping the slurry to induce creation of the fracture 340 in the adjacent formation 322. The slurry 324 in an embodiment is pumped into the fracture 340 and subsequently converted to a gravel proppant pack as described herein.

In one embodiment, the slurry placement/gravel packing is achieved as a part of the final production run. This embodiment of the method can eliminate the need for a dedicated gravel pack run. Once the slurry is converted to a gravel pack in this embodiment, production can usually begin immediately. The slurry is placed using a bottoms-up placement apparatus similar to FIG. 5, wherein the screens are run in hole using a production assembly including production tubing complete with appropriate production accessories, and wherein the screen 312 is blocked with a device or material 342 such that inflow is eliminated and the screen assembly is essentially a tubular flow conduit. In an embodiment shown in FIG. 8A, the screen 312 is an assembly of a perforated base pipe 344, axial profile rods 346, screen element 348, and outer coating 342. The coating 342 can be, for example, a thin impermeable sheet of film of a degradable material such as polylactide (PLA), polyglycolide (PGA), or another material that can plug the screen openings temporarily for gravel placement, but which can then be degraded or dissolved for production. As another example, the degradable material can alternatively and/or additionally be placed as plugs or bridges in the respective openings of the screens and/or between the screen element 348 and the base pipe 344, e.g., by dipping or spraying or otherwise applying a removable solid- or film-forming material to the assembled screen 312 (see the discussion of FIGS. 20 to 22 below for plugging or bridging the screen openings down-hole), or prior to final assembly, the screen element 348 and/or base pipe 344.

Once the assembly is in place, slurry is pumped down the tubing; through the flow passage in the screen 312, which can be located centrally within the screen element or peripherally adjacent the screen element; out the bottom of the assembly, which can comprise an opening through the end 328; and up into the area of the annulus 316 between the open hole 320 and screen 312, as shown schematically in FIG. 5. After the proper amount of slurry 324 is pumped, the packer is set, the slurry is converted to a gravel pack, and also the coating 342 is removed to open the screen 312, as seen in FIG. 8B. The slurry is converted into a gravel pack through methods described herein, either by self-triggered degradation, or through a suitable triggering signal or fluid such as an acid, base, solvent, or other chemical. Furthermore, any blockage of the screens 312, e.g. an impermeable surface film or blockage in the through ports, for example—is removed.

FIG. 9 is an illustration of one embodiment of a screen assembly for a bottoms-up placement apparatus using a blocked screen similar to FIGS. 8A and 8B, wherein the screen 312 contains a degradable or dissolvable plug 350 within the perforations 352 of the base pipe 344 to prevent flow across the screen 312 during slurry placement.

FIG. 10 shows fluid flow through the screen elements 348, between the axial profile rods 346 and through the perforations 352 following removal, e.g., by degradation, of the plugs 350.

Figure 11:
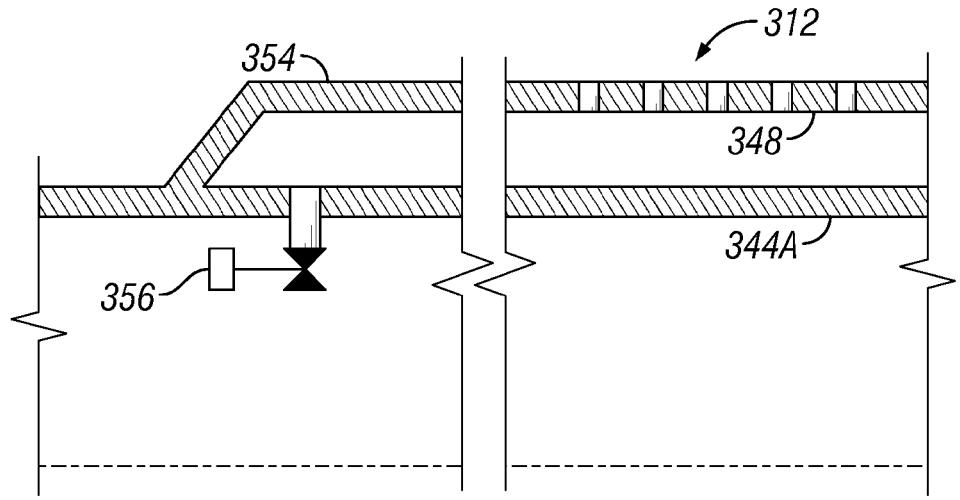
FIG. 11 is a longitudinal cross sectional schematic diagram of an alternate embodiment of the devices of FIGS. 8A, 9 wherein inflow through the screens is blocked using a mechanical inflow control device.

FIG. 11 is an illustration of another embodiment of a screen assembly for a bottoms-up placement apparatus using a blocked screen similar to FIGS. 8A-10, wherein the screen 312 is operatively associated with a mechanical inflow-control device (ICD) 354 to control flow through the openings in the screen 312. The ICD 354 is used with an impermeable basepipe 344A and can be activated by controller 356 via a suitable remote method such as a slickline or wireline, or the controller 356 can be a timer to allow flow at a prescribed time after the assembly is run in hole.

Figure 12:
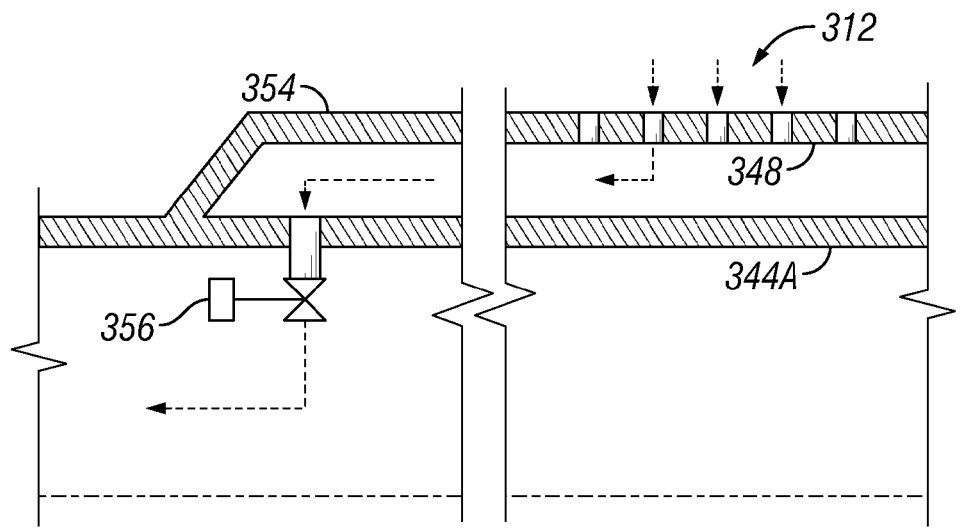
FIG. 12 is a longitudinal cross sectional schematic diagram of the device of FIG. 11 following actuation of the mechanical inflow control device for production.

FIG. 12 shows fluid flow through the screen elements 348 and the ICD 354 following flow actuation.

In one embodiment, the slurry placement/gravel packing is achieved using chemical packers with the gravel pack. As best seen in the embodiment shown in the schematic diagram of FIG. 13, the screen 312 is run in hole using apparatus similar to that shown in FIGS. 5-12, except that a mechanical packer 334 is not necessarily required. Instead, a chemical compound slug 360 is run ahead of a slurry volume 362, such that at the appropriate time the chemical slug 360 seals between the tubing 320 and the annulus 316, concentrating production flow through the screen 312. The chemical compound slug 360 can include in some embodiments, phenolic resins, urethane compounds or the like, that are known to the art for employment in chemical packers and bridge plugs. In one embodiment, the workstring 320 comprises production tubing. If desired, in an embodiment, additional spacer chemical compound slugs 364 can be alternated with slurry volumes 362 to obtain intermittent spacing of resin plugs within the gravel pack and thus create zonal isolation.

Figure 13:
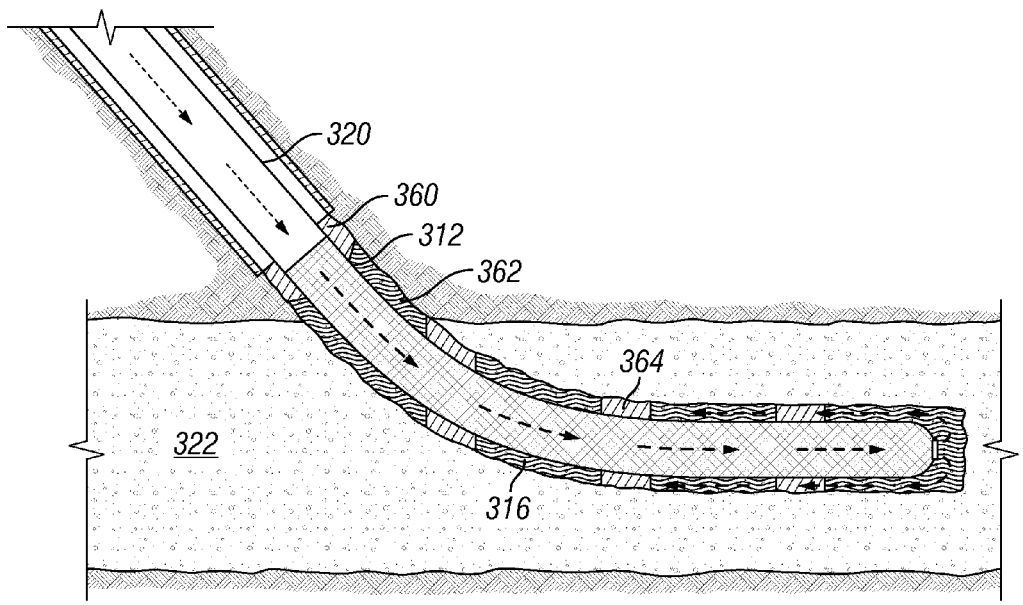
FIG. 13 is a schematic diagram of an embodiment of a device for depositing particulates between an outer surface of a screen and a wellbore formation using a bottoms up slurry deployment technique with chemical packers.
Figure 14:
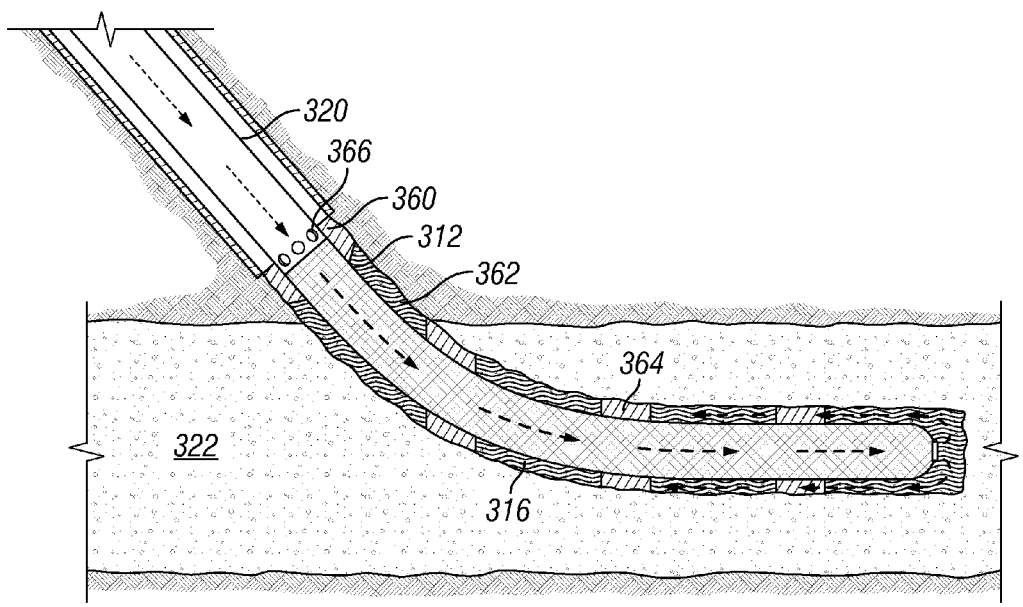
FIG. 14 is a schematic diagram of an embodiment of a device for depositing particulates between an outer surface of a screen and a wellbore formation using a bottoms up slurry deployment technique with a diversion port for chemical packers.

FIG. 14 is an illustration of another embodiment of a screen assembly for a bottoms-up placement apparatus using a chemical resin plugs 360 and/or 364 similar to FIG. 13, except that the assembly includes one or more diversion ports 366 above the screen 312, which can be activated by traditional mechanical means, e.g., a ball, sleeve, wireline, or the like. The chemical resin plug 360 is not necessarily pumped ahead of the slurry volume 362, but can alternatively or additionally be pumped through the diversion port 366. This facilitates precise placement of the slug 360 in a prescribed position above the screen 312.

Figure 15:
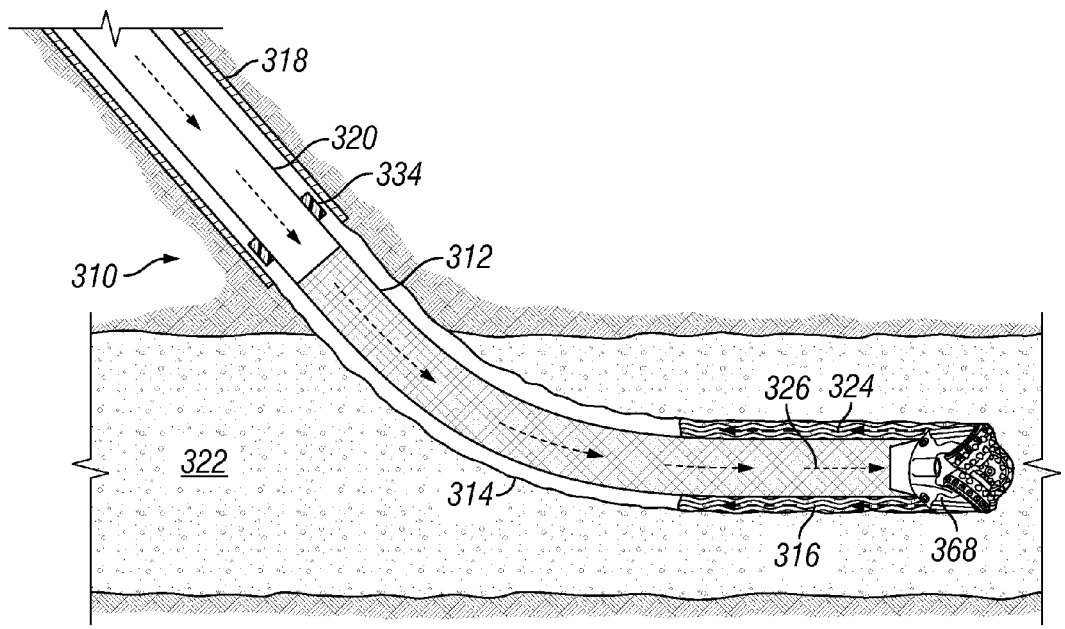
FIG. 15 is a schematic diagram of an embodiment of a device for depositing particulates between an outer surface of a screen and a wellbore formation using a bottoms up slurry deployment technique wherein the screens are run during drilling.

In one embodiment, the slurry placement/gravel packing is achieved as a part of the drilling process. This embodiment of the method can eliminate the need for a dedicated gravel pack run, and in a further embodiment the screen 312 is placed in the same manner as a slotted liner would be. FIG. 15 is an illustration of one embodiment of a bottoms-up placement apparatus similar to FIG. 5, wherein the screens are run in hole using a drilling assembly wherein the workstring 320 comprises drill pipe complete with appropriate drilling accessories, such as, for example, a liner packer 334 as discussed in connection with FIGS. 6A to 7, screen 312, and a drill bit assembly 368, which can also include measurement-while-drilling capability. The screens 312 in alternate embodiments may or may not have restricted inflow as discussed in connection with FIGS. 8A to 12, e.g., a film outside the screens, plugs within the base pipe, or mechanical and/or timed inflow control devices.

The final length of the hole 314 is drilled with the screens 312 as shown in FIG. 15, and once on depth, the drill bit 368 is abandoned down hole. The slurry is then pumped through the drill bit 368, and up the annulus 316. If desired, any plugging material can follow the slurry to seal off the bottom of the hole 314 below the drill bit 368. The liner packer 334 is then set, the slurry is converted to a gravel pack as described herein, production tubing is put in place and production initiated. In an alternative embodiment, the liner packer 334 can be set first to initiate hydraulic fracturing as discussed in connection with FIG. 7 above, and the slurry is transformed into a gravel/proppant pack. As further alternatives, chemical packers and spacers can additionally or alternatively to the liner packer 334 be employed as discussed in connection with FIGS. 13 and 14. In addition to eliminating the need for a dedicated gravel pack run, as well as placing the screens in the same manner as a slotted liner would be, the large ID of the screens can allow a greater inflow and therefore a greater production through the tubing.

Figure 16:
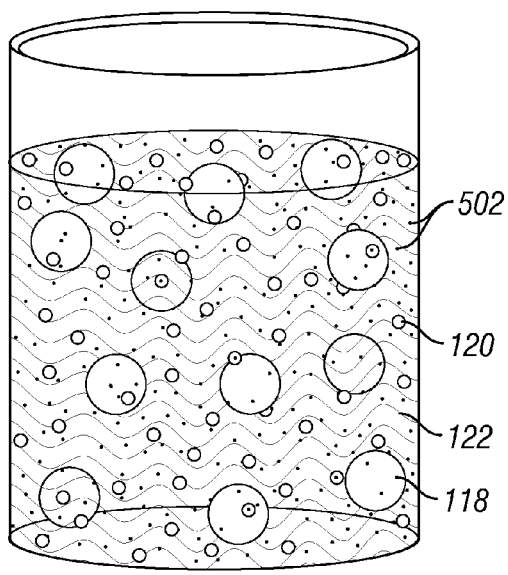
FIG. 16 is an illustration of a carrier fluid combined with a first, second, and third amount of particles in a slurry.

FIG. 16 is an illustration of one embodiment of a carrier fluid 122 combined with a first 118, second 120, and third 502 amount of particles in a slurry 116. The particulates 118, 120, 502 in an embodiment comprise three size regimes, wherein each size regime is three to fifteen times larger than the next smaller size regime. The inclusion of varying size particulates 118, 120, 502, with a high particulate loading, creates a slurry 116 with greatly reduced settling times relative to a slurry 116 with a uniform particle size.

Further, the amount of carrier fluid 122 per unit volume of slurry 116 can be reduced dramatically. For example, spherical particles with a uniform packing arrangement create a packing volume fraction (PVF) of about 0.74, i.e., where about 74% of the slurry volume is particulate matter. Monodisperse spherical particles with a random close packing arrangement create a PVF of about 0.64. By contrast, an arrangement with three particulate sizes having average diameters, in one example, of 840 microns, 150 microns, and 15 microns, respectively, creates a mixture of particles having a PVF of about 0.87. The base densities of the particles 118, 120, 502 may be selected to create a final slurry density at a selected value. An increase in PVF reduces the amount of carrier fluid 122 in the final slurry 116. For example, an increase from 0.64 (random packing) to just 0.80 reduces the amount of carrier fluid 122 in a liter of slurry by nearly 50% (i.e. (36-20)/36). The reduced carrier fluid 122 amount reduces the amount of fluid placed in the formation of interest 106 and the amount of viscosifier (if any) in the gravel pack 114, which all contribute to a reduction in permeability damage to the formation of interest 106 and a reduction in permeability damage to the gravel pack 114.

In certain embodiments, the slurry 116 includes at least a first amount of particulates 118 having a first average size distribution and a second amount of particulates 120 having a second average size distribution. In certain embodiments, the first amount of particulates 118 are non-deformable particulates. The average size distribution is determined according to any method understood in the art, at least including a mesh screen size number (e.g., 16/30 mesh sand, 20/40 mesh sand or 40/70 mesh sand), a mean particle size, and a median particle size. The average size distributions of the first amount of particulates 118 and the second amount of particulates 120 are selected in an embodiment such that the first average size distribution is between three and fifteen times larger than the second average size distribution. The average size distributions of the first amount of particulates 118 and the second amount of particulates 120 are further selected to prevent migration of formation fines through the gravel pack 114 into the well 102. In certain embodiments, a larger size distribution (e.g. the first size distribution to the second size distribution, or the second size distribution to a third size distribution) is a value between six and ten times larger.

Distributions between six and ten times in this embodiment allow maximal packed volume fraction (PVF) values while providing a gravel pack that does not shrink, or lose pack efficiency, if smaller particle sizes are removed.

In certain embodiments, the slurry 116 includes a third amount of particulates having a third average size distribution, where the second average size distribution is larger than the third size distribution, for example, between three and fifteen times larger than the third size distribution. For example, the first average size distribution may be a median size of about 840 microns, the second average size distribution may be a median size of about 150 microns, and the third average size distribution may be a median size of about 15 microns.

In certain embodiments, the slurry 116 includes a fourth and/or a fifth amount of particulates. The fourth amount of particulates in one embodiment includes a fourth average size distribution that is smaller than the third average size distribution, for example, between three and fifteen times smaller than the third average size distribution. The fifth amount of particulates in one embodiment includes a fifth average size distribution that is smaller than the fourth average size distribution, for example, between three and fifteen times smaller than the fourth average size distribution.

In a further embodiment, the solids mixture comprises four or more PSD modes to form the bridge on the screen, wherein a first amount of particulates have a first PSD, a second amount of particulates have a second PSD, a third amount of particulates have a third PSD, and a fourth amount of particulates have a fourth PSD, wherein the first average size distribution is at least three times larger than the second average size distribution, wherein the second average size distribution is larger than the third average size distribution, preferably at least three times larger than the third average size distribution, and wherein the third average size distribution is larger than the fourth average size distribution, preferably from three to fifteen times larger than the fourth average size distribution. In one embodiment, the first average size distribution is 40 mesh (422 micron) or larger, and in another comprises standard 20/40 mesh (422-853 microns) gravel. In one example, the first PSD is about 280 microns, the second PSD about 30 microns, and the third PSD about 3 microns. In one embodiment, a ratio of the total solids volume of the first particles to the total solids volume of the second particles is from about 1:1 to about 15:1, preferably from about 2:1 to about 10:1 or from about 4:1 to about 8:1; and a ratio of the total solids volume of the second particles to the total solids volume of the third particles is from about 1:10 to about 2:1, preferably from about 1:4 to about 1:1.

In another embodiment, a carrier fluid and a solids mixture are combined to form a flowable slurry adapted to form a bridge on a screen to inhibit fluid entry while the screen and the slurry are disposed in a wellbore, in any order. In an embodiment the solids mixture comprises a plurality of volume-averaged particle size distribution (PSD) modes such that a packed volume fraction (PVF) of the solids mixture exceeds 0.75, or preferably exceeds 0.8. In an embodiment, the solids mixture comprises three or more PSD modes to form the bridge on the screen, wherein a first amount of particulates have a first PSD, a second amount of particulates have a second PSD, and a third amount of particulates have a third PSD, wherein the first PSD is from two to ten times larger than the second PSD, and wherein second PSD is from three to ten times larger than the third PSD. In one embodiment, the first amount of particulates is smaller than about 40 mesh (422 microns), and in another embodiment the first amount of particulates comprises 40/80 mesh (178-422 microns) gravel. In one example, the first PSD is about 280 microns, the second PSD about 30 microns and the third PSD about 3 microns. In one embodiment, a ratio of the total solids volume of the first particles to the total solids volume of the second particles is from about 1:1 to about 15:1, preferably from about 2:1 to about 10:1 or from about 4:1 to about 8:1; and a ratio of the total solids volume of the second particles to the total solids volume of the third particles is from about 1:10 to about 2:1, preferably from about 1:4 to about 1:1.

The median size used herein may be any value understood in the art, including for example and without limitation a diameter of roughly spherical particulates. In certain embodiments, the median size may be a characteristic dimension, which may be a dimension considered most descriptive of the particles for specifying a size distribution range. In certain embodiments, the first amount of particulates have a characteristic dimension, for example and without limitation a median particle diameter, between about 500 microns and 1800 microns. In certain embodiments, the first amount of particulates includes a median particle volume between about $2 \times 10^{-11}$ $m^3$ and $6 \times 10^{-10}$ $m^3$. Other volume ranges will be understood by those of skill in the art to be functional according to the principles described herein, and all relevant values of particles sizes for gravel packing are contemplated herein.

In certain embodiments, each median size is a characteristic dimension, where the ratio of characteristic dimensions between particle sizes (e.g. first amount of particulates compared to second amount of particulates) is proportional to a cube root of a ratio of average particle volumes between particle sizes. For example, the first amount of particulates may have a characteristic dimension of $1.5 \times 10^{-3}$ m and an average particle volume of $5.63 \times 10^{-10}$ $m^3$. The second amount of particulates in the example has an average particle volume between about $1.7 \times 10^{-13}$ $m^3$ to $2.1 \times 10^{-11}$ $m^3$, with a characteristic dimension between $1 \times 10^{-4}$ m and $5 \times 10^{-4}$ m which includes the range from one-third to one-fifteenth the characteristic dimension of the first amount of particulates.

The characteristic dimension is used herein to more clearly indicate that the size selection of the particles in the first and second (and/or third, fourth, and fifth) particulate amounts are independent of the shape of the particles. Therefore, in various embodiments the particle sizes can vary in each particle size step by three to fifteen times in any average linear measure, and/or by $3^3$ times to $15^3$ times (i.e. 27 to 3375 times). The relative sizing of the particulates in embodiments may meet either the linear criteria 3 to 15 times, or the volumetric criteria $3^3$ times to $15^3$ times, or both. In certain embodiments, utilizing a narrower range of 5 to 10 times (characteristic dimension or linear measure) provides greater settling time improvement and therefore allows higher particulate loadings and/or lower carrier fluid 122 viscosities.

The carrier fluid 122 may in various embodiments be a brine, a fluid including a hydratable gel (e.g. a guar, other polysaccharide, hydroxyethyl-cellulose "HEC", or other gelling agent), an oil or oil-based gel, a viscoelastic surfactant, a fluid with a viscosifier, a foamed or "energized" fluid (e.g. a nitrogen or $CO_2$ based foam), an emulsion (including water or oil in the external phase), or other fluid known in the art.

In certain embodiments, the mixing of particulates 118, 120 with size ratios as described herein allows high particulate loadings with a low or zero viscosifier loading. In certain embodiments, the carrier fluid 122 includes a brine with no viscosifiers, and the sum of the mass of the particulates (i.e. the first amount, second amount, and/or any third or other amounts combined) is at least about 2.4 kg per liter of carrier fluid 122 (20 pounds per gallon). In certain embodiments, the carrier fluid includes a hydratable gelling agent present in an amount less than about 2.4 g gel per liter of carrier fluid (20 lb gel per 1000 gallons), for example less than 2.15 g/L (18 lb gel per 1000 gallons of carrier fluid), and the sum of the mass of the particulates exceeds about 2.75 kg per liter (23 pounds per gallon) of carrier fluid 122. In certain embodiments, the carrier fluid 122 includes a viscosifier present in an amount less than 20 lb per thousand gallons of carrier fluid 122, and the sum of the mass of the particulates exceeds about 2.75 kg per liter (23 pounds per gallon) of carrier fluid 122. In certain embodiments, the carrier fluid 122 includes a viscosifier present in an amount less than 2.4 g gel per liter (20 lb gel per 1000 gallons) of carrier fluid 122, and the sum of the mass of the particulates exceeds about 3.6 kg per liter (30 pounds per gallon) of carrier fluid 122.

In an embodiment, the solids loading in the slurry can be expressed as a volumetric ratio of solids to carrier fluid. In one embodiment, a minimum volume of the liquid (maximum volumetric solids loading) corresponds to the solids:carrier fluid volumetric ratio in the slurry corresponding to the PVF for the solids mixture, i.e. PVF:(1-PVF), or a slight excess of liquid to impart rheological characteristics to the slurry, whereas too much excess carrier liquid might induce instability of the slurry (solids settling or syneresis). In one embodiment, the solids:carrier fluid volumetric ratio is from about 40:60 up to PVF:(1-PVF), and in another embodiment from 45:55 to 85:15. In other embodiments, the volume fraction of the carrier fluid is from stoichiometric (1-PVF) or from above stoichiometric up to 3, 2.5, 2, 1.5, 1.25, 1.2, 1.1 or 1.05 times stoichiometric, or stated differently, the volumetric solids fraction is from (3PVF-2), (2.5PVF-1.5), (2PVF-1), (1.5PVF-0.5), (1.25PVF-0.25), (1.2PVF-0.2), (1.1PVF-0.1) or (1.05PVF-0.05) up to PVF.

The limits for minimum viscosifier loading and maximum particulate loading depend upon factors specific to each system 100 that will ordinarily be understood or controlled by those of skill in the art. For example, the settling time of the particulates 118, 120 in the carrier fluid 122, the viscosity of the carrier fluid 122, the intended pumping rate of the slurry 116, the length of the screen 112 interval wherein the gravel pack 114 is to be placed, the fracture strength of the formation of interest 106, and other factors known to those of skill in the art all contribute to the viscosifier loading required in a particular application. Using only brine as a carrier fluid 122 with the layered particulate sizes 118,120, including a third and/or additional particulate sizes, slurries 116 have been developed with particulates exceeding 2.4 kg per liter (20 lb per gallon) of carrier fluid 122, and in certain applications the particulates can exceed 3.6 kg per liter (30 lb per gallon) of carrier fluid 122.

In certain embodiments, at least one of the smaller particulate sizes (i.e. the second, third, fourth, and/or fifth amount of particulates) include a degradable material. The inclusion of degradable material allows the particulates to participate in improving suspension of particles in the slurry 116, while allowing the particles to be removed in the gravel pack 114 after placement, and/or to allow the particles to release beneficial chemicals into the gravel pack 114 after placement. For example, the degradation of the particulates may release chemicals that dissolve bridging agents, break crosslinked or polymer-based carrier fluid 122, and/or that attack a filter cake formed.

Examples of degradable materials include, without limitation, wax, oil-soluble resin, materials soluble in hydrocarbons, lactide, glycolide, aliphatic polyester, poly(lactide), poly(glycolide), poly(ϵ-caprolactone), poly(orthoester), poly (hydroxybutyrate), aliphatic polycarbonate, poly(phosphazene), poly(anhydride), poly(saccharide), dextran, cellulose, chitin, chitosan, protein, poly(amino acid), polyethylene oxide), and copolymers including polylactic acids) and/or poly(glycolic acids), and the like. In certain embodiments, degradable materials may include a copolymer including a first moiety that is a hydroxyl group, a carboxylic acid group, and/or a hydrocarboxylic acid group, and a second moiety that is a glycolic acid and/or a lactic acid.

In certain further embodiments, at least one of the smaller particulate sizes includes a reactive solid that reacts with a hydrolysis product of a degradable material. For example, the second amount of particulates 120 may be a degradable material and the third amount of particulates may be a material that reacts with the hydrolysis product of the second amount of particulates 120, enhancing the rate of degradation of the second amount of particulates 120. In certain embodiments, the reactive solid includes ground quartz, oil soluble resin, degradable rock salt, clay, and/or zeolite or the like. In certain embodiments, the reactive solid includes magnesium hydroxide, magnesium carbonate, magnesium calcium carbonate, calcium carbonate, aluminum hydroxide, calcium oxalate, calcium phosphate, aluminum metaphosphate, sodium zinc potassium polyphosphate glass, and/or sodium calcium magnesium polyphosphate glass or the like. The degradable materials and reactive solids that enhance degradation may be stored on the same particle, such that reactions do not occur at the surface but begin within the fluids at downhole conditions.

In certain embodiments, the slurry comprises a carrier fluid and a solids mixture, wherein the solids mixture comprises a plurality of volume-averaged particle size distribution (PSD) modes, wherein a first PSD mode comprises solids having a volume-average median size at least three times larger than the volume-average median size of a second PSD mode such that a packed volume fraction (PVF) of the solids mixture exceeds 0.75 or preferably exceeds 0.8, and wherein the solids mixture, preferably the second PSD mode, comprises a degradable material and includes a reactive solid.

In one embodiment, the first PSD mode comprises gravel and the second PSD mode comprises alumina trihydrate particles. Alumina trihydrate particles become soluble at elevated or depressed pH, and thus can be degraded by changing a pH in the pack to solubilize the alumina trihydrate particles. In another embodiment, the degradable material can be soluble in either basic or acidic fluids, and can be degraded by increasing or decreasing the pH, respectively, to dissolve the particles, e.g., by contacting the solids pack with a basic aqueous solution or an acidic aqueous solution. For example, the degradable material can be selected from amphoteric oxides, esters, coated acids, combinations thereof, and the like. Acid precursors which can be mentioned as suitable particulates include hydrolyzable esters, acid anhydrides, acid sulfonates, acid halides, combinations thereof and the like. As another example, the solids mixture can include a base or base precursor, which can in some embodiments be sparingly soluble or encapsulated. Representative classes of bases include alkali metal and ammonium hydroxides, organic amines, urea, substituted urea, combinations thereof and the like. Specific representative examples of acid soluble particulates include oxides and hydroxides of aluminum, zinc, tin, lead, boron, silicon and iron; carbonates, sulfates, oxides and hydroxides of calcium, magnesium and barium; combinations thereof and the like.

In one embodiment, the degradable second PSD mode can be or include an encapsulated water- or oil-soluble solid, and can be degraded by de-encapsulating the soluble solid and contacting the solids pack with aqueous or hydrocarbon fluid, e.g., with reservoir fluids. In another embodiment, the degradable particulates can be or include a water-soluble solid and the carrier fluid can be a saturated aqueous solution of the water-soluble solid, whereby degradation can be effected by contacting the pack with an undersaturated aqueous medium. For example, the soluble particulates can be or include salt and the carrier fluid can be brine. In another embodiment, the degradable particulates can be or include a water-soluble solid, and the carrier fluid can be an invert oil emulsion wherein the water-soluble solid is dispersed in an oil phase, whereby the degradation can be effected by breaking the emulsion to dissolve the water-soluble solid in an aqueous medium. The emulsion can be broken, for example, by contacting the pack with a de-emulsifier, pH control agent or the like. Representative pH control agents which may be mentioned include monoesters, polyesters, weak acids, weak bases, urea, urea derivatives, combinations thereof and the like.

In certain embodiments, at least one of the amount of particulates (e.g., first through fifth) includes an encapsulated breaker that reduces the viscosity of the carrier fluid 122 after placement of the gravel pack 114 reducing permeability damage of the pack 114. In certain embodiments, the carrier fluid 122 includes an emulsion, and at least one of the amount of particulates includes a chemical adapted to assist in breaking the emulsion. In certain further embodiments, the chemical adapted to assist in breaking the emulsion is encapsulated and/or included on a coated particle, such that the chemical is not released to break the emulsion until after the gravel pack 114 is placed. In certain further embodiments, one or more of the amount of particulates comprises coated particles, such that the particles do not begin to degrade and/or release chemicals, breakers, solvents, and/or surfactants or the like until after the gravel pack 114 is placed. Any coating on a particle may be adapted to break down with time, temperature, fluids expected to be encountered in the wellbore, chemicals or reactive solids included on other particles and/or in the carrier fluid 122 that are released under other mechanisms.

In one exemplary embodiment, the carrier fluid 122 comprises an emulsion, the second amount of particulates includes a surfactant that breaks the emulsion and the second amount of particulates are coated with a material that breaks down in the presence of a chemical in the third amount of particulates. In the example, the third amount of particulates includes a coating that degrades in the presence of hydrocarbons (e.g. as produced from the formation of interest 106) that releases the chemical breaking down the coating on the second amount of particulates. Similar configurations of particles, coatings, chemicals, and the like are contemplated in the present application.

In certain embodiments, one or more of the particulates includes a formation face damage removal agent. The damage removal agent may be a chemical (e.g. an acid and/or an oxidizer) structured to remove formation face damage, and/or a physical agent (e.g. particles of a specific shape, size, or material to break an emulsion). The damage removal agent may be any damage removal material known in the art, and may be included in any of the particulates. Further, and without limitation, the damage removal agent may be within a particle that enters the fluid in the wellbore on dissolution, and/or is embedded within a coated particle. The formation face may have permeability damage from the gravel pack fluid filter cake, from a fluid loss agent in the gravel pack, from a drilling mud filter cake, from a fluid loss agent in the drilling mud, and/or residual damage from a pill (e.g. a high viscosity pill pumped during drilling to stop fluid loss) pumped during drilling or completion of the wellbore. The fluid loss agent can be, for example, a latex dispersion of polyvinylidene chloride, polyvinyl acetate, polystyrene-co-butadiene; a water soluble polymer such as hydroxyethylcellulose (HEC), guar, copolymers of polyacrylamide and their derivatives; particulate fluid loss control agents in the size range of 30 nm-1 μm such as γ-alumina, colloidal silica, $CaCO_3$, $SiO_2$, bentonite etc.; particulates with different shapes such as glass fibers, flakes, films; and any combination thereof or the like.

In certain embodiments, the amount of particulates 118, 120 comprise particles having an aspect ratio of greater than or equal to one, preferably greater than or equal to 6, 10, 25, 50, 100, 200 or 300. In certain embodiments, particles with a higher aspect ratio have enhanced surface area per unit volume and enhance degradation and/or reaction rates for the particles. In certain embodiments, the amount of particulates 118, 120 comprises particles having a nano-structure, microstructure, or mesoporous structure that enhance the surface area of the particles. The structures of the particles may be fractal or non-fractal. In certain embodiments, at least one of the particulates 118, 120 includes a tackifying agent such as a resin-coating.

Figure 17:
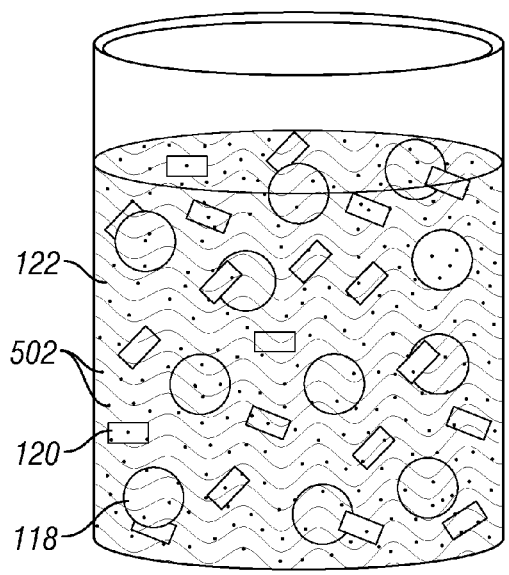
FIG. 17 is an illustration of a carrier fluid combined with a first, second, and third amount of particles in a slurry.

FIG. 17 is an illustration of one embodiment of a carrier fluid 122 combined with a first 118, second 120, and third 502 amount of particles in a slurry. In the illustration of FIG. 17, the second amount of particulates 120 include particulates having an aspect ratio greater than one. The aspect ratio may be defined in any direction desired. In the second amount of particles 120 illustrated in FIG. 17, the particles are elongated, but may comprise flakes, disks, ellipsoids, fibers, or any other particulate shapes known in the art. Any of the first amount of particulates 118, second amount of particulates 120, third amount of particulates 502, the fourth amount of particulates (not shown), and/or the fifth amount of particulates (not shown) may comprise a non-spherical shape. In certain embodiments, the first amount of particulates 118 comprise the primary particulate making up the "gravel," and the first amount of particulates 118 are approximately spherical to maximize permeability of the gravel pack 114.

The schematic flow diagram and related description which follows provides an illustrative embodiment of performing operations for low damage gravel packing. Operations illustrated are understood to be exemplary only, and operations may be combined or divided, and added or removed, as well as re-ordered in whole or part, unless stated explicitly to the contrary herein.

Figure 18:
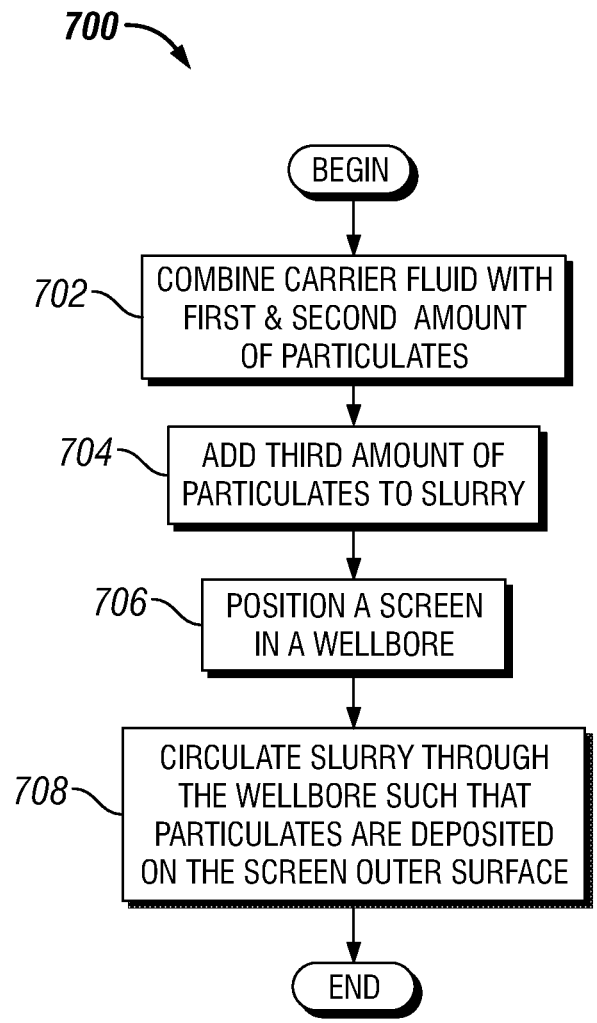
FIG. 18 is a schematic flow diagram of operations for low damage gravel packing.

FIG. 18 is a schematic flow diagram of one embodiment of a procedure 700 for low damage gravel packing. The procedure 700 includes an operation 702 to combine a carrier fluid, a first amount of particulates, and a second amount of particulates into a slurry, where the first amount of particulates have a first average size distribution and the second amount of particulates have a second average size distribution, where the first average size distribution is at least five times larger than the second average size distribution, and where the first amount of particulates comprise non-deformable particulates. In certain further embodiments, the procedure 700 includes an operation 704 to combine a third amount of particulates with the slurry, where the third amount of particulates have a third average size distribution, and where the second average size distribution is at least five times larger than the third average size distribution.

The method 700 further includes an operation 706 to position a screen in a wellbore, and an operation 708 to circulate slurry through the wellbore such that the first amount of particulates and the second amount of particulates are deposited on an outer surface of the screen. In different embodiments, operations 706 and 708 can be implanted in either order, e.g., by first circulating the slurry into the wellbore and then positioning the screen in the slurry. In certain embodiments, circulating the slurry through the wellbore comprises flowing the slurry into a formation of interest, and flowing the slurry back out of the formation of interest such that particulates from the slurry are deposited on the outer surface of the screen.

Figure 19A:
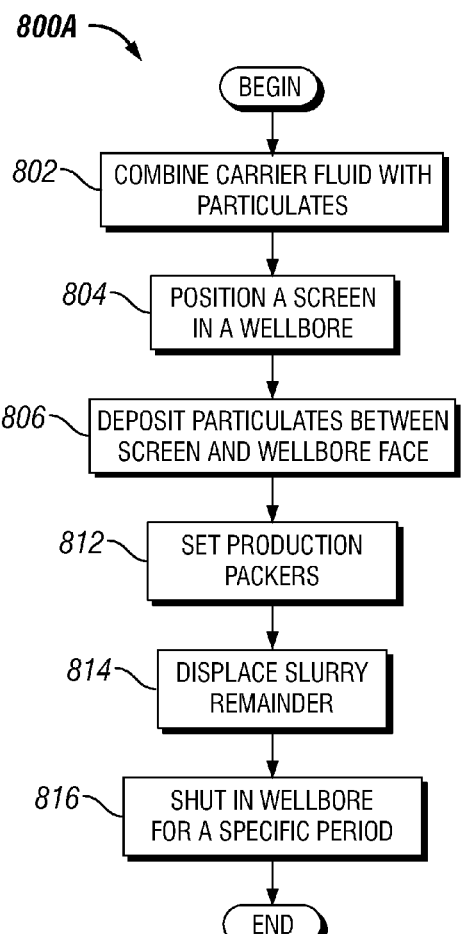
FIG. 19A is a schematic flow diagram of a technique for low damage gravel packing using a screen-first procedure.
Figure 19B:
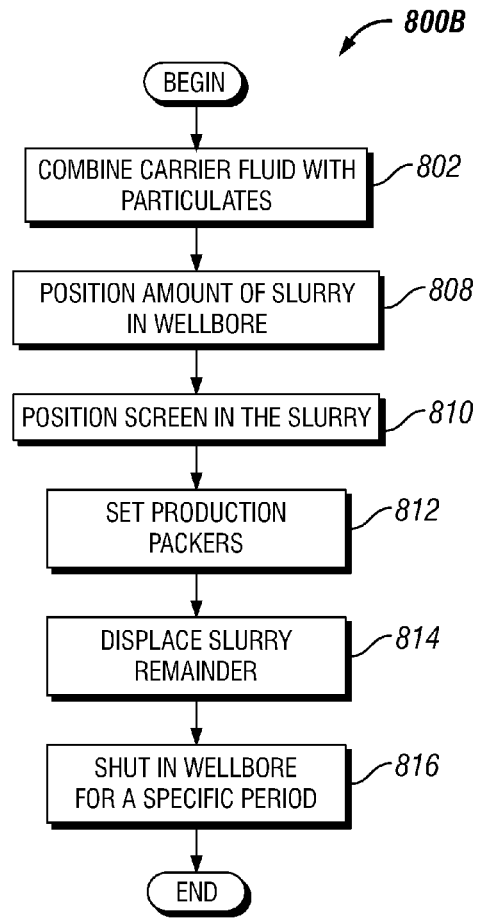
FIG. 19B is a schematic flow diagram of a technique for low damage gravel packing using a slurry-first procedure.

FIGS. 19A and 19B are schematic flow diagrams of two related embodiments of techniques 800A, 800B for low damage gravel packing. The techniques 800A, 800B include an operation 802 to combine a carrier fluid, a first amount of particulates, a second amount of particulates, and/or a third amount of particulates into a slurry. The first amount of particulates have a first average size distribution, the second amount of particulates have a second average size distribution, and the third amount of particulates have a third average size distribution. In an embodiment, the first average size distribution is at least three times larger than the second average size distribution, and the first amount of particulates comprise non-deformable particulates. The second average size distribution is larger than the third average size distribution, preferably at least three times larger. The technique 800A (FIG. 19A) in one embodiment further includes an operation 804 to position a screen in a wellbore, followed by an operation 806 to deposit each of the amounts of particulates between an outer surface of the screen and a surface of the wellbore. The technique 800B (FIG. 19B) in one embodiment alternatively includes an operation 808 to position an amount of slurry in the wellbore, followed by an operation 810 to position the screen in the amount of slurry. In certain embodiments, the techniques 800A, 800B include operation 812 to set a production packer, and operation 814 to displace a slurry remainder inside the screen and/or operation 816 to shut in the wellbore for a specific period, e.g., to degrade or dissolve particulates in some embodiments.

In certain embodiments, the simplified operations (relative to currently available gravel packing operations) of placing the slurry 116 in the wellbore and the screen 112 into the slurry allow a very low carrier fluid 122 viscosifier loading and require a high particulate loading (as in certain embodiments excess carrier fluid 122 is not pumped into the formation of interest 106). In certain embodiments, the carrier fluid 122 includes viscosifiers at less than 2.4 g/L (20 lb/1000 gals), and total particulate loadings above 3.6 kg/L (30 ppg). In certain embodiments, the slurry 116 includes particulate amounts (for the first, second, third, fourth, and/or fifth amount of particulates) and sizes such that the packed volume fraction (PVF) for the slurry 116 is greater than 0.75 PVF, or in some embodiments greater than 0.8 PVF.

Displacing the slurry remainder inside the screen includes circulating out particulates inside the screen 112, and/or flowing formation fluid from the formation of interest 106 and thereby carrying any slurry remainder out of the screen 112. In certain embodiments, at least one of the second and third particulate amounts comprise a degradable material, and the technique 800 further includes an operation 816 to shut in the wellbore for a specified time period. In certain embodiments, the specified time period may be a time period selected such that various degradation and breaking reactions have time to occur before flowing fluids out of the wellbore.

According to one embodiment, as mentioned above, the screen is treated with a leak-off control agent to limit fluid loss into the screen from the multimodal slurry during placement thereof, which might otherwise result in premature bridging of the slurry due to fluid loss. With reference to FIG. 20, the multimodal slurry 324 is introduced into the bottom of the bore hole 314, and a spacer fluid 380 is placed in the well above the slurry 324. The spacer fluid 380 contains one or more leak-off control agents, small particles or a range of particle sizes suitable for plugging or bridging the openings in the screen elements of the screen assembly 312. As the screen 312 is lowered in the well bore 314, it initially passes through the spacer fluid 380 and the leak-off control agent seals off the openings in the screen 312 to limit further fluid entry so that when the screen 312 enters the slurry 324 the slurry remains fluid and the screen 312 mobile therein until the screen can be placed in the well bore 314 as desired. After the screen 312 is properly positioned in the well bore 314, the leak-off control agent is degraded by dissolution or reaction, for example, or otherwise removed from the screen to restore permeability for production fluids, and the slurry 324 is converted to a permeable gravel pack as described herein for production.

The spacer fluid 380, in addition to the leak-off control agent, stability agent, dispersant or the like, can contain various components and additives well known to be present in treatment fluids, including water, brine, oil, emulsion, invert emulsion, solvents, foaming or energizing agent, viscosifiers, surfactants, crosslinkers, friction reducers, breakers, accelerators, retarders, antioxidants, pH stabilizers and control agents, etc. In one embodiment, the spacer fluid 380 is compatible with the slurry and other fluids used in the wellbore.

In another embodiment, the high-solids slurry is designed such that it limits leak-off into the screen by forming a bridge on the screen to control dehydration of the slurry. As examples of fluid loss agents which can be used to inhibit leak-off from the slurry, either in the spacer fluid or in the slurry itself, there may be mentioned latex dispersions, water soluble polymers, submicron particulates, particulates with an aspect ratio higher than 1, preferably higher than 6, combinations thereof and the like, such as, for example, crosslinked polyvinyl alcohol microgel. The fluid loss agent can be, for example, a latex dispersion of polyvinylidene chloride, polyvinyl acetate, polystyrene-co-butadiene; a water soluble polymer such as hydroxyethylcellulose (HEC), guar, copolymers of polyacrylamide and their derivatives; particulate fluid loss control agents in the size range of 30 nm-1 μm such as γ-alumina, colloidal silica, $CaCO_3$, $SiO_2$, bentonite etc.; particulates with different shapes such as glass fibers, flakes, films; and any combination thereof or the like. Fluid loss agents can if desired also include or be used in combination with acrylamido-methyl-propane sulfonate polymer (AMPS). In one embodiment, the leak-off control agent comprises a reactive solid, e.g., a hydrolysable material such as PGA, PLA or the like; or it can include a soluble or solubilizable material such as a wax, an oil-soluble resin, or another material soluble in hydrocarbons, or calcium carbonate or another material soluble at low pH; and so on. In an embodiment, the leak-off control agent comprises a reactive solid selected from ground quartz, oil soluble resin, degradable rock salt, clay, zeolite or the like. In another embodiment, the leak-off control agent comprises magnesium hydroxide, magnesium carbonate, magnesium calcium carbonate, calcium carbonate, aluminum hydroxide, calcium oxalate, calcium phosphate, aluminum metaphosphate, sodium zinc potassium polyphosphate glass, and sodium calcium magnesium polyphosphate glass, or the like. In one embodiment where the slurry 324 comprises a degradable material, the leak-off control agent comprises the same or a similar material so that the leak-off control agent is removed from the surface of the screen 312 simultaneously with the degradable material in the slurry, e.g., concurrently with the second amount and/or third amount of particulates where these are present in the slurry.

Figure 21:
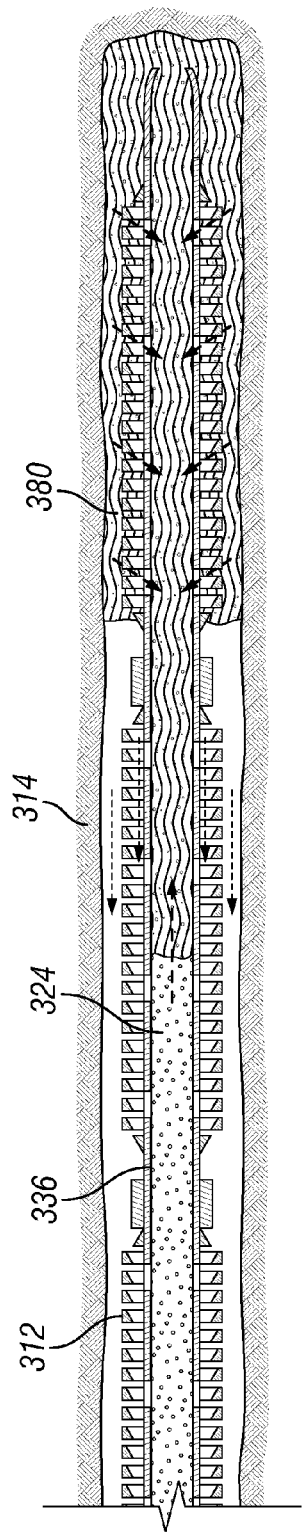
FIG. 21 is a schematic diagram of a screen-first embodiment wherein a screen-bridging spacer fluid is circulated into the screen annulus ahead of the multimodal slurry.
Figure 22:
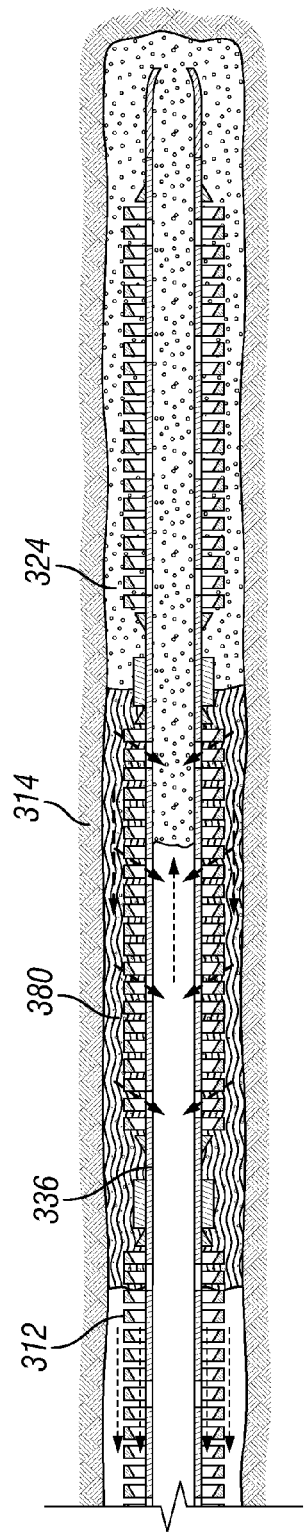
FIG. 22 is a schematic diagram of the screen-first embodiment of FIG. 21 wherein the multimodal slurry is placed in the annulus after leak-off control additives from the spacer fluid have plugged or bridged the screen elements to limit leak-off from the slurry.

In another embodiment, with reference to FIGS. 21 and 22, a screen 312 is positioned in a wellbore 314 as described above in connection with FIGS. 5 to 7. The spacer fluid 380, which contains a leak-off control agent as described above, is pumped ahead of the multimodal slurry 324, and introduced into the annulus 316 around the screen 312, e.g., via wash pipe 336 or other suitable means, whereby the openings in the screen 312 are sealed to limit leak-off. The high-solids slurry 324 is then introduced into the annulus 316 displacing the spacer fluid 380 with controlled leak-off into the screen 312 so that the slurry retains its rheological characteristics and avoids premature bridging or plugging in the annulus 316, at least until the slurry 324 is placed as desired. Thereafter, the leak-off control agent is removed from the screen 312 and the slurry 324 is converted to a gravel pack as previously described.

In embodiments, the slurry is comprised of a carrier fluid, a solids mixture and a stability additive, wherein the solids mixture comprises a plurality of PSD modes such that a packed volume fraction (PVF) exceeds 0.75, and preferably exceeds 0.8. The stability additive helps inhibit settling of the solids mixture in the slurry, and thus maintain its rheological characteristics. This can be important where the slurry has to be prepared in advance of use or where the slurry is placed in the wellbore with considerable delay before it contacts the screen, e.g., where the workstring is tripped out to attach the screen after slurry placement. The stability additive in one embodiment comprises colloidal particles, such as, for example, γ-alumina, MgO, γ-Fe2O3, combinations thereof and the like. In another embodiment, the stability additive comprises hydratable polymer particles, especially polymer particles which are hydrated at downhole temperatures such as above 60° C., for example, heteropolysaccharides such as gellan gum. Stabilizing particles can also include particles having an aspect ratio above 6, 10, 20, 50, 100, 200, 300 or the like, especially flakes or fibers comprising a polymer or copolymer of lactic acid, glycolic acid, a combination thereof or the like. In a particular embodiment, the slurry has a solids volume fraction (SVF) from 0.5 to 0.75, preferably from 0.55 to 0.7, preferably from 0.56 to 0.68, preferably from 0.58 to 0.66. In various embodiments, the solids mixture is trimodal, tetramodal, pentamodal or the like, and can remain stable and flowable for at least 48 hours.

In another embodiment, a dispersant can be used to remove fines from a solids pack formed from a slurry comprising a carrier fluid and a solids mixture, wherein the solids mixture comprises a plurality of volume-averaged particle size distribution (PSD) modes such that a packed volume fraction (PVF) exceeds 0.75, preferably exceeds 0.8, and wherein the solids mixture comprises at least a proppant PSD mode and a fines PSD mode. The dispersant can be present in the slurry, in another fluid used to displace the carrier fluid from the proppant pack, or in a fluid circulated and/or spotted in the wellbore after forming the pack. In an embodiment, the dispersant comprises a polyelectrolyte, for example, polysulfonate, such as lignosulfonate, polymelamine sulfonate, polystyrene sulfonate, polynaphthalene sulfonate or the like; polycarboxylate, such as a polyacrylate having a weight average molecular weight less than 10,000 Daltons; combinations thereof and the like. In one embodiment, the dispersant comprises a surfactant, e.g., an anionic, cationic, amphoteric, zwitterionic or nonionic surfactant. At low concentrations, surfactants can have a coagulating effect on fines, however, at sufficiently high concentrations the surfactants are effective as fines disperants. In general, the higher the salinity the more dispersant that is required, especially in regards to the ionic dispersants. Where the carrier fluid is a brine or especially a high brine, nonionic surfactants such as polyoxyethylenes (including polyethylene glycol) may be beneficial since they are less affected by salinity. In general, a weight ratio between the dispersant and the fines is from about 1:500 to 10:90.

The fines dispersed by the dispersant in various embodiments are silica, calcium carbonate, or the like. The fines can if desired be agglomerated in the slurry. The slurry can comprise a volume fraction of solids from about 0.45 up to the PVF, and a volume fraction of carrier fluid from (1-PVF) up to 0.55, preferably up to 2.5*(1-PVF) in one embodiment. In embodiments the proppant PSD mode is from 100 to 2000 microns, the fines PSD mode from 1 to 20 microns, and/or the proppant PSD mode is from 18 to 900 times larger than the fines PSD mode. In some embodiments, the slurry further comprises one or more intermediate PSD modes, preferably selected from PSD modes from 2 to 60 times smaller than the proppant PSD mode, PSD modes from 1.1 to 60 times larger than the fines PSD mode, and combinations thereof. In a particular embodiment, the intermediate PSD modes can include a relatively larger PSD mode and a relatively smaller intermediate PSD mode, preferably wherein the larger intermediate PSD mode is from 2 to 15 times smaller than the proppant PSD mode and from 1.25 to 15 times larger than the smaller intermediate PSD mode, and preferably wherein the smaller intermediate mode is from 1.1 to 15 times larger than the fines PSD mode. In a further embodiment, the slurry further comprises a middle intermediate PSD mode from 1.5 to 4 times smaller than the larger intermediate PSD mode and 1.25 to 2.5 times larger than the smaller PSD mode. In one embodiment, at least one of the intermediate PSD modes is degradable, preferably the larger intermediate PSD mode.

In a further embodiment, the slurry comprises a solids mixture in a carrier fluid, wherein the solids mixture comprises first, second, third and fourth volume-averaged particle size distribution (PSD) modes such that a packed volume fraction (PVF) of the solids mixture is greater than 0.75, preferably greater than 0.80; and a solids volume fraction (SVF) of the slurry is less than the PVF of the solids mixture; wherein the first PSD mode is at least three times larger than the second PSD mode, the second PSD mode is larger than the third PSD mode, and the third PSD mode is larger than the fourth PSD mode, and wherein at least one of the second and third PSD modes is less than 3 times larger than the respective third or fourth PSD mode. The slurry can also include a fifth PSD mode, wherein the fourth PSD mode is larger than the fifth PSD mode and preferably less than 3 times larger than the fifth PSD mode. In one embodiment, the first PSD mode is from 3 to 10 (preferably about 5 to about 7, more preferably about 5.4 to about 6.9, especially about 5.6 to about 6.6 times larger than the second PSD mode) times larger than the second PSD mode, the second PSD mode is from 1.5 to 4 (preferably from about 2 to about 2.4 times larger than the third PSD mode) times larger than the third PSD mode, the third PSD mode is at least 1.25 (preferably up to about 2.5, more preferably about 1.8 or 1.9) times larger than the fourth PSD mode, and if the fifth PSD mode is present, the fourth PSD mode is at least 1.1 (preferably up to 2, more preferably about 1.6) times larger than the fifth PSD mode.

In one embodiment, the first PSD mode is from about 422 microns up to about 853 microns (20/40 mesh), the second PSD mode is from about 60 microns up to about 180 microns (preferably from about 100 microns up to about 150 microns), the third PSD mode is from about 25 microns up to about 70 microns (preferably from about 40 microns up to about 60 microns), the fourth PSD mode is from about 1 micron up to about 40 microns, and the fifth PSD mode, if present, is from about 1 micron up to about 25 microns. In another embodiment, the fifth PSD mode is at least 1 micron and the first PSD mode is from about 422 microns (40 mesh) up to about 853 microns (20 mesh). In an embodiment, the second PSD mode comprises a total SVF from 5 to 30 percent (preferably from 10 to 20 percent, more preferably from 10 to 15 percent), the third PSD mode comprises a total SVF from 3 to 20 percent (preferably from 3 to 10 percent), the fourth PSD mode comprises a total SVF from 5 to 40 percent (preferably from 10 to 30 percent), based on a total SVF of the first PSD mode, and the fifth PSD mode, if present, comprises a total SVF from 1 to 40 percent, based on a total SVF of the first PSD mode. Additionally or alternatively, the second PSD mode comprises a total SVF from 5 to 30, preferably 10 to 20, percent of a total SVF of the first PSD mode; the third PSD mode comprises a total SVF from 10 to 100, preferably 30 to 60, percent of the total SVF of the second PSD mode; the fourth PSD mode comprises a total SVF from 10 to 100, preferably 30 to 80, percent of the total SVF of the third PSD mode; and if present, the fifth PSD mode comprises a total SVF from 10 to 500, preferably 100 to 400, percent of the total SVF of the fourth PSD mode. In embodiments, the slurry can also comprise a fluid loss agent, a dispersant, and/or wherein at least one of the second, third, fourth or fifth PSD modes comprises a degradable material.

As is evident from the figures and text presented above, as well as the examples below, a variety of embodiments are contemplated:

1. A method, comprising: combining a carrier fluid and a solids mixture to form a preferably flowable slurry, wherein the solids mixture comprises a plurality of volume-averaged particle size distribution (PSD) modes, wherein a first PSD mode comprises solids having a volume-average median size at least three times larger than the volume-average median size of a second PSD mode such that a packed volume fraction (PVF) of the solids mixture exceeds 0.75 or preferably exceeds 0.8, and wherein the solids mixture, preferably the second PSD mode, comprises a degradable material and includes a reactive solid; circulating the slurry through a wellbore to form a pack of the solids mixture having a PVF exceeding 0.75 or preferably exceeds 0.8 in one or both of a fracture in a formation and an annulus between a screen and the wellbore; degrading the degradable material in the pack to increase porosity and permeability of the pack; and producing a reservoir fluid from the formation through the increased porosity pack.

2. The method of embodiment 1, wherein the carrier fluid is a low viscosity fluid free of viscosifier or comprising viscosifier in an amount less than 2.4 g of viscosifier per liter of carrier fluid (20 lb/1000 gal).

3. The method of embodiment 1 or 2, wherein the slurry is stable and has a high particulate loading comprising at least 3.6 kg of the solids mixture per liter of the carrier fluid (30 lb/gal).

4. The method of embodiment 1, 2 or 3, wherein the first PSD mode comprises gravel and the second PSD mode comprises alumina trihydrate particles, and wherein the degradation comprises changing a pH in the pack to solubilize the alumina trihydrate particles.

5. The method of any one of embodiments 1 to 4, wherein the degradable material is soluble in basic fluids and the degradation comprises increasing a pH in the pack to dissolve the degradable material.

6. The method of embodiment 5, wherein the degradable material is selected from the group consisting of amphoteric oxides, esters, coated acids and combinations thereof.

7. The method of any one of embodiments 1 to 6, wherein the solids mixture comprises base or base precursor.

8. The method of embodiment 7, wherein the base or base precursor is sparingly soluble or encapsulated.

9. The method of embodiment 7 or 8, wherein the base is selected from the group consisting of alkali metal and ammonium hydroxides, organic amines, urea, substituted urea and combinations thereof.

10. The method of any one of embodiments 1 to 9, comprising contacting the pack with a basic aqueous solution.

11. The method of any one of embodiments 1 to 4, wherein the degradable material is soluble in acidic fluids and the degradation comprises decreasing a pH in the pack to dissolve the degradable material.

12. The method of embodiment 1 or 11, wherein the degradable material is selected from the group consisting of oxides and hydroxides of aluminum, zinc, tin, lead, boron, silicon and iron; carbonates, sulfates, oxides and hydroxides of calcium, magnesium and barium; and combinations thereof.

13. The method of embodiment 1, 11 or 12, wherein the solids mixture comprises an acid or acid precursor.

14. The method of embodiment 13, wherein the acid or acid precursor is sparingly soluble or encapsulated.

15. The method of embodiment 13 or 14, wherein the acid precursor is selected from the group consisting of hydrolyzable esters, acid anhydrides, acid sulfonates, acid halides and combinations thereof.

16. The method of any one of embodiments 1 or 11 to 15, comprising contacting the pack with an acidic aqueous solution.

17. The method of any one of embodiments 11 to 16, wherein the second PSD mode comprises an encapsulated water- or oil-soluble solid, and the degradation comprises de-encapsulating the soluble solid.

18. The method of any one of embodiments 11 to 17, wherein the second PSD mode comprises a water-soluble solid and the carrier fluid comprises a saturated aqueous solution of the water-soluble solid, and the degradation comprises contacting the pack with an undersaturated aqueous medium.

19. The method of any one of embodiments 11 to 17, wherein the second PSD mode comprises a water-soluble solid, and the carrier fluid comprises an invert oil emulsion wherein the water-soluble solid is dispersed in an oil phase, and the degradation comprises breaking the emulsion to dissolve the water-soluble solid in an aqueous medium.

20. The method of embodiment 19, comprising contacting the pack with a de-emulsifier to break the emulsion.

21. The method of embodiment 19 or 20, comprising contacting the pack with a pH control agent to break the emulsion.

22. The method of embodiment 21, wherein the pH control agent is selected from the group consisting of monoesters, polyesters, weak acids, weak bases, urea, urea derivatives and combinations thereof.

23. The method of any one of embodiments 1 to 22, wherein the degradable material comprises a soluble material.

24. The method of embodiment 23, wherein the carrier fluid is saturated with respect to the soluble material.

25. The method of embodiment 23 or 24, wherein the soluble material comprises salt and the carrier fluid comprises brine.

26. A composition, comprising: a carrier fluid and a solids mixture combined to form a flowable slurry, wherein the solids mixture comprises a plurality of volume-averaged particle size distribution (PSD) modes, wherein a first PSD mode comprises solids having a volume-average median size at least three times larger than the volume-average median size of a second PSD mode such that a packed volume fraction (PVF) of the solids mixture exceeds 0.75 or preferably exceeds 0.8, and wherein the solids mixture, preferably the second PSD mode, comprises a degradable material and includes a reactive solid.

27. The composition of embodiment 26, wherein the carrier fluid is a low viscosity fluid free of viscosifier or comprising viscosifier in an amount less than 2.4 g of viscosifier per liter of carrier fluid (20 lb/1000 gal).

28. The composition of embodiment 26 or 27, wherein the slurry is stable and has a high particulate loading comprising at least 3.6 kg of the solids mixture per liter of the carrier fluid (30 lb/gal).

29. The composition of embodiment 26, 27 or 28, wherein the first PSD mode comprises gravel and the second PSD mode comprises alumina trihydrate particles.

30. The composition of any one of embodiments 26 to 30, wherein the degradable material is soluble in basic fluids.

31. The composition of embodiment 30, wherein the degradable material is selected from the group consisting of amphoteric oxides, esters, coated acids and combinations thereof.

32. The composition of any one of embodiments 26 to 31, wherein the solids mixture comprises base or base precursor.

33. The composition of embodiment 32, wherein the base or base precursor is sparingly soluble or encapsulated.

34. The composition of embodiment 32 or 33, wherein the base is selected from the group consisting of alkali metal and ammonium hydroxides, organic amines, urea, substituted urea and combinations thereof.

35. The composition of any one of embodiments 26 to 29, wherein the degradable material is soluble in acidic fluids.

36. The composition of any one of embodiments 26 to 30 or 35, wherein the degradable material is selected from the group consisting of oxides and hydroxides of aluminum, zinc, tin, lead, boron, silicon and iron; carbonates, sulfates, oxides and hydroxides of calcium, magnesium and barium; and combinations thereof.

37. The composition of any one of embodiments 26 to 30 or 35 to 36, wherein the solids mixture comprises an acid or acid precursor.

38. The composition of embodiment 37, wherein the acid or acid precursor is sparingly soluble or encapsulated.

39. The composition of embodiment 37 or 38, wherein the acid precursor is selected from the group consisting of hydrolyzable esters, acid anhydrides, acid sulfonates, acid halides and combinations thereof.

40. The composition of any one of embodiments 26 to 39, wherein the second PSD mode comprises an encapsulated water- or oil-soluble solid.

41. The composition of any one of embodiments 26 to 39, wherein the second PSD mode comprises a water-soluble solid and the carrier fluid comprises a saturated aqueous solution of the water-soluble solid.

42. The composition of embodiment 40 or 41, wherein the soluble material comprises salt and the carrier fluid comprises brine.

43. The composition of any one of embodiments 26 to 39, wherein the second PSD mode comprises a water-soluble solid, and the carrier fluid comprises an invert oil emulsion wherein the water-soluble solid is dispersed in an oil phase.

44. A method, comprising: combining a carrier fluid and a solids mixture to form a preferably flowable slurry, wherein the solids mixture comprises a plurality of volume-averaged particle size distribution (PSD) modes such that a packed volume fraction (PVF) of the solids mixture exceeds 0.75, or preferably exceeds 0.8; contacting a screen with a fluid comprising leak-off control agent to form a bridge on the screen to inhibit fluid entry; positioning the screen in a wellbore and circulating the slurry through the wellbore in any order such that the solids mixture is deposited between the screen and the wellbore; converting the deposited solids mixture into a gravel pack to increase porosity and permeability; removing the bridge from the screen; and producing a reservoir fluid from the formation through the gravel pack and the screen.

45. The method of embodiment 44, wherein the slurry comprises the leak-off control agent and the bridge is formed on the screen during the circulation of the slurry.

46. The method of embodiment 45, wherein the solids mixture comprises three PSD modes to form the bridge on the screen, wherein a first amount of particulates have a first PSD, a second amount of particulates have a second PSD, and a third amount of particulates have a third PSD, wherein the first PSD is larger than the second PSD, and wherein second PSD is larger than the third PSD.

47. The method of embodiment 46, wherein the first amount of particulates comprises 40/80 mesh (178-422 microns) gravel.

48. The method of embodiment 46 or 47, wherein the first PSD is smaller than 40 mesh (422 microns).

49. The method of any one of embodiments 44 to 48, wherein the solids mixture comprises three PSD modes, wherein a first amount of particulates have a first PSD, a second amount of particulates have a second PSD, and a third amount of particulates have a third PSD, wherein the first PSD is from two to ten times larger than the second PSD, and wherein second PSD is from three to ten times larger than the third PSD.

50. The method of any one of embodiments 44 to 49, wherein the leak-off control fluid comprises a spacer fluid introduced into the wellbore.

51. The method of embodiment 50, wherein the slurry is circulated through the wellbore before the screen is positioned in the wellbore, wherein the spacer fluid is positioned in the wellbore above the slurry, and wherein the screen is passed through the spacer fluid in the wellbore and then stabbed into the slurry.

52. The method of embodiment 50, wherein the screen is positioned in the wellbore before the slurry is circulated into an annulus between the screen and the wellbore, and wherein the spacer fluid is circulated into the annulus ahead of the slurry.

53. The method of any one of embodiments 50 to 52, wherein the spacer fluid and slurry are sequentially pumped through a flow passage in the screen to a bottom end of the screen and into the annulus.

54. A method, comprising: combining a carrier fluid, a first amount of particulates, a second amount of particulates, and a third amount of particulates into a slurry; wherein the first amount of particulates have a first average size distribution, the second amount of particulates have a second average size distribution, and the third amount of particulates have a third average size distribution, wherein the first average size distribution is at least three times larger than the second average size distribution, and wherein the second average size distribution is larger than the third average size distribution; wherein at least one of the second amount of particulates and the third amount of particulates comprise a degradable material; positioning a screen in a wellbore in a subterranean formation and circulating the slurry through the wellbore in any order such that the first amount of particulates, the second amount of particulates, and the third amount of particulates form a bridge on a surface of the screen to inhibit fluid entry and a solids pack in an annulus between the screen surface and a surface of the wellbore; and selectively removing from the first amount of particulates at least a portion of the particulates selected from the second amount of particulates, the third amount of particulates and a combination thereof, to increase porosity and permeability in the bridge and the solids pack for fluid flow across the annulus and through the screen.

55. The method of any one of embodiments 1 to 25 or 54, wherein the screen is disposed into the wellbore before the slurry is circulated.

56. The method of any one of embodiments 1 to 25 or 54, wherein the slurry is circulated into the wellbore before the screen is disposed in the wellbore.

57. The method of any one of embodiments 54 to 56, wherein the first amount of particulates and the second amount of particulates have a combined dry packing volume fraction greater than about 0.75, preferably greater than 0.8.

58. The method of any one of embodiments 54 to 57, wherein the slurry is combined prior to circulation in the wellbore.

59. The method of any one of embodiments 54 to 57, wherein a sum of all particulates in the slurry exceeds thirty pounds per gallon of carrier fluid.

60. The method of any one of embodiments 54 to 57, wherein the second average size distribution is at least three times larger than the third average size distribution.

61. The method of embodiment 60, wherein the total solids volume of the third amount of particulates is greater than the total solids volume of the second amount of particulates.

62. The method of any one of embodiments 54 to 61, wherein the slurry further includes a fourth amount of particulates having a fourth average size distribution, and wherein the third average size distribution is larger than the fourth average size distribution.

63. The method of embodiment 62, wherein the slurry further includes a fifth amount of particulates having a fifth average size distribution, and wherein the fourth average size distribution is larger than the fifth average size distribution.

64. The method of any one of embodiments 54 to 63, wherein the first average size distribution is between about six and ten times larger than the second average size distribution.

65. The method of any one of embodiments 54 to 64, wherein the second average size distribution is between about 1.5 and 15 times larger than the third average size distribution.

66. The method of embodiment 65, wherein the slurry further includes a fourth amount of particulates having a fourth average size distribution, and wherein the third average size distribution is between about 1.25 and 15 times larger than the fourth average size distribution.

67. The method of embodiment 66, wherein the slurry further includes a fifth amount of particulates having a fifth average size distribution, and wherein the fourth average size distribution is between about 1.1 and 15 times larger than the fifth average size distribution.

68. A method, comprising: combining a carrier fluid, a first amount of particulates, a second amount of particulates, a third amount of particulates and a fourth amount of particulates into a slurry; wherein the first amount of particulates have a first average size distribution, the second amount of particulates have a second average size distribution, the third amount of particulates have a third average size distribution, and the fourth amount of particulates have a fourth average size distribution, wherein the first average size distribution is at least three times larger than the second average size distribution, wherein the second average size distribution is at least three times larger than the third average size distribution, and wherein the third average size distribution is at least three times larger than the fourth average size distribution; positioning a screen in a wellbore in a subterranean formation and circulating the slurry through the wellbore in any order such that the first amount of particulates, the second amount of particulates, and the third amount of particulates form a bridge on a surface of the screen to inhibit fluid entry and a solids pack in an annulus between the screen surface and a surface of the wellbore; selectively removing from the first amount of particulates at least a portion of the particulates selected from the second amount of particulates, the third amount of particulates, the fourth amount of particulates, and combinations thereof, to increase porosity and permeability in the bridge and the solids pack for fluid flow across the annulus and through the screen.

69. The method of embodiment 68, wherein the first amount of particulates comprises gravel.

70. The method of embodiment 68 or 69, wherein the first average size distribution is 40 mesh (422 μm) or larger.

71. The method of any one of embodiments 68 to 70, wherein the first amount of particulates comprises 20/40 mesh gravel.

72. The method of any one of embodiments 68 to 71, wherein the slurry further comprises a fifth amount of particulates having a fifth average particle size distribution, wherein the fourth average particle size distribution is at least three times larger than the fifth average particle size distribution.

73. The method of any one of embodiments 68 to 72, wherein the first average size distribution is between 20 and 40 mesh (422-853 μm), the second average size distribution is from 140 μm to 280 μm, the third average size distribution is from 15 to 65 μm, and the fourth average size distribution is from 1 to 10 μm.

74. The method of any one of embodiments 68 to 73, wherein the first average size distribution is from 3 to 15 times larger than the second average size distribution, wherein the second average size distribution is from 3 to 15 times larger than the third average size distribution, and wherein the third average size distribution is from 3 to 15 times larger than the fourth average size distribution.

75. The method of any one of embodiments 68 to 74, wherein at least one of the second amount of particulates and the third amount of particulates comprise a degradable material.

76. The method of any one of embodiments 68 to 75, wherein the slurry further comprises a fluid loss agent to inhibit leak-off from the slurry.

77. The method of embodiment 76, wherein the fluid loss agent is selected from the group consisting of: latex dispersions, water soluble polymers, submicron particulates, particulates with an aspect ratio higher than 6, and combinations thereof.

78. The method of embodiment 76 or 77, wherein the fluid loss agent comprises crosslinked polyvinyl alcohol microgel.

79. The method of any one of embodiments 76 to 78, wherein the fluid loss agent further comprises AMPS.

80. The method of any one of embodiments 68 to 79, wherein the slurry comprises a solids volume fraction (SVF) from 0.5 to 0.75.

81. The method of any one of embodiments 68 to 80, wherein the total particulates in the slurry have a packed volume fraction (PVF) greater than the SVF.

82. The method of any one of embodiments 1 to 25 or 44 to 81, wherein the slurry is circulated in a horizontal portion of the wellbore from toe to heel.

83. The method of any one of embodiments 1 to 25 or 44 to 82, wherein the slurry is circulated in the wellbore at a pressure less than the fracture pressure.

84. The method of any one of embodiments 1 to 25 or 44 to 83, wherein the slurry is circulated in the wellbore at a rate less than 800 L/min (5 BPM).

85. The method of any one of embodiments 1 to 25 or 44 to 84, wherein the slurry is circulated in the wellbore through a washpipe, wherein a screen-wellbore annulus has a radial thickness relatively less than a radial thickness of a washpipe-screen annulus.

86. A system, comprising: a slurry comprising a carrier fluid suspending a first amount of particulates, a second amount of particulates, and a third amount of particulates; wherein the first amount of particulates have a first average size distribution, the second amount of particulates have a second average size distribution, and the third amount of particulates have a third average size distribution; wherein the first average size distribution is at least three times larger than the second average size distribution, and wherein the second average size distribution is at least three times larger than the third average size distribution; wherein at least one of the second amount of particulates and the third amount of particulates comprise a degradable material; and a tubing string and a slurry pump to position a screen and circulate the slurry in a wellbore in a subterranean formation in any order such that the first amount of particulates, the second amount of particulates, and the third amount of particulates form a bridge on a surface of the screen and a solids pack in an annulus between the screen surface and a surface of the wellbore, and wherein the degradable material can be selectively removed from the first amount of particulates to increase porosity and permeability in the solids pack for fluid flow across the annulus and through the screen.

87. The system of embodiment 86, wherein the first amount of particulates and the second amount of particulates have a combined dry packing volume fraction greater than about 0.75, preferably greater than 0.80.

88. The system of embodiment 86 or 87, wherein a sum of all particulates in the slurry exceeds thirty pounds per gallon of carrier fluid.

89. The system of any one of embodiments 86 to 88, wherein the total solids volume of the third amount of particulates is greater than the total solids volume of the second amount of particulates.

90. The system of any one of embodiments 86 to 89, wherein the slurry further includes a fourth amount of particulates having a fourth average size distribution, and wherein the third average size distribution is larger than the fourth average size distribution.

91. The system of embodiment 90, wherein the slurry further includes a fifth amount of particulates having a fifth average size distribution, and wherein the fourth average size distribution is larger than the fifth average size distribution.

92. The system of any one of embodiments 86 to 91, wherein the first average size distribution is between about six and ten times larger than the second average size distribution.

93. A method, comprising: combining a carrier fluid, a solids mixture and a stability additive to form a slurry, wherein the solids mixture comprises a plurality of volume-averaged particle size distribution (PSD) modes such that a packed volume fraction (PVF) exceeds 0.75, preferably exceeds 0.8, wherein the slurry comprises a solids volume fraction (SVF) less than the PVF of the solids mixture; circulating the slurry into a wellbore to deposit the slurry downhole; terminating the slurry circulation for a period of time, wherein the stability additive inhibits settling of the solids mixture; and thereafter circulating the deposited slurry in contact with a surface of a screen.

94. The method of embodiment 93, wherein the stability additive comprises colloidal particles.

95. The method of embodiment 94, wherein the colloidal particles are selected from the group consisting of γ-alumina, MgO, γ-Fe2O3, and combinations thereof.

96. The method of any one of embodiments 93 to 95, wherein the stability additive comprises hydratable polymer particles.

97. The method of embodiment 96, wherein the polymer particles have a hydration temperature above 60° C.

98. The method of embodiment 96 or 97, wherein the polymer particles comprise heteropolysaccharide.

99. The method of embodiment 96, 97 or 98, wherein the polymer particles comprise gellan gum.

100. The method of any one of embodiments 93 to 99, wherein the stability additive comprises stabilizing particles having an aspect ratio above 6.

101. The method of embodiment 100, wherein the stabilizing particles having an aspect ratio above 6 are degradable.

102. The method of embodiment 100 or 101, wherein the stabilizing particles having an aspect ratio above 6 comprise flakes, fibers or a combination thereof comprising a polymer or copolymer of lactic acid, glycolic acid, or the combination thereof.

103. The method of any one of embodiments 93 to 102, wherein the circulation of the deposited slurry in contact with the surface of the screen comprises stabbing the screen into the deposited slurry.

104. The method of any one of embodiments 93 to 103, wherein the slurry circulation is terminated to trip a workstring from the wellbore and trip the screen into the wellbore.

105. The method of any one of embodiments 93 to 104, wherein the SVF is from 0.5 to 0.75, preferably from 0.55 to 0.7, preferably from 0.56 to 0.68, preferably from 0.58 to 0.66.

106. The method of any one of embodiments 93 to 105, wherein one of the PSD modes comprises gravel.

107. The method of any one of embodiments 93 to 106, wherein the solids mixture is trimodal.

108. The method of any one of embodiments 93 to 106, wherein the solids mixture is tetramodal.

109. The method of any one of embodiments 93 to 106, wherein the solids mixture is pentamodal.

110. The method of any one of embodiments 93 to 109, further comprising forming the solids mixture in the slurry into a pack in an annulus between the screen and the wellbore.

111. The method of embodiment 110, further comprising converting the pack into a permeable gravel pack.

112. A slurry, comprising: a solids mixture comprising a plurality of volume-averaged particle size distribution (PSD) modes such that a packed volume fraction (PVF) exceeds 0.75, preferably exceeds 0.8; a carrier fluid in an amount to provide a solids volume fraction (SVF) less than the PVF of the solids mixture; and a stability additive to inhibit settling of the solids mixture.

113. The slurry of embodiment 112, wherein the stability additive comprises colloidal particles.

114. The slurry of embodiment 113, wherein the colloidal particles are selected from the group consisting of γ-alumina, MgO, γ-Fe2O3, and combinations thereof.

115. The slurry of any one of embodiments 112, 113 or 114, wherein the stability additive comprises hydratable polymer particles.

116. The slurry of embodiment 115, wherein the polymer particles have a hydration temperature above 60° C.

117. The slurry of embodiment 115 or 116, wherein the polymer particles comprise heteropolysaccharide.

118. The slurry of any one of embodiments 115, 116 or 117, wherein the polymer particles comprise gellan gum.

119. The slurry of any one of embodiments 112 to 118, wherein the stability additive comprises stabilizing particles having an aspect ratio above 6.

120. The slurry of embodiment 119, wherein the stabilizing particles having an aspect ratio above 6 are degradable.
121. The slurry of embodiment 119 or 120, wherein the stabilizing particles having an aspect ratio above 6 comprise flakes comprising a polymer or copolymer of lactic acid, glycolic acid, or the combination thereof.
122. The slurry of any one of embodiments 112 to 121, wherein the SVF is from 0.5 to 0.75, preferably from 0.55 to 0.7, preferably from 0.56 to 0.68, preferably from 0.58 to 0.66.
123. The slurry of any one of embodiments 112 to 122, wherein one of the PSD modes comprises gravel.
124. The slurry of any one of embodiments 112 to 123, wherein the solids mixture is trimodal.
125. The slurry of any one of embodiments 112 to 123, wherein the solids mixture is tetramodal.
126. The slurry of any one of embodiments 112 to 123, wherein the solids mixture is pentamodal.
127. The slurry of any one of embodiments 112 to 126, wherein the slurry is stable and flowable for at least 48 hours.
128. A method to stabilize a slurry comprising a solids mixture in a carrier fluid, wherein the solids mixture comprises from three to five volume-averaged particle size distribution (PSD) modes such that a packed volume fraction (PVF) exceeds 0.75, or preferably exceeds 0.8, and wherein the slurry comprises a solids volume fraction (SVF) less than the PVF of the solids mixture, comprising: introducing a stability additive into the slurry, wherein the stability additive is selected from the group consisting of colloidal particles, hydratable polymer particles, particles having an aspect ratio above 6, and combinations thereof.
129. The method of embodiment 128, wherein the stability additive comprises colloidal particles selected from the group consisting of γ-alumina, MgO, γ-Fe2O3, and combinations thereof.
130. The method of embodiment 128 or 129, wherein the stability additive comprises hydratable polymer particles having a hydration temperature above 60° C.
131. The method of embodiment 128, 129 or 130, wherein the stability additive comprises heteropolysaccharide.
132. The method of any one of embodiments 128 to 131, wherein the stability additive comprises gellan gum.
133. The method of any one of embodiments 128 to 132, wherein the stability additive comprises stabilizing particles having an aspect ratio above 6, wherein the stabilizing particles are degradable.
134. The method of embodiment 133, wherein the stabilizing particles having an aspect ratio above 6 comprise flakes comprising a polymer or copolymer of lactic acid, glycolic acid, or the combination thereof.
135. The method of any one of embodiments 128 to 134, wherein the slurry has an SVF from 0.5 to 0.75, preferably from 0.55 to 0.7, preferably from 0.56 to 0.68, preferably from 0.58 to 0.66.
136. The method of any one of embodiments 128 to 135, wherein one of the PSD modes comprises gravel.
137. The method of any one of embodiments 128 to 136, wherein the slurry is stable and flowable for at least 48 hours following the introduction of the stabilizing additive into the slurry.
138. A method, comprising: positioning a generally cylindrical screen in a wellbore to define an annulus between the screen and the wellbore; and passing a slurry comprising a carrier fluid and a solids mixture through the wellbore, through a passage within the screen to a bottom end of the screen and into the annulus to pack the solids mixture onto an outer surface of the screen; wherein the solids mixture comprises at least two volume-averaged particle size distribution (PSD) modes, wherein a first PSD mode comprises solids having a volume-average median size at least three times larger than the volume-average median size of a second PSD mode such that a packed volume fraction (PVF) of the solids mixture exceeds 0.75 or preferably exceeds 0.8.
139. The method of embodiment 138, wherein the screen positioning employs a workstring comprising drill pipe, packer assembly, and a washpipe, and further comprising connecting the washpipe to a bottom end of the screen, pumping the slurry down the drill pipe through the washpipe and out of the bottom end into the annulus, and further comprising, after pumping the slurry into the annulus, setting the packer and removing the washpipe.
140. The method of embodiment 138 or 139, wherein the annulus has a radial thickness (wellbore inside radius minus screen outside radius) less than 25 mm.
141. The method of any one of embodiments 138 to 140, wherein the slurry is circulated in the annulus at a pressure less than the fracture pressure, preferably at a rate of less than 800 L/min (5 BPM).
142. The method of embodiment 138, wherein the screen positioning employs a workstring comprising drill pipe, packer assembly, washpipe, the screen and an end cap comprising a port to allow the washpipe to connect to a bottom of the assembly, and further comprising setting the packer, pumping the slurry down the drill pipe through the washpipe and out of the bottom of the assembly into the annulus to build up pressure in the annulus greater than a fracture pressure to fracture the formation, and thereafter removing the drill pipe and the washpipe from the wellbore.
143. The method of embodiment 138, wherein the screen positioning employs a production assembly comprising production tubing, the screen and a packer, wherein the screen is coated with a degradable material to inhibit inflow, wherein following the screen positioning, the slurry is pumped down the production tubing through the central flow passage, out of the distal end into the annulus, and further comprising, after pumping the slurry into the annulus, setting the packer, degrading the degradable material for inflow into the screen and producing reservoir fluid through the production tubing.
144. The method of embodiment 138, wherein the screen positioning employs a production assembly comprising production tubing, the screen and a packer, wherein the screen contains a degradable material within a base pipe to inhibit inflow, wherein following the screen positioning, the slurry is pumped down the production tubing through the central flow passage, out of the distal end into the annulus, and further comprising, after pumping the slurry into the annulus, setting the packer, degrading the degradable material for inflow and producing reservoir fluid through the production tubing.
145. The method of embodiment 138, wherein the screen positioning employs a production assembly comprising production tubing, the screen, a packer, and a mechanical inflow device to selectively inhibit or allow inflow, wherein following the screen positioning, the slurry is pumped down the production tubing through the central flow passage, out of the distal end into the annulus, and further comprising, after pumping the slurry into the annulus, setting the packer, activating the inflow device to allow inflow into the screen and producing reservoir fluid through the production tubing.
146. The method of embodiment 145 wherein the inflow device is remotely activated.
147. The method of embodiment 145 or 146, wherein the inflow device is activated by a timing device at a prescribed time after the production assembly is run in hole.

148. The method of any one of embodiments 138 to 147, further comprising setting a chemical packer in an annulus between the wellbore and a tubing connected to the screen.
149. The method of embodiment 148, wherein the chemical packer is run ahead of the slurry.
150. The method of any one of embodiments 138 to 149, further comprising setting a plurality of spaced chemical packers in the screen-wellbore annulus and optionally in an annulus between the wellbore and a tubing connected to the screen, to create zonal isolation.
151. The method of any one of embodiments 148 to 150, wherein the chemical packer is introduced to the tubing-wellbore annulus through a diversion port above the screen.
152. The method of embodiment 138, wherein the screen positioning employs a drilling assembly comprising a drill string, the screen, a liner packer and a drilling and measurement assembly comprising a drill bit, the screen positioning comprising drilling a final length of hole to place the screen, the slurry circulation comprising pumping the slurry through the drilling assembly out of the drill bit and into the annulus, and further comprising, after pumping the slurry into the annulus, setting the liner packer, removing the drill string and abandoning the bit downhole.
153. The method of embodiment 152, further comprising pumping a plugging material to follow the slurry and seal off a bottom of the wellbore.
154. The method of embodiment 138, wherein the screen positioning employs a drilling assembly comprising a drill string, the screen, a liner packer and a drilling and measurement assembly comprising a drill bit, the screen positioning comprising drilling a final length of hole to place the screen, and further comprising setting the packer, pumping the slurry through the drilling assembly out of the drill bit and into the annulus to build up pressure in the annulus greater than a fracture pressure to fracture the formation, removing the drill string and abandoning the bit downhole.
155. The method of embodiment 138, wherein the screen positioning employs a drilling assembly comprising a drill string, the screen and a drilling and measurement assembly comprising a drill bit, the screen positioning comprising drilling a final length of hole to place the screen, the slurry circulation comprising pumping a chemical packer ahead of the slurry through the drilling assembly out of the drill bit and into the annulus, and further comprising, after pumping the chemical packer and the slurry into the annulus, setting the chemical packer, removing the drill string and abandoning the bit downhole.
156. The method of embodiment 155, further comprising pumping cement ahead of the chemical packer to place cement around any free casing.
157. The method of any one of embodiments 138 to 156, further comprising transforming the packed solids mixture into a permeable gravel pack.
158. A method, comprising: combining a carrier fluid and a solids mixture to form a slurry, wherein the solids mixture comprises a plurality of volume-averaged particle size distribution (PSD) modes such that a packed volume fraction (PVF) exceeds 0.75, preferably exceeds 0.8, wherein the solids mixture comprises at least a proppant PSD mode and a fines PSD mode; circulating the slurry through a wellbore to form a proppant pack from depositing the solids mixture in one or both of a fracture in a formation and an annulus between a screen and the wellbore; contacting fines in the pack with a dispersant; passing fluid through the pack to remove fines from the pack.
159. The method of embodiment 158, wherein the dispersant is present in the slurry.
160. The method of embodiment 158, wherein contacting the fines with the dispersant comprises displacing the carrier fluid from the proppant pack with another fluid comprising the dispersant.
161. The method of any one of embodiments 158 to 160, wherein contacting the fines with the dispersant comprises circulating a fluid comprising the dispersant in the wellbore after forming the pack.
162. The method of any one of embodiments 158 to 161, wherein contacting the fines with the dispersant comprises spotting a fluid comprising the dispersant in contact with the pack after forming the pack.
163. The method of any one of embodiments 158 to 162, wherein the dispersant comprises a polyelectrolyte.
164. The method of any one of embodiments 158 to 163, wherein the dispersant comprises polysulfonate, polycarboxylate or a combination thereof.
165. The method of any one of embodiments 158 to 164, wherein the dispersant comprises lignosulfonate, polymelamine sulfonate, polystyrene sulfonate, polynaphthalene sulfonate or a combination thereof.
166. The method of any one of embodiments 158 to 165, wherein the dispersant comprises polynaphthalene sulfonate.
166A. The method of any one of embodiments 158 to 166, wherein the dispersant comprises polyacrylate having a weight average molecular weight less than 10,000 Daltons
167. The method of any one of embodiments 158 to 166A, wherein the dispersant comprises an anionic, cationic, amphoteric or zwitterionic surfactant.
168. The method of any one of embodiments 158 to 167, wherein the dispersant comprises a nonionic surfactant and preferably the carrier fluid comprises brine.
169. The method of any one of embodiments 158 to 168, wherein a weight ratio of dispersant to fines is from about 1:500 to about 10:90.
170. The method of any one of embodiments 158 to 169, wherein the fines comprise silica.
171. The method of any one of embodiments 158 to 170, wherein the fines comprise calcium carbonate.
172. The method of any one of embodiments 158 to 171, wherein the fines are agglomerated in the slurry.
173. The method of any one of embodiments 158 to 172, wherein the slurry comprises a volume fraction of solids of from about 0.45 up to the PVF.
174. The method of any one of embodiments 158 to 173, wherein the slurry comprises a volume fraction of carrier fluid from (1-PVF) to 0.55, preferably to 2.5*(1-PVF).
175. The method of any one of embodiments 158 to 174, wherein the proppant PSD mode is from 100 to 2000 microns and the fines PSD mode is from 1 to 20 microns.
176. The method of any one of embodiments 158 to 175, wherein the proppant PSD mode is from 18 to 900 times larger than the fines PSD mode.
177. The method of any one of embodiments 158 to 176, wherein the slurry further comprises one or more intermediate PSD modes selected from the group consisting of PSD modes from 2 to 60 times smaller than the proppant PSD mode, PSD modes from 1.1 to 60 times larger than the fines PSD mode, and combinations thereof.
178. The method of embodiment 177, wherein at least one of the intermediate PSD modes is degradable, and further comprising degrading the at least one degradable intermediate PSD mode after forming the pack.
179. The method of any one of embodiments 177 to 178, wherein the intermediate PSD modes include a relatively larger PSD mode and a relatively smaller intermediate PSD mode, wherein the larger intermediate PSD mode is from 2 to 15 times smaller than the proppant PSD mode and from 1.25 to 15 times larger than the smaller intermediate PSD mode, and wherein the smaller intermediate mode is from 1.1 to 15 times larger than the fines PSD mode.

179A. The method of embodiment 179, further comprising a middle intermediate PSD mode from 1.5 to 4 times smaller than the larger intermediate PSD mode and 1.25 to 2.5 times larger than the smaller PSD mode.

180. The method of embodiment 179 or 179A, wherein the larger intermediate PSD mode is degradable, and further comprising degrading the larger intermediate PSD mode after forming the pack.

181. The method of any one of embodiments 158 to 180, wherein at least 70 percent of the fines are removed from the pack.

182. The method of any one of embodiments 158 to 181, further comprising producing reservoir fluid through the cleaned pack into the wellbore.

183. The method of any one of embodiments 158 to 182, comprising gravel packing wherein the slurry is circulated in the wellbore at a rate less than about 800 L/min (5 BPM), preferably to avoid fracturing the formation.

184. The method of any one of embodiments 158 to 183, wherein the carrier fluid is a low viscosity fluid free of viscosifier or comprising viscosifier in an amount less than 2.4 g of viscosifier per liter of carrier fluid (20 lb/1000 gal).

185. A system, comprising: a well bore in fluid communication with a subterranean formation; a gravel packing slurry comprising a carrier fluid and a solids mixture, wherein the solids mixture comprises a plurality of volume-averaged particle size distribution (PSD) modes such that a packed volume fraction (PVF) exceeds 0.75, preferably exceeds 0.8, wherein the solids mixture comprises at least a proppant PSD mode and a fines PSD mode; a pump to circulate the slurry in the wellbore to deposit the solids mixture and form a proppant pack in one or both of a fracture in the formation and an annulus between a screen and the formation; and a dispersant source effective to facilitate fines flowback from the pack.

186. The system of embodiment 185, wherein the dispersant is present in the slurry.

187. The system of embodiment 185 or 186, wherein the dispersant source comprises a dispersant circulation or spotting fluid.

188. The system of any one of embodiments 185 to 187, wherein the dispersant comprises a polyelectrolyte.

189. The system of any one of embodiments 185 to 188, wherein the dispersant comprises polysulfonate, polycarboxylate or a combination thereof.

190. The system of any one of embodiments 185 to 189, wherein the dispersant comprises a lignosulfonate, polymelamine sulfonate, polystyrene sulfonate, polynaphthalene sulfonate or a combination thereof.

191. The system of any one of embodiments 185 to 190, wherein the dispersant comprises polynaphthalene sulfonate.

191A. The system of any one of embodiments 185 to 191, wherein the dispersant comprises polyacrylate having a weight average molecular weight less than 10,000 Daltons.

192. The system of any one of embodiments 185 to 191A, wherein the dispersant comprises an anionic, cationic, amphoteric or zwitterionic surfactant.

193. The system of any one of embodiments 185 to 192, wherein the dispersant comprises a nonionic surfactant and preferably the carrier fluid comprises brine.

194. The system of any one of embodiments 185 to 193, wherein a weight ratio of dispersant to fines is from about 1:500 to about 10:90.

195. The system of any one of embodiments 185 to 194, wherein the fines comprise silica.

196. The system of any one of embodiments 185 to 195, wherein the fines comprise calcium carbonate.

197. The system of any one of embodiments 185 to 196, wherein the fines are agglomerated in the slurry.

198. The system of any one of embodiments 185 to 197, wherein the slurry comprises a volume fraction of solids of from about 0.45 up to the PVF.

199. The system of any one of embodiments 185 to 198, wherein the slurry comprises a volume fraction of carrier fluid from (1-PVF) to 0.55, preferably up to 2.5*(1-PVF).

200. The system of any one of embodiments 185 to 199, wherein the proppant PSD mode is from 100 to 2000 microns and the fines PSD mode is from 1 to 20 microns.

201. The system of any one of embodiments 185 to 200, wherein the proppant PSD mode is from 18 to 900 times larger than the fines PSD mode.

202. The system of any one of embodiments 185 to 201, wherein the slurry further comprises one or more intermediate PSD modes selected from the group consisting of: PSD modes from 2 to 60 times smaller than the proppant PSD mode, PSD modes from 1.1 to 60 times larger than the fines PSD mode, and combinations thereof.

203. The system of embodiment 202, wherein at least one of the intermediate PSD modes is degradable.

204. The system of embodiment 202 or 203, wherein the intermediate PSD modes include a relatively larger intermediate PSD mode and a relatively smaller intermediate PSD mode, preferably wherein the larger intermediate PSD mode is from 2 to 15 times smaller than the proppant PSD mode and from 1.25 to 15 times larger than the smaller intermediate PSD mode, and wherein the smaller intermediate mode is from 1.1 to 15 times larger than the fines PSD mode.

205. The system of embodiment 204, further comprising a middle intermediate PSD mode from 1.5 to 4 times smaller than the larger intermediate PSD mode and 1.25 to 2.5 times larger than the smaller PSD mode.

206. The system of embodiment 204 or 205, wherein the relatively larger intermediate PSD mode is degradable.

207. The system of any one of embodiments 185 to 206, wherein the carrier fluid is a low viscosity fluid free of viscosifier or comprising viscosifier in an amount less than 2.4 g of viscosifier per liter of carrier fluid (20 lb/1000 gal).

208. A slurry, comprising: a solids mixture in a carrier fluid, wherein the solids mixture comprises first, second, third and fourth volume-averaged particle size distribution (PSD) modes such that a packed volume fraction (PVF) of the solids mixture is greater than 0.75, preferably greater than 0.80; a solids volume fraction (SVF) of the slurry less than the PVF of the solids mixture; wherein the first PSD mode is at least three times larger than the second PSD mode, the second PSD mode is larger than the third PSD mode, and the third PSD mode is larger than the fourth PSD mode, and wherein at least one of the second and third PSD modes is less than 3 times larger than the respective third or fourth PSD mode.

209. The slurry of embodiment 208, wherein the solids mixture further comprises a fifth PSD mode, wherein the fourth PSD mode is larger than the fifth PSD mode and preferably less than 3 times larger than the fifth PSD mode.

210. The slurry of embodiment 208, wherein the first PSD mode is from 3 to 10 times larger than the second PSD mode (preferably about 5 to about 7, more preferably about 5.4 to about 6.9, especially about 5.6 to about 6.6 times larger than the second PSD mode), the second PSD mode is from 1.5 to 4 times larger than the third PSD mode (preferably from about 2 to about 2.4 times larger than the third PSD mode), and the third PSD mode is at least 1.25 times larger than the fourth PSD mode.

211. The slurry of embodiment 210, wherein the solids mixture further comprises a fifth PSD mode, wherein the fourth PSD mode is at least 1.1 times larger than the fifth PSD mode.

212. The slurry of any one of embodiments 208 to 211, wherein the first PSD mode is from about 422 microns up to about 853 microns (20/40 mesh), the second PSD mode is from about 60 microns up to about 180 microns (preferably from about 100 microns up to about 150 microns), the third PSD mode is from about 25 microns up to about 70 microns (preferably from about 40 microns up to about 60 microns), and the fourth PSD mode is from about 1 micron up to about 40 microns.

213. The slurry of embodiment 212, wherein the solids mixture further comprises a fifth PSD mode smaller than the fourth PSD mode, wherein the fifth PSD mode is from about 1 micron up to about 25 microns.

214. The slurry of any one of embodiments 208 to 213, wherein the solids mixture further comprises a fifth PSD mode smaller than the fourth PSD mode, wherein the fifth PSD mode is at least 1 micron and the first PSD mode is from about 422 microns (40 mesh) up to about 853 microns (20 mesh).

215. The slurry of any one of embodiments 208 to 214, wherein the second PSD mode comprises a total SVF from 5 to 30 percent (preferably from 10 to 20 percent, more preferably from 10 to 15 percent), the third PSD mode comprises a total SVF from 3 to 20 percent (preferably from 3 to 10 percent), and the fourth PSD mode comprises a total SVF from 5 to 40 percent (preferably from 10 to 30 percent), based on a total SVF of the first PSD mode.

216. The slurry of embodiment 215, wherein the solids mixture further comprises a fifth PSD mode smaller than the fourth PSD mode, wherein the fifth PSD mode comprises a total SVF from 1 to 40 percent, based on a total SVF of the first PSD mode.

217. The slurry of any one of embodiments 208 to 216, wherein the second PSD mode comprises a total SVF from 5 to 30, preferably 10 to 20, percent of a total SVF of the first PSD mode; the third PSD mode comprises a total SVF from 10 to 100, preferably 30 to 60, percent of the total SVF of the second PSD mode; and the fourth PSD mode comprises a total SVF from 10 to 500, preferably 100 to 400, percent of the total SVF of the third PSD mode.

218. The slurry of embodiment 217, wherein the solids mixture further comprises a fifth PSD mode, wherein the fifth PSD mode comprises a total SVF from 20 to 100, preferably 30 to 80, percent of the total SVF of the fourth PSD mode.

219. The slurry of any one of embodiments 208 to 218, wherein the first PSD mode comprises a total SVF from 60 to 80 percent of the total SVF of the solids mixture.

220. The slurry of embodiment 208, wherein the first PSD mode is between 20 and 40 mesh (422-853 μm), the second PSD mode is from about 100 μm to about 280 μm and, the third PSD mode is from about 15 μm to 60 μm, and the fourth PSD mode is from about 1 μm to 25 μm.

221. The slurry of embodiment 220, further comprising a fifth PSD mode wherein the fourth PSD mode is larger than the fifth PSD mode.

222. The slurry of any one of embodiments 208 to 221, wherein the slurry further comprises a fluid loss agent to inhibit leak-off from the slurry.

223. The slurry of embodiment 222, wherein the fluid loss agent is selected from the group consisting of: latex dispersions, water soluble polymers, submicron particulates, particulates with an aspect ratio higher than 6, and combinations thereof.

224. The slurry of embodiment 222 or 223, wherein the fluid loss agent comprises crosslinked polyvinyl alcohol microgel.

225. The slurry of any one of embodiments 222 to 224, wherein the fluid loss agent further comprises AMPS.

226. The slurry of any one of embodiments 208 to 225, wherein the solids mixture comprises a PVF of at least 0.85, 0.90, 0.95, 0.96, 0.97, 0.98 or 0.99.

227. The slurry of any one of embodiments 208 to 226, wherein at least one of the second, third or fourth PSD modes comprises a degradable material.

228. The slurry of embodiment 227, wherein the solids mixture comprises a reactive material.

229. The slurry of any one of embodiments 208 to 226, wherein the solids mixture further comprises a fifth PSD mode, wherein at least one of the second, third, fourth or fifth PSD modes comprises a degradable material.

230. The slurry of embodiment 229, wherein the solids mixture comprises a reactive material.

231. A method, comprising: combining a solids mixture and a carrier fluid to form the slurry of any one of embodiments 208 to 230; and positioning a screen in a wellbore and circulating the slurry through the wellbore in any order such that the solids mixture is deposited between the screen and the wellbore.

232. The method of embodiment 231, wherein the slurry is circulated in a horizontal portion of the wellbore from toe to heel.

233. The method of any one of embodiments 231 to 232, wherein the slurry is circulated in the wellbore at a pressure less than the fracture pressure.

234. The method of any one of embodiments 231 to 233, wherein the slurry is circulated in the wellbore at a rate of less than 800 L/min (5 BPM).

235. The method of claim any one of embodiments 231 to 234, wherein the slurry is circulated in the wellbore through a washpipe, wherein a screen-wellbore annulus has a radial thickness relatively less than a radial thickness of a washpipe-screen annulus.

236. The method of any one of embodiments 231 to 256, wherein the slurry is circulated in a horizontal portion of the wellbore from toe to heel.

237. The method of any one of embodiments 231 to 257, wherein the first, second, third, fourth and any other particulates in the slurry are formed into a pack in an annulus between the screen and the wellbore.

238. The method of embodiment 258, further comprising converting the pack into a permeable gravel pack comprising the first amount of particulates.

239. A system, comprising: a well bore in fluid communication with a subterranean formation; a gravel packing slurry comprising the slurry of any one of embodiments 208 to 230; a pump to circulate the slurry in the wellbore and a workstring to position a screen in the wellbore in either order to deposit the slurry in one or both of a fracture in the formation and an annulus between the screen and the formation; and means for converting the deposited slurry to a gravel pack.

240. The system of embodiments 239, further comprising a washpipe to circulate the slurry through the screen, wherein a screen-wellbore annulus has a radial thickness relatively less than a radial thickness of a washpipe-screen annulus.

241. A system, comprising: a well bore in fluid communication with a subterranean formation; a gravel packing slurry comprising a carrier fluid and a solids mixture, wherein the solids mixture comprises a plurality of volume-averaged particle size distribution (PSD) modes such that a packed volume fraction (PVF) exceeds 0.75, preferably exceeds 0.8, wherein the solids mixture comprises at least a proppant PSD mode, a fines PSD mode, and one or more intermediate PSD modes selected from the group consisting of: PSD modes from 2 to 60 times smaller than the proppant PSD mode, PSD modes from 1.1 to 60 times larger than the fines PSD mode, and combinations thereof, wherein any two of the proppant, intermediate and fines PSD modes have a size ratio less than 3; and a pump to circulate the slurry in the wellbore to deposit the solids mixture and form a proppant pack in one or both of a fracture in the formation and an annulus between a screen and the formation.

242. The system of embodiment 241, wherein the intermediate PSD modes include a relatively larger intermediate PSD mode and a relatively smaller intermediate PSD mode, preferably wherein the larger intermediate PSD mode is from 2 to 15 times smaller than the proppant PSD mode and from 1.25 to 15 times larger than the smaller intermediate PSD mode, and wherein the smaller intermediate mode is from 1.1 to 15 times larger than the fines PSD mode.

243. The system of embodiment 241, further comprising a middle intermediate PSD mode from 1.5 to 4 times smaller than the larger intermediate PSD mode and 1.25 to 2.5 times larger than the smaller PSD mode.

244. The system of embodiment 242 or 243, wherein at least one intermediate PSD mode is degradable, preferably the relatively larger PSD mode.

245. A method, comprising: combining a carrier fluid and a solids mixture to form a slurry, wherein the solids mixture comprises a plurality of volume-averaged particle size distribution (PSD) modes such that a packed volume fraction (PVF) exceeds 0.75, preferably exceeds 0.8, wherein the solids mixture comprises at least a proppant PSD mode, a fines PSD mode, and one or more intermediate PSD modes selected from the group consisting of: PSD modes from 2 to 60 times smaller than the proppant PSD mode, PSD modes from 1.1 to 60 times larger than the fines PSD mode, and combinations thereof, wherein any two of the proppant, intermediate and fines PSD modes have a size ratio less than 3; and circulating the slurry through a wellbore to form a proppant pack from depositing the solids mixture in one or both of a fracture in a formation and an annulus between a screen and the wellbore.

246. The method of embodiment 245, wherein the intermediate PSD modes include a relatively larger intermediate PSD mode and a relatively smaller intermediate PSD mode, preferably wherein the larger intermediate PSD mode is from 2 to 15 times smaller than the proppant PSD mode and from 1.25 to 15 times larger than the smaller intermediate PSD mode, and wherein the smaller intermediate mode is from 1.1 to 15 times larger than the fines PSD mode.

247. The method of embodiment 246, further comprising a middle intermediate PSD mode from 1.5 to 4 times smaller than the larger intermediate PSD mode and 1.25 to 2.5 times larger than the smaller PSD mode.

248. The method of embodiment 246 or 247, wherein at least one intermediate PSD mode is degradable, preferably the relatively larger PSD mode.

EXAMPLES

Example 1

A 1 g sample of $Al(OH)_3$ was added to 20 ml deionized (DI) water. The mixture pH was measured to be 7.7. The particles of $Al(OH)_3$ were insoluble in the DI water at this pH and the mixture was a milky white slurry. The pH of the solution was raised to 11.8 by adding 1.5 ml of 50 wt % NaOH and the $Al(OH)_3$ was dissolved, yielding a clear solution.

Example 2

A 1 g sample of $Al(OH)_3$ was added to 20 ml DI water to form a cloudy slurry as in Example 1. The mixture pH was measured to be 7.2. The mixture pH was decreased by adding 9 ml of 15 wt % HCl. After 18 hours, the $Al(OH)_3$ dissolved completely and the resulting solution was clear.

Example 3

A slurry containing sand and salt particles was made using saturated sodium chloride solution (density=1.2 g/mL (10 ppg)) as a carrier fluid. The volume fraction and size of the salt particles were as shown in Table 1 below.

TABLE 1

Volume Fractions in Saturated Brine Slurry

| Component (mean PSD) | Volume fraction | Total |
|---|---|---|
| Sand | 49% | 443.8 g |
| NaCl crystals (115 microns) | 8% | 59.4 g |
| NaCl crystals (5 micron) | 16% | 118.8 g |
| NaCl Brine (1.2 g/mL (10 ppg)) | 27% | 90 ml |

The slurry was stable and when it was brought into contact with fresh water, the salt particles in the slurry dissolved leaving a porous sand pack.

Example 4

Fines flowback was investigated using an experimental setup consisting of a 51 mm (2-in.) long gravel pack containing 20% fines by volume of the gravel in a 25 mm (1-in.) inside diameter tube embedded between clean gravel packs without any fines on both sides. The clean gravel packs served to distribute the flow and to eliminate the end effects at the entry and exit. A displacement fluid was injected at 5 mL/min or 15 mL/min for 30 min and the mass of fines remaining in the pack was measured at the end of the run. The displacement fluid was 2 wt % aqueous KCl unless specified otherwise. The gravel was 20/40 mesh (620 microns) or 16/20 mesh (1015 microns) CARBOLITE proppant. The fines were 2 micron calcium carbonate. The results are presented in Table 2 below.

TABLE 2

CaCO3 cleanup as a function of gravel size and flow rate (no dispersant)

| Flow back rate, ml/min | Fines | Gravel Size | Gravel mass, g | Initial fines, g | Final fines, g | Cleanup, % |
|---|---|---|---|---|---|---|
| 5 | CaCO3 (2 µm) | 20/40 | 29.36 | 6.66 | 6.46 | 3.0 |
|   |   | 16/20 | 33.66 | 7.59 | 6.95 | 8.4 |
| 15 | CaCO3 (2 µm) | 20/40 | 34.16 | 7.93 | 6.5 | 18.0 |
|   |   | 16/20 | 34.16 | 6.96 | 6.25 | 10.2 |

These results showed that the calcium carbonate fines did not easily flow out of the gravel pack. Next, the flow back tests were repeated under different conditions as shown in Table 3 below.

TABLE 3

| | | | | | | | | | |
|---|---|---|---|---|---|---|---|---|---|
| CaCO₃ cleanup by flow back | | | | | | | | | |
| Run No. | Gravel (620 μm), g | CaCO₃ (125 μm), g | CaCO₃ (2 μm), g | Mix fluid (10 mL) | Displacing fluid | Dispersant, ml | Flow back rate, ml/min | Time, min | Cleanup, % |
| 4-1 | 50 | | 12.5 | DI | 2% KCl | 0 | 5 | 30 | 13 |
| 4-2 | 50 | | 12.5 | DI | 2% KCl | 0.1 | 5 | 30 | 98 |
| 4-3 | 50 | | 12.5 | 2% KCl | 2% KCl | 0.1 | 5 | 30 | 41 |
| 4-4 | 50 | | 12.5 | 2% KCl | 2% KCl | 0.4 | 5 | 30 | 99 |
| 4-5 | 50 | | 12.5 | 2% TMAC | 2% KCl | 0.1 | 5 | 30 | 73 |
| 4-6 | 50 | 6 | 12.5 | DI | 2% KCl | 0.1 | 5 | 30 | 44 |
| 4-7 | 50 | | 24.6 | DI | 2% KCl | 0.2 | 5 | 30 | 72 |

Notes:
DI = deionized water
TMAC = tetramethylammonium chloride
Dispersant = polynaphthalene sulfonate Runs 4-1 and 4-2 showed that the addition of a small amount (1%) of dispersant, polynaphthalene sulfonate, increases the fines flow back from 13% to 98%. In these runs the fines were mixed with gravel using deionized (DI) water as a carrier. In Run 4-3, when the slurry was made using 2% KCl, the clean up reduced to 41%. However, increasing the concentration of dispersant with the 2% KCl carrier fluid in Run 4-4, the cleanup increased from 41% to 99%. Similar results were observed in Run 4-5 when the slurry was made with 2% tetramethyl ammonium chloride (TMAC).

In Run 4-6, the conditions of Run 4-2 were repeated except that the gravel pack additionally included 6 g of 125 micron calcium carbonate. Fines removal using the same amount of dispersant was not as rapid but was still much improved over the no dispersant case, Run 4-1, suggesting that additional dispersant would obtain comparable cleanup with and without the presence of the intermediate PSD mode. In Run 4-7, the amounts of calcium carbonate fines and dispersant were each doubled, and the fines cleanup was only slightly reduced relative to Run 4-2, but again much improved relative to Run 4-1 without dispersant. The data in Table 3 thus demonstrate that flow back of the calcium carbonate fines can be facilitated by the presence of a relatively small amount of dispersant.

Example 5

Flow back tests similar to Example 4 were then run using 2-micron silica fines, with the conditions and results shown below in Table 4.

TABLE 4

| | | | | | | | | | |
|---|---|---|---|---|---|---|---|---|---|
| SiO₂ cleanup by flow back | | | | | | | | | |
| Run No. | Gravel (620 μm), g | SiO₂ (150 μm), g | SiO₂ (2 μm), g | Mix fluid (10 mL) | Displacing fluid | Dispersant, ml | Flow back rate, ml/min | Time, min | Cleanup, % |
| 5-1 | 50 | | 12.5 | DI | 2% KCl | 0 | 5 | 30 | 8 |
| 5-2 | 50 | | 12.5 | DI | 2% KCl | 0.1 | 5 | 30 | 70 |
| 5-3 | 50 | | 12.5 | 2% TMAC | 2% KCl | 0.1 | 5 | 30 | 18 |
| 5-4 | 50 | | 12.5 | 2% TMAC | 2% KCl | 0.1 | 5 | 30 | 17 |
| 5-5 | 50 | | 12.5 | 2% TMAC | 2% KCl | 0.2 | 5 | 30 | 23 |
| 5-6 | 50 | | 12.5 | 2% TMAC | 2% KCl | 0.6 | 5 | 30 | 72 |
| 5-7 | 50 | 6 | 12.5 | DI | 2% KCl | 0.1 | 5 | 30 | 72 |
| 5-8 | 50 | | 12.5 | DI | 2% KCl | 0.2 | 1 | 105 | 83 |

Notes:
DI = deionized water
TMAC = tetramethylammonium chloride
Dispersant = polynaphthalene sulfonate Runs 5-1 and 5-2, with and without dispersant, show that the flow back results can be significantly improved by dispersing the $SiO_2$ fines using polynaphthalene sulfonate. Similar to the calcium carbonate fines in Example 4, when the gravel pack was prepared using 2% TMAC in Runs 5-3 to 5-6, it was observed that the flow back results could be improved by increasing the concentration of dispersant relative to the fines.

In Run 5-7, where the gravel pack included an intermediate PSD mode of 150-micron silica, the flow back of the fine silica particles was not affected by the presence of the medium particles. Theoretically, the pore space of 150-micron diameter spheres is 25 microns, which should not restrict dispersed 2-micron particles.

Run 5-8 with displacement fluid at 1 ml/min showed that although the flow back of fines occurred at a slower rate, 83% cleanup was obtained after 105 min.

Example 6

Flow back tests similar to Examples 4 and 5 were then run using 5-micron sodium chloride salt fines in saturated NaCl brine (1.2 g/mL (10 lb/gal)), with the conditions and results shown below in Table 5.

TABLE 5

NaCl cleanup by flow back

| Run No. | Gravel (620 μm), g | NaCl (5 μm), g | Mix fluid (10 mL) | Displacing fluid | Flow back rate, ml/min | Time, min | Cleanup, % |
|---|---|---|---|---|---|---|---|
| 6-1 | 50 | 10.18 | NaCl brine | NaCl brine | 5 | 30 | 68 |
| 6-2 | 50 | 19.6 | NaCl brine | NaCl brine | 5 | 30 | 41 |

Saturated brine was used for the slurry and displacement to avoid dissolution of the fines in these runs, although in practice any undersaturation of the displacement fluid enhances fines removal by dissolving the fines. Although as a percentage the fines removal was more rapid in Run 6-1 using 10.18 g NaCl in the gravel pack than in Run 6-2, the gross total fines removed was faster in Run 6-2 with more fines in the gravel pack; and fines cleanup is essentially complete in Run 6-2 if the flow back is extended to 72 hours.

Example 7

The use of a spacer to inhibit leak-off into a screen using a screen stab-in technique was investigated. In Run 7-1, a 0.3 wt % guar solution was placed in a beaker, and a cylindrical screen with a 5 gauge screen element and a length exceeding the height of the beaker was inserted into the solution in a vertical orientation. The guar solution immediately filled up the interior of the screen and the liquid level in the annulus between the screen and the wall of the beaker was unchanged.

In Run 7-2, the experiment was repeated with the addition of 0.9 wt % polyglycolic acid (PGA) having a mean particle size of 150 microns (d50=150 μm) in the guar solution. The liquid level in the screen-beaker annulus increased when the screen was inserted, and even after 1.5 hours only a small volume of the spacer had leaked into the screen.

In Run 7-3, the experiment was repeated using a trimodal slurry having the composition set out in Table 6, without using any spacer fluid.

TABLE 6

Slurry composition for Runs 7-3 and 7-4

| Component | Particle Size (μm) | Volume (mL) | Weight (g) |
|---|---|---|---|
| Ottawa sand | d50 = 600 | 335 | 888 |
| Silica | d50 = 30 | 56.6 | 150 |
| Silica | d50 = 3 | 109.4 | 290 |
| DI Water | — | 190 | 190 |

The screen was inserted into the slurry and moved up and down in a reciprocating motion in the slurry. After three repetitions, the slurry dehydrated due to leak-off into the screen and the screen became stuck in the solids mixture.

In Run 7-4, the experiment was repeated using the slurry of Table 6 in the bottom of the beaker and the spacer fluid of Run 7-2 floating on top of the slurry. The screen was inserted into the slurry by passing it through the spacer fluid. After 15 repetitions of reciprocating motion, the slurry remained fluid, the screen could still be moved in the slurry and very little fluid leaked into the screen from the slurry. These data show that contacting the screen with a spacer fluid containing a degradable bridging particle in advance of the multimodal slurry contact was effective in inhibiting fluid leak-off from the multimodal slurry to maintain flowability of the slurry.

Example 8

The design of a high-solids slurry to inhibit leak-off into a screen by forming a bridge on the screen was investigated. Two trimodal slurries were prepared using the compositions in Table 7.

TABLE 7

Slurry composition for Runs 8-1 and 8-2

| Component | Particle Size (d50, μm) | Run 8-1 (g) | Run 8-2 (g) |
|---|---|---|---|
| Sand | 600 | 888 | |
| Sand | 280 | | 888 |
| Silica | 30 | 150 | 150 |
| Silica | 3 | 290 | 290 |
| DI Water | — | 190 | 190 |

A 5 gauge closed-end screen was inserted into the two slurries and was moved up and down in a reciprocating motion in the slurries, in the same manner as in Example 7. In the slurry of Run 8-1 the screen was stuck after 3 repetitions, whereas in Run 8-2 the screen was mobile in the slurry even after 10 repetitions. In Run 8-2, small bridges of particles were observed on the screen during the reciprocating motion. This example shows that the slurry of Run 8-2 controls leak-off into the screen, thereby maintaining its fluidity during the screen stab-in process, or during the slurry placement in the screen-first process.

Example 9

The design of a four-particle high-solids slurry using standard gravel sizes (20/40 mesh) to inhibit leak-off into a screen by forming a bridge on the screen was investigated. In an initial testing protocol, a syringe fluid loss experiment was conducted by loading 30 mL of slurry into a 60 mL syringe fitted with a 60 mesh (250 μm openings) screen at the exit. The plunger was displaced up to the 50 mL mark on the syringe and the spurt was measured on a balance, after the spurt measurement, the syringe was turned upside down and the thickness of the filter cake collected on the screen was measured. Multimodal slurries were prepared using the compositions in Table 8. The spurt and filter cake thickness of three slurries made with 20/40 CARBOLITE as a coarse particle are shown in Table 8 for Runs 9-1, 9-2 and 9-3. The filter cake thickness was reported as volume occupied in the 60 mL syringe. Since the initial volume of slurry in the syringe was 30 mL, a filter cake thickness of 30 mL indicated that the slurry lost all its liquid content and what was left in the syringe was essentially a solid plug. The results in Table 8 show that varying the size of the medium particle from 32 μm to 125 μm to 200 μm did not help in controlling leak-off. In all three slurries of Runs 9-1, 9-2 and 9-3, the liquid required to keep the slurry flowable was lost in the spurt stage leaving behind a thick filter cake.

TABLE 8

Slurry Composition and Spurt Results for Runs 9-1 to 9-6

| Component | Run 9-1 | Run 9-2 | Run 9-3 | Run 9-4 | Run 9-5 | Run 9-6 |
|---|---|---|---|---|---|---|
| CARBOLITE (20/40, 620 μm), g | 100 | 100 | 100 | 50 | 50 | 50 |
| CARBOLITE (40/70, 300 μm), g | | | 16 | | | |
| Silica (200 μm), g | | | | 6 | 6 | |
| CaCO3 (125 μm), g | 16 | | | | | |
| Silica (32 μm), g | | 16 | | 8 | | 15 |
| Silica (3 μm), g | | 33 | | 16 | 24 | 16 |
| CaCO3 (2 μm), g | 33 | | 33 | | | |
| DI Water, g | 24 | 22 | 22 | 10 | 10 | 10.4 |
| Polynaphthalene sulfonate, ml | 0.1 | | 0.1 | | | |
| Spurt Results | | | | | | |
| Spurt, g | 6.00 | 10 | 10 | 0.34 | 9.0 | 7.4 |
| Cake, mL | 30 | 30 | 30 | 5 | 30 | 30 |

After performing leak-off experiments with several combinations of trimodal particles it was found that an additional particle in the size range of 200 μm was able to stop the flow of 32 μm and 2 μm particles out of the 20/40 mesh gravel pack. The leak-off results in Run 9-4 with the four-particle system including an additional 200 μm particle reduced the spurt and filter cake thickness significantly. Runs 9-5 and 9-6 omitted either the 32 μm particles or the 200 μm particles, and the spurt and filter cake thickness increased significantly, showing that the presence of both 200 μm and 32 μm particles retained the fines and the liquid content in the slurry. These results suggest that the three lower sizes form an effective bridge in the 20/40 CARBOLITE pack where the 200 μm particles occupy the void space of 20/40 gravel, the 32 μm particles occupy the void space of the 200 μm particles and the 3 μm particles occupy the void space of 32 μm particles.

In additional Runs 9-7 to 9-12, the amounts of the 200 μm particles and 32 μm particles were varied and the results are listed in Table 9.

TABLE 9

Slurry Composition and Spurt Results for Runs 9-6 to 9-12

| Component | Run 9-6 | Run 9-7 | Run 9-8 | Run 9-9 | Run 9-10 | Run 9-11 | Run 9-12 |
|---|---|---|---|---|---|---|---|
| CARBOLITE (20/40, 620 μm), g | 50 | 50 | 50 | 50 | 50 | 50 | 50 |
| Silica (200 μm), g | 6 | 10 | 14 | 2 | 6 | 6 | 6 |
| Silica (32 μm), g | 8 | 8 | 8 | 8 | 12 | 15 | 4 |
| Silica (3 μm), g | 16 | 16 | 16 | 16 | 16 | 16 | 16 |
| DI Water, g | 10 | 10 | 10.5 | 9.5 | 10 | 10 | 10 |
| Spurt Results | | | | | | | |
| Spurt, g | 0.34 | 0.16 | 0.04 | 1.64 | 0.19 | 0.01 | 0.64 |
| Cake, mL | 5 | 5 | 5 | 20 | 5 | 3 | 10 |

These data indicate that the spurt and filter cake increase as the proportion of either 200 μm or 32 μm particles was reduced over the concentrations evaluated, and that the proportions of each particle can be adjusted to optimize (minimize) spurt and filter cake and maintain hydration and flowability of the slurry during placement of the slurry and/or screen.

Example 10

The ability of the four-particle high-solids slurry of Run 9-11, using standard gravel size (20/40 mesh) and having the solids composition listed in Table 10 plus a fluid loss additive, to inhibit leak-off into a screen under high differential pressure conditions was investigated. These experiments were conducted in a commercial high temperature, high pressure (HTHP) fluid loss cell by placing a 12 gauge screen coupon at one end of the cell and loading the slurry on top of the screen. The leak-off tests were conducted by applying 3.45 MPa (500 psi) differential pressure with N2 gas for a period of 30 minutes at room temperature (24 C).

TABLE 10

Slurry Solids Composition for High Pressure Screen Leak-off

| Component | Weight, g | Solid Volume, mL | Volume, % of Total Solids |
|---|---|---|---|
| CARBOLITE (20/40, 620 μm), g | 200 | 73.8 | 57 |
| Silica (200 μm), g | 24 | 9.1 | 7 |
| Silica (32 μm), g | 60 | 22.6 | 17 |
| Silica (3 μm), g | 64 | 24.2 | 19 |

Run 10-1 used a slurry prepared with crosslinked polyvinyl alcohol (PVOH) as a fluid loss additive, in the form of a 4 wt % microgel aqueous suspension in which the water-swollen microgel particles have a size of around 100 nm. In Run 10-2 a 10 wt % active solution of high molecular weight acrylamido-methyl-propane sulfonate polymer (AMPS) was added as a polymeric fluid loss additive in addition to the PVOH. The compositions of the slurries and the HTHP results are presented in Table 11.

These data show that leak-off can be effectively inhibited even at high differential pressure using a four-particle slurry with a fluid loss additive. At the same fluid loss agent loading, the filter cake thickness can be reduced by reducing the SVF of the slurry. At high SVF, even a small amount of leak-off can transform the slurry to an unmixable state which results in an inefficient cake build up as the particle packing is not efficient to control leak-off. When the slurry is well dispersed by reducing SVF, the transformation to unmixable state requires a larger volume of fluid to leak-off and the packing is also efficient resulting in a thin filter cake. Runs 10-1/10-3 and 10-4/10-5 show the effect of reducing SVF on filter cake thickness while maintaining the relative concentration of fluid loss agent in the fluid phase constant, i.e., filter cake thickness could be reduced by decreasing the SVF. Runs 10-4/10-6 show that the thickness of the filter cake could also be reduced by increasing the concentration of fluid loss agent in the liquid phase while keeping the SVF constant.

Example 11

The ability of a four-particle high-solids slurry, using standard gravel size (20/40 mesh) and having the solids composition listed in Table 12 plus a latex fluid loss additive, to inhibit leak-off into a screen under high differential pressure conditions was also investigated using the testing equipment and protocol of Example 10.

TABLE 12

Slurry Composition and High Pressure Screen Leak-off Results with Latex Fluid Loss Agent

| Component/Property | Run 11 |
|---|---|
| CARBOLITE (20/40, 620 μm), g | 200 |
| Silica (200 μm), g | 24 |
| Silica (32 μm), g | 60 |
| Silica (3 μm), g | 64 |
| Latex Dispersion, mL | 45 |
| 10% AMPS, mL | 8 |
| DI Water, mL | 52 |
| SVF | 0.57 |
| Fluid Loss Agent, vol % of liquid | 50 |
| Spurt Results | |
| Spurt, mL | 0.6 |
| 15 Minute, mL | 2.2 |

TABLE 11

Slurry Composition and High Pressure Screen Leak-off Results

| Component/Property | Run 10-1 | Run 10-2 | Run 10-3 | Run 10-4 | Run 10-5 | Run 10-6 |
|---|---|---|---|---|---|---|
| Solids (Table 10), g | 348 | 348 | 348 | 348 | 348 | 348 |
| 4% PVOH Microgel, mL | 40 | 40 | 24 | 22 | 16 | 50 |
| 10% AMPS, mL | 0 | 8 | 0 | 0 | 0 | 0 |
| DI Water, mL | 52 | 52 | 32 | 52 | 36 | 28 |
| Solids Volume Fraction | 0.58 | 0.56 | 0.70 | 0.62 | 0.72 | 0.62 |
| Fluid Loss Agent, vol % of liquid | 43 | 40 | 43 | 30 | 30 | 64 |
| Spurt Results | | | | | | |
| Spurt, g | 2.4 | 3.0 | 0 | 0 | 0 | 3.0 |
| 15 Minute, g | 4.6 | 5.0 | 1.6 | 2.4 | 1.8 | 4.4 |
| 30 Minute, g | 5.6 | 6.4 | 2.6 | 3.8 | 3.0 | 5.0 |
| Filter cake, mm (in.) | 7.1 (0.28) | 5.6 (0.22) | 11.2 (0.44) | 15.1 (0.59) | 17.6 (0.69) | 8.0 (0.31) |

TABLE 12-continued

Slurry Composition and High Pressure Screen
Leak-off Results with Latex Fluid Loss Agent

| Component/Property | Run 11 |
|---|---|
| 30 Minute, mL | 3.2 |
| Filter cake, mm | 4.8 |

Run 11 showed that latex provides very good fluid loss control and results in a thin filter cake in a four-particle slurry.

Example 12

The testing equipment and protocol of Example 7 was used to demonstrate the screen stab-in performance of a four-particle slurry system. Trimodal and tetramodal slurries were prepared as listed in Table 13.

TABLE 13

Slurry Compositions and Screen Stab-in Results

| Component/Property | Run 12-1 | Run 12-2 |
|---|---|---|
| Slurry Type | Trimodal | Tetramodal |
| CARBOLITE (20/40, 620 μm), g | 1600 | 1600 |
| Silica (200 μm), g | 0 | 384 |
| Silica (32 μm), g | 267 | 480 |
| Silica (3 μm), g | 563 | 512 |
| 4% PVOH Microgel, mL | | 160 |
| 10% AMPS, mL | | 62 |
| DI Water, mL | 300 | 416 |
| Screen Stab-In Results | | |
| Number of Stabs | 26 | 30 |
| Fluid Entering Screen, mL | 150 | 0 |

If the slurry leaks into the screen as it is stabbed into the slurry, the slurry loses its flow properties and the screen becomes stuck or difficult to move in the slurry during reciprocation. After 26 stabs with the trimodal slurry in Run 12-1, a significant amount of fluid had entered the screen, i.e. 50% of the total liquid volume in the slurry. The slurry outside the screen was dehydrated and had lost its flow properties at the end of the experiment. With the tetramodal slurry and fluid loss agent in Run 12-2, after 30 stabs there was no fluid that had leaked into the screen at the end of the experiment. The tetramodal slurry had entirely stopped leak-off into the screen.

Example 13

In this example, the effects of varying the size and concentration of the smaller particles in a 4-mode PSD system were investigated. A series of syringe fluid loss tests similar to Example 9 were performed where the particle size and concentration of the second particle were varied. In these tests, the first particle was 20/40 CARBOLITE proppant (average diameter 770 μm), and the other particles were made of silica. The size and concentration of the second particle were varied, the third particle had an average diameter of 32 μm and the fourth particle had an average diameter of 3 μm. A dry blend was made using the four particles by mixing 50 g CARBOLITE, x g of the second particle, 5 g of the third particle and 10 g of the fourth particle, where x was 5.5 g, 7 g, 9 g or 12 g. The dry blend was made into slurry by adding 10.5 ml of DI water. Table 14 lists the fluid loss observed in the syringe tests for the different slurries.

TABLE 14

Slurry Composition and Syringe Fluid Loss Data for Runs 13-1 to 13-4
(Second Particle Size and Concentration Varied)

| Second Particle | | | Run 13-1 | Run 13-2 | Run 13-3 | Run 13-4 |
|---|---|---|---|---|---|---|
| Concentration, g (P1/P2/P3/P4) → | | | 50/5.5/5/10 | 50/7/5/10 | 50/9/5/10 | 50/12/5/10 |
| Size (P1/P2/P3/P4 = 770/x/32/3, μm) | | | | | | |
| Mesh | Size Range, μm | Average Size, μm | LEAK-OFF (mL) | | | |
| −50/+60 | 250-297 | 274 | ND | ND | 5.90 | ND |
| −60/+70 | 210-250 | 230 | ND | ND | 5.38 | 3.1 |
| −70/+100 | 149-210 | 180 | 4.32 | 2.13 | 1.92 | 0.72 |
| −100/+140 | 105-149 | 127 | 1.14 | 0.42 | 0.72 | 0.26 |
| −140/+170 | 88-105 | 96.5 | 1.68 | 0.60 | 0.31 | 0.2 |
| −170/+200 | 74-88 | 81 | 4.65 | 4.80 | 0.70 | 0.3 |
| −200/+230 | 63-74 | 68.5 | ND | 6.35 | 0.65 | 0.4 |
| −230/+270 | 53-63 | 58 | ND | ND | 3.28 | 0.57 |
| −270/+400 | 37-53 | 45 | ND | ND | 5.50 | 3.35 |

ND = Not Determined

Figure 23:
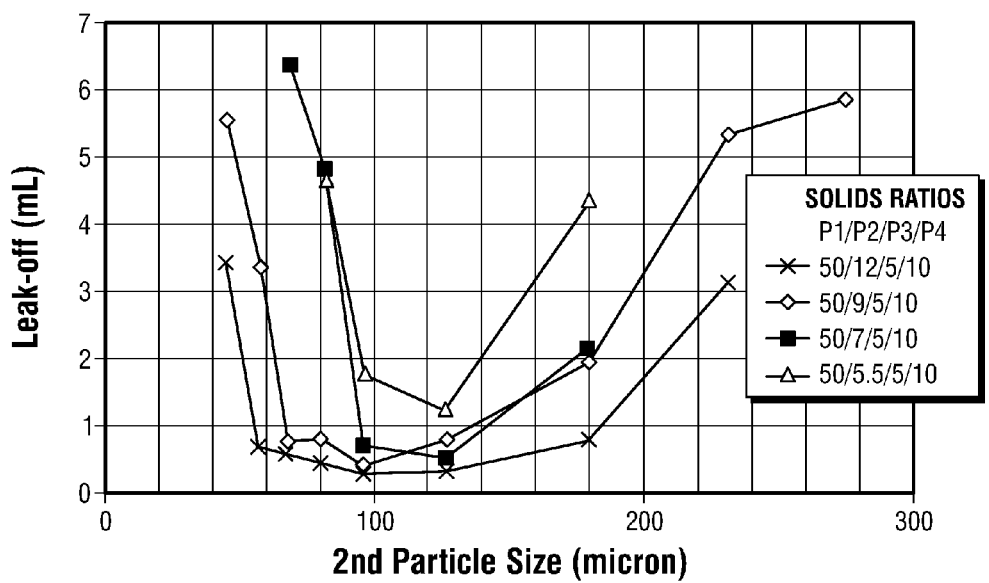
FIG. 23 is a plot of syringe leak-off for a tetramodal slurry as a function of the second largest particle size at different concentrations of the second largest particle, according to an embodiment of the invention as discussed in Example 13.

The data are plotted in FIG. 23 as a function of the second particle size. As illustrated in FIG. 23, high concentrations of the second particle relative to the first particle can allow a broader range of the average size of the second particle to be used to reduce leak-off. However, a carefully selected second particle size can allow lower concentrations of the second particle to be used, potentially facilitating clean up or removal of the smaller particles to convert the packed particles from the slurry into a porous, permeable gravel/or proppant pack. For example, at 12 g of the second particle per 50 g 20/40 CARBOLITE first particles, an average second particle size anywhere between 60 μm and 180 μm effectively bridged the gap between the 20/40 CARBOLITE particles leading to low leak-off. As the concentration of the second particle was reduced to 5.5 g, however, only second particles in the average size range between 100 μm and 150 μm controlled leak-off, with an optimum particle size of about 127 μm+/−10 or 15 μm. This example shows that the ratio of the average sizes of the first to second particle in this example should be within the range of about 770/(127+15) ~5.4 to about 770/(127−15) ~6.9, preferably from about 5.6 to about 6.6, or ideally about 770/127~6.06.

Another series of tests were then run using the 127 μm second particle while varying the size of the third particle as shown in Table 15 below.

TABLE 15

Slurry Composition and Syringe Fluid Loss Data
for Run 13-5 (Third Particle Size Varied)
Third Particle Run 13-5
Concentration, g (P1/P2/P3/P4) 50/7/3/10
Size (P1/P2/P3/P4 = 770/127/x/3, μm)

| Mesh | Size Range, μm | Average Size, μm | LEAK-OFF (mL) |
|---|---|---|---|
| −140/+170 | 88-105 | 96.5 | 7.78 |
| −200/+230 | 63-74 | 68.5 | 1.3 |
| −230/+270 | 53-63 | 58 | 0.58 |
| −270/+400 | 37-53 | 45 | 0.97 |
| | 27-37 | 32 | 1.55 |
| | | 11 | 7.84 |

Figure 24:
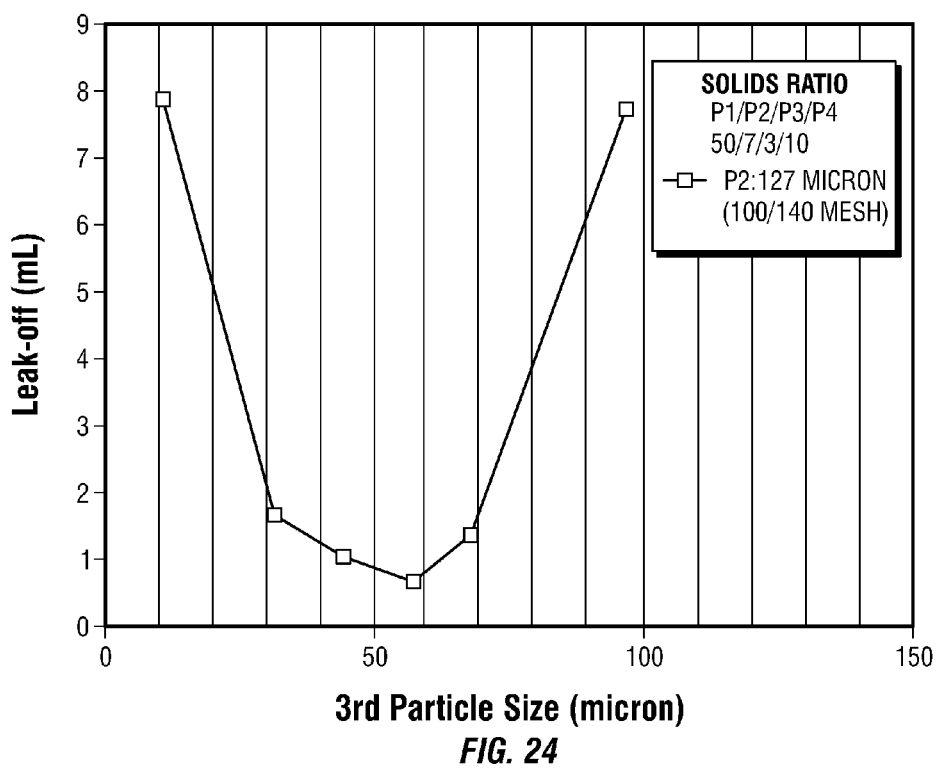
FIG. 24 is a plot of syringe leak-off for a tetramodal slurry as a function of the third largest particle size, according to an embodiment of the invention as discussed in Example 13.

The data are plotted in FIG. 24 as a function of the third particle size. The plot shows that the lowest leak-off rate at this concentration was obtained for the 58 μm third particles, establishing a range of the ratio of the second particle average size to that of the third particle of from about 2.0 to about 2.4, ideally about 2.18.

Figure 25:
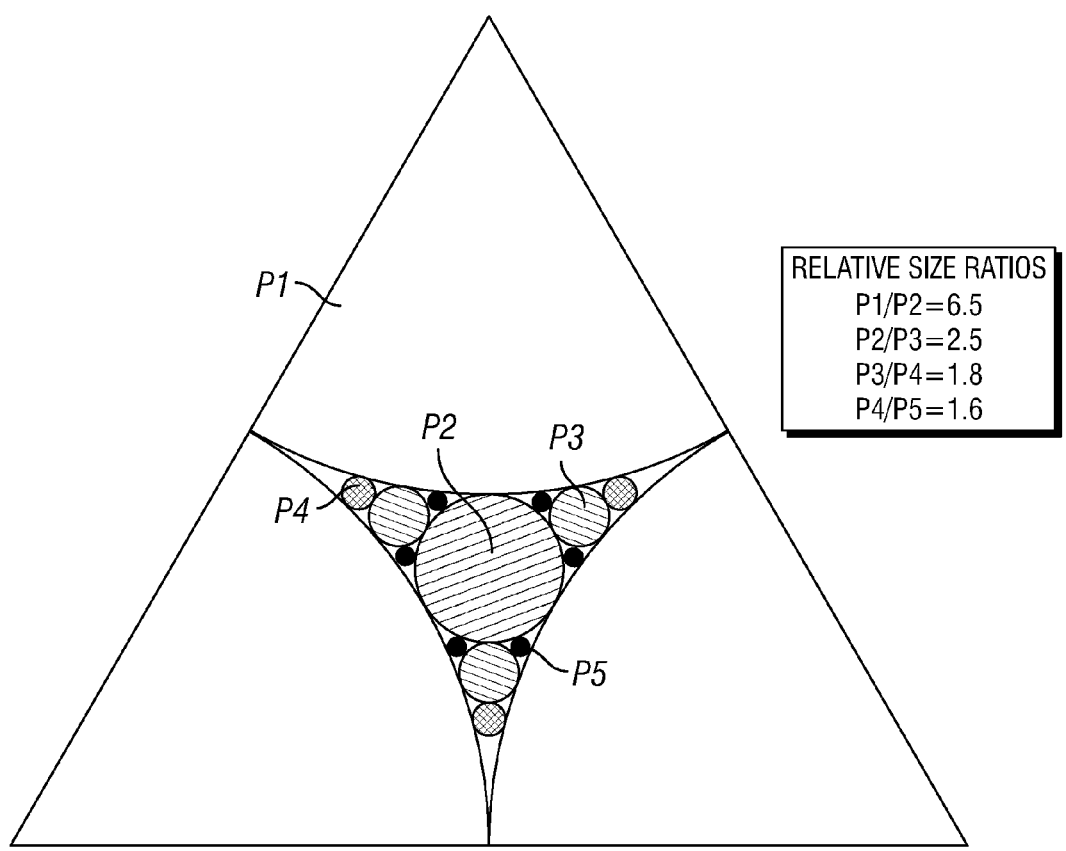
FIG. 25 illustrates a tetramodal particle packing model based on the Descartes circle theorem involving mutually tangent circles, according to an embodiment of the invention as discussed in Example 13.

An approximate packing model for the particle size ratios according to one embodiment is seen in FIG. 25, which was obtained using the Descartes circle theorem. For four mutually tangent circles with curvatures, $P_n$, $P_{n+1}$, $P_{n+2}$, and $P_{n+3}$, the following equation (1) is applicable:

$$\frac{1}{P_n^2} + \frac{1}{P_{n+1}^2} + \frac{1}{P_{n+2}^2} + \frac{1}{P_{n+3}^2} = \frac{1}{2}\left(\frac{1}{P_n} + \frac{1}{P_{n+1}} + \frac{1}{P_{n+2}} + \frac{1}{P_{n+3}}\right)^2 \quad (1)$$

where $P_n$ is the curvature of circle n, where curvature is taken as the reciprocal of the radius. For example, when three equally sized spheres (Size P1=1) are touching each other, the size (diameter) ratio of P1/P2 can be obtained using the above equation to be 6.464~6.5. Similarly, the other ratios for the particle sizes required to stop leak-off in an embodiment can be estimated as P2/P3 being about 2.5 and P3/P4 being about 1.8, and when a fifth particle is used, P4/P5 is about 1.6. As a practical matter it can be difficult to obtain and/or work with particles having an average size range less than about 10 μm at the accuracy required, and one embodiment compensates by using a relatively large proportion of the fourth particle wherein the fourth particle has an average size between 10 and 20 μm.

Example 14

In this example the stability of a slurry was qualitatively observed by aging the slurry in a glass bottle under static conditions for 48 h in the temperature range of 66° C. (150° F.) to 121° C. (250° F.). At the end of 48 h, a pipette was manually inserted into the slurry to gauge the force required to stab into the slurry. This was a qualitative test and the force required to stab in was assigned a number from 0 to 5 with 0 being the worst case (cannot stab in) and 5 being the best case. After the stab-in test, the slurry was poured out of the bottle to check the flow properties and settling at the bottom of the slurry. The flowability was also assigned a number between 0 and 5, where 0 refers to not flowable and 5 refers to flowable slurry.

In Runs 14-1 to 14-3 a four-particle slurry as shown in Table 16 was evaluated at 66° C., 93° C. and 121° C. using diutan (0.036 wt %) as a viscosifier in the liquid phase.

TABLE 16

Slurry Compositions and Stability Results
with Diutan Slurry Stabilizer

| Component/Property | Run 14-1 | Run 14-2 | Run 14-3 |
|---|---|---|---|
| Temperature, C. | 66 | 93 | 121 |
| CARBOLITE (20/40, 620 μm), g | 100 | 100 | 100 |
| Silica (200 μm), g | 12 | 12 | 12 |
| Silica (32 μm), g | 30 | 30 | 30 |
| Silica (3 μm), g | 32 | 32 | 32 |
| DI Water, g | 23 | 23 | 23 |
| Diutan, g | 0.008 | 0.008 | 0.008 |
| Slurry Stability Results, 64 h | | | |
| Stab-In, scale 0-5 | 5 | 5 | 5 |
| Flow, scale 0-5 | 4 | 4 | 4 |
| Settling | yes | yes | yes |

After 64 h at temperature, it was easy to stab-in a pipette into the slurry and also to pour the slurry out of the bottle. However, a sediment was observed in the bottle.

In Run 14-4, a four-particle slurry as shown in Table 17 was evaluated at 121 C using nanometer sized γ-alumina (40 nm, obtained from Infarmat Advanced Materials) as a slurry stabilizer.

TABLE 17

Slurry Composition and Stability Result
with γ-Alumina Slurry Stabilizer

| Component/Property | Run 14-4 |
|---|---|
| Temperature, C. | 121 |
| CARBOLITE (20/40, 620 μm), g | 100 |
| Silica (200 μm), g | 12 |
| Silica (32 μm), g | 30 |
| Silica (3 μm), g | 32 |
| DI Water, g | 26 |
| γ-Al2O3, g | 0.008 |
| Polynaphthalene sulfonate, ml | 0.17 |
| Slurry Stability Results, 86 h | |
| Stab-In, scale 0-5 | 5 |
| Flow, scale 0-5 | 5 |
| Free water | No |
| Settling | Little |

The stab-in, flow and free water results showed that the stability of the slurry was much better than that formulated with diutan. A unique property of slurries formulated with γ-alumina is that they do not have a layer of free water at the end of the experiment.

In Run 14-5, a four-particle slurry as shown in Table 18 was evaluated at 121° C. using gellan particles at 0.2 wt % and diutan at 0.036 wt %. At room temperature, the gellan particles dispersed easily in water but did not increase the viscosity of the mixture. At temperatures above 90° C., the gellan particles hydrate, increasing the viscosity of the solution. This is a very useful property in one embodiment of the invention because the particles can be added to the slurry at the surface without increasing the viscosity. After the slurry is placed downhole, the decrease in viscosity of liquid phase due to temperature can be compensated by the increase in viscosity due to hydration of gellan particles.

TABLE 18

Slurry Composition and Stability Result with Gellan/Diutan Slurry Stabilizer

| Component/Property | Run 14-5 |
| --- | --- |
| Temperature, C. | 121 |
| CARBOLITE (20/40, 620 μm), g | 100 |
| Silica (200 μm), g | 12 |
| Silica (32 μm), g | 30 |
| Silica (3 μm), g | 42 |
| DI Water, g | 28 |
| Diutan, g | 0.01 |
| Gellan gum, g | 0.06 |
| Slurry Stability Results, 86 h | |
| Stab-In, scale 0-5 | 5 |
| Flow, scale 0-5 | 5 |
| Free water | Yes |
| Settling | No |

The results in Table 18 showed that the slurry was stable and did not show settling at the end of the experiment.

In Runs 14-6, 14-7 and 14-8, the gellan/diutan, four-particle slurry of Table 18 was evaluated at different temperatures after 48 h as shown in Table 17.

TABLE 19

Stability Result with Gellan/Diutan Slurry Stabilizer

| Slurry Stability Results, 48 h | Run 14-6 | Run 14-7 | Run 14-8 |
| --- | --- | --- | --- |
| Temperature, ° C. | 66 | 93 | 121 |
| Stab-In, scale 0-5 | 5 | 5 | 5 |
| Flow, scale 0-5 | 5 | 5 | 5 |
| Free water | No | No | No |
| Settling | No | No | No |

The results in Table 19 showed that the slurry was stable when the fluid phase is viscosified at high temperature with gellan gum.

In Run 14-9, a four-particle slurry as shown in Table 20 was evaluated at 121° C. using polylactic acid (PLA) flakes to improve stability. The fluid phase of the slurry was not viscosified with diutan. The average size of the PLA flakes was around 1 mm.

TABLE 20

Slurry Composition and Stability Result with PLA Slurry Stabilizer

| Component/Property | Run 14-9 |
| --- | --- |
| Temperature, ° C. | 121 |
| CARBOLITE (20/40, 620 μm), g | 100 |
| Silica (200 μm), g | 12 |
| Silica (32 μm), g | 30 |
| Silica (3 μm), g | 32 |
| DI Water, g | 26 |
| PLA Flakes, g | 2 |
| Slurry Stability Results, 86 h | |
| Stab-In, scale 0-5 | 5 |
| Flow, scale 0-5 | 5 |
| Free water | Yes |
| Settling | Little |

The results in Table 20 showed that the addition of PLA flakes improved the stab-in, flow and settling properties of the slurry when compared to the stability results of the slurry formulated with diutan as shown in Table 16.

While the invention has been illustrated and described in detail in the drawings and foregoing description, the same is to be considered as illustrative and not restrictive in character, it being understood that only some embodiments have been shown and described and that all changes and modifications that come within the spirit of the inventions are desired to be protected. It should be understood that while the use of words such as preferable, preferably, preferred, more preferred or exemplary utilized in the description above indicate that the feature so described may be more desirable or characteristic, nonetheless may not be necessary and embodiments lacking the same may be contemplated as within the scope of the invention, the scope being defined by the claims that follow. In reading the claims, it is intended that when words such as "a," "an," "at least one," or "at least one portion" are used there is no intention to limit the claim to only one item unless specifically stated to the contrary in the claim. When the language "at least a portion" and/or "a portion" is used the item can include a portion and/or the entire item unless specifically stated to the contrary.

The invention claimed is:

1. A composition, comprising:
a carrier fluid and a solids mixture combined to form a flowable slurry, wherein the solids mixture comprises a plurality of volume-averaged particle size distribution (PSD) modes, wherein a first PSD mode comprises solids having a volume-average median size at least three times larger than the volume-average median size of a second PSD mode such that a packed volume fraction (PVF) of the solids mixture exceeds 0.75, and wherein the solids mixture comprises a degradable material and includes a reactive solid.

2. The composition of claim 1, wherein the carrier fluid is a low viscosity fluid free of viscosifier or comprising viscosifier in an amount less than 2.4 g of viscosifier per liter of carrier fluid (20 lb/1000 gal).

3. The composition of claim 1, wherein the slurry is stable and has a high particulate loading comprising at least 3.6 kg of the solids mixture per liter of the carrier fluid (30 lb/gal).

4. The composition of claim 1, wherein the first PSD mode comprises gravel and the second PSD mode comprises alumina trihydrate particles.

5. The composition of claim 1, wherein the degradable material is soluble in basic fluids.

6. The composition of claim 1, wherein the degradable material is selected from the group consisting of amphoteric oxides, esters, coated acids and combinations thereof.

7. The composition of claim 1, wherein the solids mixture comprises base or base precursor.

8. The composition of claim 7, wherein the base or base precursor is sparingly soluble or encapsulated.

9. The composition of claim 7, wherein the base is selected from the group consisting of alkali metal and ammonium hydroxides, organic amines, urea, substituted urea and combinations thereof.

10. The composition of claim 1, wherein the degradable material is soluble in acidic fluids.

11. The composition of claim 10, wherein the degradable material is selected from the group consisting of oxides and hydroxides of aluminum, zinc, tin, lead, boron, silicon and iron; carbonates, sulfates, oxides and hydroxides of calcium, magnesium and barium; and combinations thereof.

12. The composition of claim 10, wherein the solids mixture comprises an acid or acid precursor.

13. The composition of claim 12, wherein the acid or acid precursor is sparingly soluble or encapsulated.

14. The composition of claim 12, wherein the acid precursor is selected from the group consisting of hydrolyzable esters, acid anhydrides, acid sulfonates, acid halides and combinations thereof.

15. The composition of claim 1, wherein the second PSD mode comprises an encapsulated water- or oil-soluble solid.

16. The composition of claim 1, wherein the second PSD mode comprises a water-soluble solid and the carrier fluid comprises a saturated aqueous solution of the water-soluble solid.

17. The composition of claim 16, wherein the soluble material comprises salt and the carrier fluid comprises brine.

18. The composition of claim 1, wherein the second PSD mode comprises a water-soluble solid, and the carrier fluid comprises an invert oil emulsion wherein the water-soluble solid is dispersed in an oil phase.

* * * * *